(12) United States Patent
Chen et al.

(10) Patent No.: US 11,683,496 B2
(45) Date of Patent: *Jun. 20, 2023

(54) MOTION VECTOR PREDICTION METHOD AND RELATED APPARATUS

(71) Applicant: HUAWEI TECHNOLOGIES CO., LTD., Guangdong (CN)

(72) Inventors: Huanbang Chen, Shenzhen (CN); Haitao Yang, Shenzhen (CN); Jianle Chen, San Diego, CA (US); Jiali Fu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/525,944

(22) Filed: Nov. 14, 2021

(65) Prior Publication Data

US 2022/0078443 A1    Mar. 10, 2022

Related U.S. Application Data

(63) Continuation of application No. 17/140,041, filed on Jan. 1, 2021, now Pat. No. 11,206,408, which is a
(Continued)

(51) Int. Cl.
*H04N 19/139*       (2014.01)
*H04N 19/119*       (2014.01)
(Continued)

(52) U.S. Cl.
CPC ......... *H04N 19/139* (2014.11); *H04N 19/119* (2014.11); *H04N 19/176* (2014.11); *H04N 19/61* (2014.11)

(58) Field of Classification Search
CPC .. H04N 19/119; H04N 19/139; H04N 19/176; H04N 19/52; H04N 19/537; H04N 19/61
See application file for complete search history.

(56) References Cited

U.S. PATENT DOCUMENTS 10,602,180 B2 *  3/2020  Chen ............... H04N 19/54
10,880,543 B2 * 12/2020  Lv ................. H04N 19/52
(Continued)

FOREIGN PATENT DOCUMENTS

CN    102883163 A    1/2013
CN    102934440 A    2/2013
(Continued)

OTHER PUBLICATIONS

Huawei Technologies Co., Ltd., Affine transform prediction for next generation video coding, ITU-T SG16 Meeting, Geneva,, No. T13-SG16-C-1016, Oct. 2015, 11 pages.
(Continued)

*Primary Examiner* — Jessica M Prince
(74) *Attorney, Agent, or Firm* — Huawei Technologies Co., Ltd.

(57) ABSTRACT

A motion vector prediction method includes parsing a bitstream to obtain an index value of a candidate motion vector list and constructing the candidate motion vector list that includes. candidate motion vectors of K control points of a current block. The candidate motion vectors of K control points are obtained based on a 2N-parameter affine transform model used for a neighboring block of the current block, where N and K are integers greater than or equal to 2 and less than or equal to 4 with N not being equal to K. The method further includes determining, in the candidate motion vector list, target candidate motion vectors of the K control points based on the index value and obtaining a predicted motion vector of each subblock of the current block based on the target candidate motion vectors of the K control points.

11 Claims, 12 Drawing Sheets

Related U.S. Application Data continuation of application No. PCT/CN2018/116984, filed on Nov. 22, 2018.

(60) Provisional application No. 62/699,733, filed on Jul. 18, 2018, provisional application No. 62/693,422, filed on Jul. 2, 2018.

(51) Int. Cl.
*H04N 19/176* (2014.01)
*H04N 19/61* (2014.01)

(56) References Cited

U.S. PATENT DOCUMENTS

| | | | |
|---|---|---|---|
| 2017/0332095 A1 | 11/2017 | Zou et al. | |
| 2018/0098062 A1 | 4/2018 | Li et al. | |
| 2018/0098063 A1 | 4/2018 | Chen et al. | |
| 2018/0270500 A1* | 9/2018 | Li | H04N 19/52 |

FOREIGN PATENT DOCUMENTS

| | | |
|---|---|---|
| CN | 103402045 A | 11/2013 |
| CN | 103561263 A | 2/2014 |
| CN | 104539966 A | 4/2015 |
| CN | 106303543 A | 1/2017 |
| CN | 106375770 A | 2/2017 |
| CN | 106454378 A | 2/2017 |
| CN | 106537915 A | 3/2017 |
| CN | 106878749 A | 6/2017 |
| CN | 108141582 A | 6/2018 |
| WO | 2017156705 A1 | 9/2017 |
| WO | 2018064492 A1 | 4/2018 |
| WO | 2018067823 A1 | 4/2018 |

OTHER PUBLICATIONS

Li Li et al, An Efficient Four-Parameter Affine Motion Model for Video Coding, arxiv.org, Cornell University Library, Feb. 2017, 14 pages.

Hsu, Chih-Wei et al., Description of SDR video coding technology proposal by MediaTek, Joint Video Experts Team (JVET) of ITU-T SG 16 WP 3 and ISO/IEC JTC 1/SC 29/WG 11 10th Meeting: San Diego, US, Apr. 10-20, 2018, [JVET-J0018], JVET-J0018 (version 2), ITU-T, Apr. 11, 2018, 7 pages.

Document: JVET-J0017-v1, Moonmo Koo et al. Description of SDR video coding technology proposal by LG Electronics, Joint Video Experts Team (JVET) of ITU-T SG 16 WP 3 and ISO/IEC JTC 1/SC 29/WG 11, 10th Meeting: San Diego, CA, Apr. 10-20, 2018, 7 pages.

\* cited by examiner

MOTION VECTOR PREDICTION METHOD AND RELATED APPARATUS

CROSS-REFERENCE TO RELATED APPLICATIONS

This application is a continuation of U.S. patent application Ser. No. 17/140,041, filed on Jan. 1, 2021, which is a continuation of International Application No. PCT/CN2018/116984, filed on Nov. 22, 2018. The International Application claims priority to U.S. provisional Application No. 62/693,422, filed on Jul. 2, 2018 and U.S. provisional Application No. 62/699,733, filed on Jul. 18, 2018. All of the afore-mentioned patent applications are hereby incorporated by reference in their entireties.

TECHNICAL FIELD

Embodiments of the present disclosure relate to the field of video coding technologies, and in particular, to a method and an apparatus for predicting a motion vector of a video image, and a corresponding encoder and decoder.

BACKGROUND

Video coding (video encoding and decoding) is used in a wide range of digital video applications, for example, broadcast digital TV, video transmission over internet and mobile networks, real-time conversational applications such as video chat, video conferencing, DVDs and Blu-ray discs, video content acquisition and editing systems, and camcorders of security applications.

Since the development of a block-based hybrid video coding approach in the H.261 standard in 1990, new video coding techniques and tools were developed and formed the basis for new video coding standards. Further video coding standards include MPEG-1 video, MPEG-2 video, ITU-T H.262/MPEG-2, ITU-T H.263, ITU-T H.264/MPEG-4 Part 10 advanced video coding (Advanced Video Coding, AVC), ITU-T H.265/high efficiency video coding (High Efficiency Video Coding, HEVC), and extensions, for example, scalability and/or 3D (three-dimensional) extensions of these standards. As video creation and use have become more ubiquitous, video traffic is the biggest load on communication networks and data storage. Accordingly, one of the goals of most of the video coding standards was to achieve a bitrate reduction compared to its predecessor without sacrificing image quality. Even the latest high efficiency video coding (High Efficiency video coding, HEVC) can compress video about twice as much as AVC without sacrificing image quality, it is hunger for a new technology to further compress video as compared with HEVC.

SUMMARY

Embodiments of the present disclosure provide a motion vector prediction method and a related apparatus, to improve coding efficiency and satisfy a user requirement.

According to a first aspect, an embodiment of the present disclosure provides a motion vector prediction method. The method is described from a perspective of a decoder side or an encoder side. The method may be used to predict a to-be-processed image block. The to-be-processed image block is obtained by partitioning a video image. On the encoder side, the to-be-processed image block is a current affine coding block, and a decoded image block spatially adjacent to the to-be-processed image block is a neighboring affine coding block. On the decoder side, the to-be-processed image block is a current affine decoding block, and the decoded image block spatially adjacent to the to-be-processed image block is a neighboring affine decoding block. For ease of description, the to-be-processed image block may be referred to as a current block, and a reference block spatially adjacent to the to-be-processed image block may be referred to a neighboring block. The method includes: parsing a bitstream to obtain an index value of a candidate motion vector list; constructing the candidate motion vector list, where the candidate motion vector list includes candidate motion vectors of K control points of the current block, the candidate motion vectors of the K control points are obtained based on a 2×N-parameter affine transform model used for a neighboring block of the current block, the 2×N-parameter affine transform model is obtained based on motion vectors of N control points of the neighboring block, N is an integer greater than or equal to 2 and less than or equal to 4, K is an integer greater than or equal to 2 and less than or equal to 4, and N is not equal to K; determining, in the candidate motion vector list, target candidate motion vectors of the K control points based on the index value; and obtaining, based on the target candidate motion vectors of the K control points, a predicted motion vector corresponding to a location of each subblock of the current block. Predicted motion vectors corresponding to locations of various subblocks may be respectively used for motion compensation of the plurality of subblocks.

It can be learned that, in this embodiment of the present disclosure, in a process of predicting the current block, the decoder side can construct, in a phase of constructing the candidate list of the current block (for example, in a phase of constructing a candidate motion vector list for an affine transform model-based AMVP mode or merge mode), an affine transform model of the current block by using an affine transform model of the neighboring block. The affine transform models of the two blocks may be different. The affine transform model of the current block better satisfies an actual motion status/actual requirement of the current block. Therefore, this solution can improve coding efficiency and accuracy in predicting the current block, and satisfy a user requirement.

According to the first aspect, in a possible implementation, availability of one or more preset spatially neighboring blocks of the current block may be determined in a preset order, and then an available neighboring block in the preset order is sequentially obtained. The preset available neighboring block may include a neighboring image block located above, on the left, on the top right, on the bottom left, or on the top left of the to-be-processed image block. For example, the neighboring image block located on the left, the neighboring image block located above, the neighboring image block located on the top right, the neighboring image block located on the bottom left, and the neighboring image block located on the top left are sequentially checked for availability.

According to the first aspect, in a possible implementation, N=2 and K=3. For example, if a 4-parameter affine transform model is used for an affine decoding block (an affine coding block on the encoder side), and a 6-parameter affine transform model is used for the current block, candidate motion vectors of three control points of the current block are obtained based on the 4-parameter affine transform model used for the neighboring block of the current block.

For example, the candidate motion vectors of the three control points of the current block include a motion vector (vx0, vy0) at the top-left sample location (or referred to as the top-left corner, which is the same below) (x0, y0) of the current block, a motion vector (vx1, vy1) at the top-right sample location (or referred to as the top-right corner, which is the same below) (x1, y1) of the current block, and a motion vector (vx2, vy2) at the bottom-left sample location (or referred to as the bottom-left corner, which is the same below) (x2, y2) of the current block.

That the candidate motion vectors of the three control points of the current block are obtained based on the 4-parameter affine transform model used for the neighboring block of the current block includes that the motion vector (vx0, vy0) of the top-left corner (x0, y0) of the current block, the motion vector (vx1, vy1) of the top-right corner (x1, y1) of the current block, and the motion vector (vx2, vy2) of the bottom-left corner (x2, y2) of the current block are first calculated according to the following formulas:

$$\begin{cases} vx_0 = vx_4 + \dfrac{(vx_5 - vx_4)}{x_5 - x_4} \times (x_0 - x_4) - \dfrac{(vy_5 - vy_4)}{x_5 - x_4} \times (y_0 - y_4) \\ vy_0 = vx_4 + \dfrac{(vy_5 - vy_4)}{x_5 - x_4} \times (x_0 - x_4) + \dfrac{(vx_5 - vx_4)}{x_5 - x_4} \times (y_0 - y_4) \end{cases}$$

$$\begin{cases} vx_1 = vx_4 + \dfrac{(vx_5 - vx_4)}{x_5 - x_4} \times (x_1 - x_4) - \dfrac{(vy_5 - vy_4)}{x_5 - x_4} \times (y_1 - y_4) \\ vy_1 = vx_4 + \dfrac{(vy_5 - vy_4)}{x_5 - x_4} \times (x_1 - x_4) + \dfrac{(vx_5 - vx_4)}{x_5 - x_4} \times (y_1 - y_4) \end{cases}$$

$$\begin{cases} vx_2 = vx_4 + \dfrac{(vx_5 - vx_4)}{x_5 - x_4} \times (x_2 - x_4) - \dfrac{(vy_5 - vy_4)}{x_5 - x_4} \times (y_2 - y_4) \\ vy_2 = vx_4 + \dfrac{(vy_5 - vy_4)}{x_5 - x_4} \times (x_2 - x_4) + \dfrac{(vx_5 - vx_4)}{x_5 - x_4} \times (y_2 - y_4) \end{cases}$$

where $vx_0$ is a horizontal component of the motion vector corresponding to the top-left sample location of the current block, and $vy_0$ is a vertical component of the motion vector corresponding to the top-left sample location of the current block; $vx_1$ is a horizontal component of the motion vector corresponding to the top-right sample location of the current block, and $vy_1$ is a vertical component of the motion vector corresponding to the top-right sample location of the current block; $vx_2$ is a horizontal component of the motion vector corresponding to the bottom-left sample location of the current block, and $vy_2$ is a vertical component of the motion vector corresponding to the bottom-left sample location of the current block; $vx_4$ is a horizontal component of a motion vector corresponding to the top-left sample location of the neighboring block, and $vy_4$ is a vertical component of the motion vector corresponding to the top-left sample location of the neighboring block; $vx_5$ is a horizontal component of a motion vector corresponding to the top-right sample location of the neighboring block, and $vy_5$ is a vertical component of the motion vector corresponding to the top-right sample location of the neighboring block; $x_0$ is a horizontal coordinate of the top-left sample location of the current block, and $y_0$ is a vertical coordinate of the top-left sample location of the current block; $x_1$ is a horizontal coordinate of the top-right sample location of the current block, and $y_1$ is a vertical coordinate of the top-right sample location of the current block; $x_2$ is a horizontal coordinate of the bottom-left sample location of the current block, and $y_2$ is a vertical coordinate of the bottom-left sample location of the current block; $x_4$ is a horizontal coordinate of the top-left sample location of the neighboring block, and $y_4$ is a vertical coordinate of the top-left sample location of the neighboring block; and $x_5$ is a horizontal coordinate of the top-right sample location of the neighboring block.

According to the first aspect, in a possible implementation, N=3 and K=2. For example, if a 6-parameter affine transform model is used for an affine decoding block (an affine coding block on the encoder side), and a 4-parameter affine transform model is used for the current block, candidate motion vectors of two control points of the current block are obtained based on the 6-parameter affine transform model used for the neighboring block of the current block.

For example, the candidate motion vectors of the two control points of the current block include a motion vector (vx0, vy0) at the top-left sample location (or referred to as the top-left corner, which is the same below) (x0, y0) of the current block and a motion vector (vx1, vy1) at the top-right sample location (or referred to as the top-right corner, which is the same below) (x1, y1) of the current block; and that the candidate motion vectors of the two control points of the current block are obtained based on the 6-parameter affine transform model used for the neighboring block of the current block includes that the candidate motion vectors of the two control points of the current block are calculated according to the following formulas:

$$\begin{cases} vx_0 = vx_4 + \dfrac{(vx_5 - vx_4)}{x_5 - x_4} \times (x_0 - x_4) + \dfrac{(vx_6 - vx_4)}{y_6 - y_4} \times (y_0 - y_4) \\ vy_0 = vx_4 + \dfrac{(vy_5 - vy_4)}{x_5 - x_4} \times (x_0 - x_4) + \dfrac{(vy_6 - vy_4)}{y_6 - y_4} \times (y_0 - y_4) \end{cases}$$

$$\begin{cases} vx_1 = vx_4 + \dfrac{(vx_5 - vx_4)}{x_5 - x_4} \times (x_1 - x_4) + \dfrac{(vy_6 - vy_4)}{y_6 - y_4} \times (y_1 - y_4) \\ vy_1 = vx_4 + \dfrac{(vy_5 - vy_4)}{x_5 - x_4} \times (x_1 - x_4) + \dfrac{(vy_6 - vy_4)}{y_6 - y_4} \times (y_1 - y_4) \end{cases}$$

where $vx_0$ is a horizontal component of the motion vector corresponding to the top-left sample location of the current block, and $vy_0$ is a vertical component of the motion vector corresponding to the top-left sample location of the current block; $vx_1$ is a horizontal component of the motion vector corresponding to the top-right sample location of the current block, and $vy_1$ is a vertical component of the motion vector corresponding to the top-right sample location of the current block; $vx_4$ is a horizontal component of a motion vector corresponding to the top-left sample location of the neighboring block, and $vy_4$ is a vertical component of the motion vector corresponding to the top-left sample location of the neighboring block; $vx_5$ is a horizontal component of a motion vector corresponding to the top-right sample location of the neighboring block, and $vy_5$ is a vertical component of the motion vector corresponding to the top-right sample location of the neighboring block; $vx_6$ is a horizontal component of a motion vector corresponding to the bottom-left sample location of the neighboring block, and $vy_6$ is a vertical component of the motion vector corresponding to the bottom-left sample location of the neighboring block; $x_0$ is a horizontal coordinate of the top-left sample location of the current block, and $y_0$ is a vertical coordinate of the top-left sample location of the current block; $x_1$ is a horizontal coordinate of the top-right sample location of the current block, and $y_1$ is a vertical coordinate of the top-right sample location of the current block; $x_4$ is a horizontal coordinate of the top-left sample location of the neighboring block, and $y_4$ is a vertical coordinate of the top-left sample location of the neighboring block; $x_5$ is a horizontal coordinate of the top-right sample location of the neighboring block; and $y_6$ is a vertical coordinate of the bottom-left sample location of the neighboring block.

It can be learned that, in this embodiment of the present disclosure, in a phase of parsing the current block (for example, in the phase of constructing the candidate motion vector list), the affine transform model of the current block can be constructed by using the affine transform model of the neighboring block. The affine transform models of the two blocks may be different. The affine transform model of the current block better satisfies the actual motion status/actual requirement of the current block. Therefore, this solution can improve the coding efficiency and the accuracy in predicting the current block, and satisfy the user requirement.

According to the first aspect, in an embodiment of a phase of reconstructing the current block, a process of obtaining the predicted motion vector of each subblock of the current block includes the following procedure: obtaining a 2×K-parameter affine transform model of the current block based on the target candidate motion vectors of the K control points; and obtaining the predicted motion vector of each subblock of the current block based on the 2×K-parameter affine transform model.

For example, if the 6-parameter affine motion model is used for the current affine decoding block, the 6-parameter affine transform model of the current block is constructed based on target candidate motion vectors of the three control points (in other words, K=3) of the current block. Sample coordinates $(x_{(i,j)}, y_{(i,j)})$ in a subblock are substituted into a formula for the 6-parameter affine motion model to obtain a motion vector corresponding to the sample coordinates in each subblock, and the obtained motion vector is used as motion vectors $(vx_{(i,j)}, vy_{(i,j)})$ of all samples in the subblock.

$$\begin{cases} vx = \dfrac{vx_1 - vx_0}{W}x + \dfrac{vx_2 - vy_0}{H}y + vx_0 \\ vy = \dfrac{vy_1 - vy_0}{W}x + \dfrac{vy_2 - vx_0}{H}y + vy_0 \end{cases}$$

For another example, if the 4-parameter affine motion model is used for the current affine decoding block, the 4-parameter affine transform model of the current block is constructed based on target candidate motion vectors of the two control points (in other words, K=2) of the current block. Sample coordinates $(x_{(i,j)}, y_{(i,j)})$ in a subblock are substituted into a formula for the 4-parameter affine motion model to obtain a motion vector corresponding to the sample coordinates in each subblock, and the obtained motion vector is used as motion vectors $(vx_{(i,j)}, vy_{(i,j)})$ of all samples in the subblock:

$$\begin{cases} vx = \dfrac{vx_1 - vx_0}{W}x - \dfrac{vy_1 - vy_0}{W}y + vx_0 \\ vy = \dfrac{vy_1 - vy_0}{W}x + \dfrac{vx_1 - vx_0}{W}y + vy_0 \end{cases}$$

According to the first aspect, in another embodiment of a phase of reconstructing the current block, a process of obtaining the predicted motion vector of each subblock of the current block includes the following procedure: obtaining the 6-parameter affine transform model of the current block based on the target candidate motion vectors of the K control points of the current block; and obtaining the predicted motion vector of each subblock of the current block based on the 6-parameter affine transform model of the current block.

In other words, in this solution, regardless of the affine transform model used for the current block in the parsing phase (the list construction phase), in the phase of reconstructing the current block, the 6-parameter affine transform model is uniformly used to obtain motion vector information of each subblock of the current block, to reconstruct each subblock. For example, if the 4-parameter affine transform model or an 8-parameter bilinear model is used in the parsing phase, the 6-parameter affine transform model of the current block is further constructed. For example, if the 6-parameter affine transform model is used in the parsing phase, the 6-parameter affine transform model of the current block continues to be used in the reconstruction phase.

For example, the 4-parameter affine transform model is used for the current block in the parsing phase, and the 4-parameter affine transform model or another parameter affine model may be used for the neighboring block. Therefore, after motion vectors of the two control points of the current block are obtained, for example, a motion vector (vx4, vy4) of the top-left control point (x4, y4) of the current block and a motion vector (vx5, vy5) of the top-right control point (x5, y5) of the current block are obtained, in the phase of reconstructing the current block, the 6-parameter affine transform model needs to be constructed based on the motion vectors of the two control points of the current block.

For example, based on the motion vector (vx0, vy0) of the top-left control point (x0, y0) of the current block and the motion vector (vx1, vy1) of the top-right control point (x1, y1) of the current block, a motion vector of a third control point may be obtained according to the following formula. The motion vector of the third control point is, for example, the motion vector (vx2, vy2) of the bottom-left corner (x2, y2) of the current block.

$$\begin{cases} vx_2 = -\dfrac{vy_1 - vy_0}{W}H + vx_0 \\ vy_2 = +\dfrac{vx_1 - vx_0}{W}H + vy_0 \end{cases}$$

Then, the 6-parameter affine model of the current block in the reconstruction phase is obtained by using the motion vector (vx0, vy0) of the top-left control point (x0, y0) of the current block, the motion vector (vx1, vy1) of the top-right control point (x1, y1) of the current block, and the motion vector (vx2, vy2) of the bottom-left control point (x2, y2) of the current block. The formula for the 6-parameter affine model is as follows:

$$\begin{cases} vx = \dfrac{vx_1 - vx_0}{W}x + \dfrac{vx_2 - vy_0}{H}y + vx_0 \\ vy = \dfrac{vy_1 - vy_0}{W}x + \dfrac{vy_2 - vx_0}{H}y + vy_0 \end{cases}$$

Then, coordinates $(x_{(i,j)}, y_{(i,j)})$ of a sample at a preset location (for example, the center point) of each subblock (or each motion compensation unit) of the current block relative to the top-left corner (or another reference point) of the current block are substituted into the foregoing formula for the 6-parameter affine model to obtain motion information of the sample at the preset location of each subblock (or each motion compensation unit), to subsequently reconstruct each subblock.

In this embodiment of the present disclosure, in the phase of reconstructing the current block, the 6-parameter affine transform model can be uniformly used to predict the current block. A larger quantity of parameters of a motion model describing affine motion of the current block indicates higher precision and higher calculation complexity. In this solution, the 6-parameter affine transform model constructed in the reconstruction phase can describe affine transform such as translation, scaling, and rotation of an image block, and achieve a good balance between model complexity and a modeling capability. Therefore, this solution can improve the coding efficiency and the accuracy in predicting the current block, and satisfy the user requirement.

According to the first aspect, in a possible implementation, in the affine transform model-based AMVP mode, the obtaining a 2×K-parameter affine transform model based on the target candidate motion vectors of the K control points includes: obtaining motion vectors of the K control points based on the target candidate motion vectors of the K control points and motion vector differences of the K control points, where the motion vector differences of the K control points are obtained by parsing the bitstream; and obtaining the 2×K-parameter affine transform model of the current block based on the motion vectors of the K control points.

According to the first aspect, in a possible implementation, the encoder side and the decoder side use the affine transform model-based AMVP mode to perform inter prediction, and the constructed list is the candidate motion vector list for the affine transform model-based AMVP mode.

In some embodiments of the present disclosure, a candidate motion vector of a control point of the current block may be obtained by using a first motion model-based motion vector prediction method described in this specification, and added to the candidate motion vector list corresponding to the AMVP mode.

In some other embodiments of the present disclosure, a candidate motion vector of a control point of the current block may alternatively be obtained separately by using a first motion model-based motion vector prediction method and a constructed control point motion vector prediction method, and added to the candidate motion vector list corresponding to the AMVP mode.

According to the first aspect, in a possible implementation, the encoder side and the decoder side use the affine transform model-based merge mode to perform inter prediction, and the constructed list is the candidate motion vector list for the affine transform model-based merge mode.

In some embodiments of the present disclosure, the candidate motion vector of the control point of the current block may also be obtained by using the first motion model-based motion vector prediction method described in this specification, and added to the candidate motion vector list corresponding to the merge mode.

In some other embodiments of the present disclosure, the candidate motion vector of the control point of the current block may alternatively be obtained separately by using the first motion model-based motion vector prediction method and the constructed control point motion vector prediction method, and added to the candidate motion vector list corresponding to the merge mode.

According to the first aspect, in a possible implementation, when there are a plurality of neighboring blocks, in other words, when the current block has a plurality of neighboring affine decoding blocks, in a possible embodiment, both the encoder side and the decoder side can first obtain a candidate motion vector of a control point of the current block by using an affine decoding block whose quantity of model parameters is the same as that of the current block, and add the obtained candidate motion vector of the control point to the candidate motion vector list corresponding to the AMVP mode. Then, a candidate motion vector of the control point of the current block may be obtained by using an affine decoding block whose quantity of model parameters is different from that of the current block, and added to the candidate motion vector list corresponding to the AMVP mode. In this way, the candidate motion vector that is of the control point of the current block and that is obtained by using the affine decoding block whose quantity of model parameters is the same as that of the current block is located at a front location of the list. This design helps reduce a quantity of bits transmitted in the bitstream.

According to the first aspect, in a possible implementation, in a process in which the decoder side derives the candidate motion vector of the control point of the current block, flag information (flag) of an affine transform model of an affine decoding block may need to be obtained. The flag is pre-stored locally on the decoder side, and is used to indicate the affine transform model that is of the affine decoding block and that is actually used to predict a subblock of the affine decoding block.

For example, in an application scenario, when the decoder side determines, by identifying the flag of the affine decoding block, that a quantity of model parameters of the affine transform model actually used for the affine decoding block is different from (or the same as) that of the affine transform model used for the current block, the decoder side is triggered to derive the candidate motion vector of the control point of the current block by using the affine transform model actually used for the affine decoding block.

According to the first aspect, in a possible implementation, in the process in which the decoder side derives the candidate motion vector of the control point of the current block, the flag of the affine transform model of the affine decoding block may not be required.

For example, in an application scenario, after the decoder side determines the affine transform model used for the current block, the decoder side obtains control points of a specific quantity (the specific quantity is the same as or different from a quantity of control points of the current block) of the affine decoding block, constructs the affine transform model by using the control points of the specific quantity of the affine decoding block, and then derives the candidate motion vector of the control point of the current block by using the affine transform model.

According to a second aspect, an embodiment of the present disclosure provides another motion vector prediction method. The method includes: parsing a bitstream to obtain an index value of a candidate motion vector list; constructing the candidate motion vector list, where the candidate motion vector list includes candidate motion vectors of K control points of a current block, the candidate motion vectors of the K control points of the current block are obtained based on a 2N-parameter affine transform model used for a neighboring block of the current block, the 2N-parameter affine transform model is obtained based on motion vectors of N control points of the neighboring block, N is an integer greater than or equal to 2 and less than or equal to 4, K is an integer greater than or equal to 2 and less than or equal to 4, the neighboring block is a decoded image block spatially adjacent to the current block, and the current block includes a plurality of subblocks; determining, in the candidate motion vector list, target candidate motion vectors of the K control points of the current block based on the index value; obtaining a 6-parameter affine transform model of the current block based on the target candidate motion vectors of the K control points of the current block; and obtaining a predicted motion vector of each subblock of the current block based on the 6-parameter affine transform model of the current block.

It can be learned that, in this embodiment of the present disclosure, the 6-parameter affine transform model can be uniformly used to predict the current block in a phase of reconstructing the current block. A larger quantity of parameters of a motion model describing affine motion of the current block indicates higher precision and higher calculation complexity. In this solution, the 6-parameter affine transform model constructed in the reconstruction phase can describe affine transform such as translation, scaling, and rotation of an image block, and achieve a good balance between model complexity and a modeling capability. Therefore, this solution can improve coding efficiency and accuracy in predicting the current block, and satisfy a user requirement.

According to the second aspect, in a possible implementation, N=2 and K=3.

Correspondingly, candidate motion vectors of two control points of the current block are obtained based on a 4-parameter affine transform model used for the neighboring block of the current block.

According to the second aspect, in a possible implementation, N=3 and K=2. Correspondingly, candidate motion vectors of two control points of the current block are obtained based on the 6-parameter affine transform model used for the neighboring block of the current block.

According to the second aspect, in a possible implementation, the obtaining a 6-parameter affine transform model of the current block based on the target candidate motion vectors of the K control points of the current block includes:

obtaining the 4-parameter affine transform model of the current block based on target candidate motion vectors of the two control points of the current block;

obtaining a motion vector of a third control point of the current block based on the 4-parameter affine transform model of the current block; and obtaining the 6-parameter affine transform model of the current block based on the target candidate motion vectors of the two control points of the current block and the motion vector of the third control point.

According to the second aspect, in a possible implementation, the obtaining the 4-parameter affine transform model of the current block based on target candidate motion vectors of the two control points of the current block includes:

obtaining motion vectors of the two control points of the current block based on the target candidate motion vectors of the two control points of the current block and motion vector differences of the two control points of the current block, where the motion vector differences of the two control points of the current block are obtained by parsing the bitstream; and obtaining the 4-parameter affine transform model of the current block based on the motion vectors of the two control points of the current block; and correspondingly, the obtaining the 6-parameter affine transform model of the current block based on the target candidate motion vectors of the two control points of the current block and the motion vector of the third control point specifically includes:

obtaining the 6-parameter affine transform model of the current block based on the motion vectors of the two control points of the current block and the motion vector of the third control point.

According to the second aspect, in a possible implementation, N=2 and K=3. Correspondingly, candidate motion vectors of three control points of the current block are obtained based on a 2-parameter affine transform model used for the neighboring block of the current block.

According to a third aspect, an embodiment of the present disclosure provides a decoding device. The device includes: a storage unit, configured to store video data in a form of a bitstream; an entropy decoding unit, configured to parse the bitstream to obtain an index value of a candidate motion vector list; and a prediction processing unit, configured to: construct the candidate motion vector list, where the candidate motion vector list includes candidate motion vectors of K control points of a current block, the candidate motion vectors of the K control points of the current block are obtained based on a 2×N-parameter affine transform model used for a neighboring block of the current block, the 2×N-parameter affine transform model is obtained based on motion vectors of N control points of the neighboring block, N is an integer greater than or equal to 2 and less than or equal to 4, K is an integer greater than or equal to 2 and less than or equal to 4, N is not equal to K, the neighboring block is a decoded image block spatially adjacent to the current block, and the current block includes a plurality of subblocks; determine, in the candidate motion vector list, target candidate motion vectors of the K control points of the current block based on the index value; and obtain a predicted motion vector of each subblock of the current block based on the target candidate motion vectors of the K control points of the current block.

In an embodiment, the modules of the device may be configured to implement the method described in the first aspect.

According to a fourth aspect, an embodiment of the present disclosure provides a decoding device. The device includes: a storage unit, configured to store video data in a form of a bitstream; an entropy decoding unit, configured to parse the bitstream to obtain an index value of a candidate motion vector list; and a prediction processing unit, configured to: parse the bitstream to obtain the index value of the candidate motion vector list; construct the candidate motion vector list, where the candidate motion vector list includes candidate motion vectors of K control points of a current block, the candidate motion vectors of the K control points of the current block are obtained based on a 2N-parameter affine transform model used for a neighboring block of the current block, the 2N-parameter affine transform model is obtained based on motion vectors of N control points of the neighboring block, N is an integer greater than or equal to 2 and less than or equal to 4, K is an integer greater than or equal to 2 and less than or equal to 4, the neighboring block is a decoded image block spatially adjacent to the current block, and the current block includes a plurality of subblocks; determine, in the candidate motion vector list, target candidate motion vectors of the K control points of the current block based on the index value; obtain a 6-parameter affine transform model of the current block based on the target candidate motion vectors of the K control points of the current block; and obtain a predicted motion vector of each subblock of the current block based on the 6-parameter affine transform model of the current block.

In an embodiment, the modules of the device may be configured to implement the method described in the second aspect.

According to a fifth aspect, an embodiment of the present disclosure provides a video decoding device. The device includes:

a memory, configured to store video data in a form of a bitstream; and a decoder, configured to: construct a candidate motion vector list, where the candidate motion vector list includes candidate motion vectors of K control points of a current block, the candidate motion vectors of the K control points of the current block are obtained based on a 2×N-parameter affine transform model used for a neighboring block of the current block, the 2×N-parameter affine transform model is obtained based on motion vectors of N control points of the neighboring block, N is an integer greater than or equal to 2 and less than or equal to 4, K is an integer greater than or equal to 2 and less than or equal to 4, N is not equal to K, the neighboring block is a decoded image block spatially adjacent to the current block, and the current block includes a plurality of subblocks; determine, in the candidate motion vector list, target candidate motion vectors of the K control points of the current block based on the index value; and obtain a predicted motion vector of each subblock of the current block based on the target candidate motion vectors of the K control points of the current block.

According to the fifth aspect, in some implementations, N is equal to 2, and K is equal to 3. Correspondingly, candidate motion vectors of three control points of the current block are obtained based on a 4-parameter affine transform model used for the neighboring block of the current block.

According to the fifth aspect, in some implementations, the candidate motion vectors of the three control points of the current block include a motion vector at the top-left sample location of the current block, a motion vector at the top-right sample location of the current block, and a motion vector at the bottom-left sample location of the current block.

The decoder is configured to calculate the candidate motion vectors of the three control points of the current block according to the following formulas:

$$\begin{cases} vx_0 = vx_4 + \frac{(vx_5 - vx_4)}{x_5 - x_4} \times (x_0 - x_4) - \frac{(vy_5 - vy_4)}{x_5 - x_4} \times (y_0 - y_4) \\ vy_0 = vx_4 + \frac{(vy_5 - vy_4)}{x_5 - x_4} \times (x_0 - x_4) + \frac{(vx_5 - vx_4)}{x_5 - x_4} \times (y_0 - y_4) \end{cases}$$

$$\begin{cases} vx_1 = vx_4 + \frac{(vx_5 - vx_4)}{x_5 - x_4} \times (x_1 - x_4) - \frac{(vy_5 - vy_4)}{x_5 - x_4} \times (y_1 - y_4) \\ vy_1 = vx_4 + \frac{(vy_5 - vy_4)}{x_5 - x_4} \times (x_1 - x_4) + \frac{(vx_5 - vx_4)}{x_5 - x_4} \times (y_1 - y_4) \end{cases}$$

$$\begin{cases} vx_2 = vx_4 + \frac{(vx_5 - vx_4)}{x_5 - x_4} \times (x_2 - x_4) - \frac{(vy_5 - vy_4)}{x_5 - x_4} \times (y_2 - y_4) \\ vy_2 = vx_4 + \frac{(vy_5 - vy_4)}{x_5 - x_4} \times (x_2 - x_4) + \frac{(vx_5 - vx_4)}{x_5 - x_4} \times (y_2 - y_4) \end{cases}$$

where $vx_0$ is a horizontal component of the motion vector corresponding to the top-left sample location of the current block, and $vy_0$ is a vertical component of the motion vector corresponding to the top-left sample location of the current block; $vx_1$ is a horizontal component of the motion vector corresponding to the top-right sample location of the current block, and $vy_1$ is a vertical component of the motion vector corresponding to the top-right sample location of the current block; $vx_2$ is a horizontal component of the motion vector corresponding to the bottom-left sample location of the current block, and $vy_2$ is a vertical component of the motion vector corresponding to the bottom-left sample location of the current block; $vx_4$ is a horizontal component of a motion vector corresponding to the top-left sample location of the neighboring block, and $vy_4$ is a vertical component of the motion vector corresponding to the top-left sample location of the neighboring block; $vx_5$ is a horizontal component of a motion vector corresponding to the top-right sample location of the neighboring block, and $vy_5$ is a vertical component of the motion vector corresponding to the top-right sample location of the neighboring block; $x_0$ is a horizontal coordinate of the top-left sample location of the current block, and $y_0$ is a vertical coordinate of the top-left sample location of the current block; $x_1$ is a horizontal coordinate of the top-right sample location of the current block, and $y_1$ is a vertical coordinate of the top-right sample location of the current block; $x_2$ is a horizontal coordinate of the bottom-left sample location of the current block, and $y_2$ is a vertical coordinate of the bottom-left sample location of the current block; $x_4$ is a horizontal coordinate of the top-left sample location of the neighboring block, and $y_4$ is a vertical coordinate of the top-left sample location of the neighboring block; and $x_5$ is a horizontal coordinate of the top-right sample location of the neighboring block.

According to the fifth aspect, in some implementations, N is equal to 3, and K is equal to 2. Correspondingly, candidate motion vectors of two control points of the current block are obtained based on a 6-parameter affine transform model used for the neighboring block of the current block.

According to the fifth aspect, in some implementations, the candidate motion vectors of the two control points of the current block include a motion vector at the top-left sample location of the current block and a motion vector at the top-right sample location of the current block.

The decoder is configured to calculate the candidate motion vectors of the two control points of the current block according to the following formulas:

$$\begin{cases} vx_0 = vx_4 + \frac{(vx_5 - vx_4)}{x_5 - x_4} \times (x_0 - x_4) + \frac{(vx_6 - vx_4)}{y_6 - y_4} \times (y_0 - y_4) \\ vy_0 = vx_4 + \frac{(vy_5 - vy_4)}{x_5 - x_4} \times (x_0 - x_4) + \frac{(vy_6 - vy_4)}{y_6 - y_4} \times (y_0 - y_4) \end{cases}$$

$$\begin{cases} vx_1 = vx_4 + \frac{(vx_5 - vx_4)}{x_5 - x_4} \times (x_1 - x_4) + \frac{(vx_6 - vx_4)}{y_6 - y_4} \times (y_1 - y_4) \\ vy_1 = vx_4 + \frac{(vy_5 - vy_4)}{x_5 - x_4} \times (x_1 - x_4) + \frac{(vy_6 - vy_4)}{y_6 - y_4} \times (y_1 - y_4) \end{cases}$$

where $vx_0$ is a horizontal component of the motion vector corresponding to the top-left sample location of the current block, and $vy_0$ is a vertical component of the motion vector corresponding to the top-left sample location of the current block; $vx_1$ is a horizontal component of the motion vector corresponding to the top-right sample location of the current block, and $vy_1$ is a vertical component of the motion vector corresponding to the top-right sample location of the current block; $vx_4$ is a horizontal component of a motion vector corresponding to the top-left sample location of the neighboring block, and $vy_4$ is a vertical component of the motion vector corresponding to the top-left sample location of the neighboring block; $vx_5$ is a horizontal component of a motion vector corresponding to the top-right sample location of the neighboring block, and $vy_5$ is a vertical component of the motion vector corresponding to the top-right sample location of the neighboring block; $vx_6$ is a horizontal component of a motion vector corresponding to the bottom-left sample location of the neighboring block, and $vy_6$ is a vertical component of the motion vector corresponding to the bottom-left sample location of the neighboring block; $x_0$ is a horizontal coordinate of the top-left sample location of the current block, and $y_0$ is a vertical coordinate of the top-left sample location of the current block; $x_1$ is a horizontal coordinate of the top-right sample location of the current block, and $y_1$ is a vertical coordinate of the top-right sample location of the current block; $x_4$ is a horizontal coordinate of the top-left sample location of the neighboring block, and $y_4$ is a vertical coordinate of the top-left sample location of the neighboring block; $x_5$ is a horizontal coordinate of the top-right sample location of the neighboring block; and $y_6$ is a vertical coordinate of the bottom-left sample location of the neighboring block.

According to the fifth aspect, in some implementations, the decoder is configured to:

obtain a 2×K-parameter affine transform model of the current block based on the target candidate motion vectors of the K control points of the current block; and obtain the predicted motion vector of each subblock of the current block based on the 2×K-parameter affine transform model of the current block.

According to the fifth aspect, in some implementations, the decoder is configured to:

obtain motion vectors of the K control points of the current block based on the target candidate motion vectors of the K control points of the current block and motion vector differences of the K control points of the current block, where the motion vector differences of the K control points of the current block are obtained by parsing the bitstream; and obtain the 2×K-parameter affine transform model of the current block based on the motion vectors of the K control points of the current block.

According to the fifth aspect, in some implementations, after determining, in the candidate motion vector list, the target candidate motion vectors of the K control points of the current block based on the index value, the decoder is further configured to:

obtain the 6-parameter affine transform model of the current block based on the target candidate motion vectors of the K control points of the current block; and obtain the predicted motion vector of each subblock of the current block based on the 6-parameter affine transform model of the current block.

For specific function implementation of the decoder, refer to related descriptions in the first aspect.

According to a sixth aspect, an embodiment of the present disclosure provides another video decoding device. The device includes:

a memory, configured to store video data in a form of a bitstream; and a decoder, configured to parse a bitstream to obtain an index value of a candidate motion vector list; construct the candidate motion vector list, where the candidate motion vector list includes candidate motion vectors of K control points of a current block, the candidate motion vectors of the K control points of the current block are obtained based on a 2N-parameter affine transform model used for a neighboring block of the current block, the 2N-parameter affine transform model is obtained based on motion vectors of N control points of the neighboring block, N is an integer greater than or equal to 2 and less than or equal to 4, K is an integer greater than or equal to 2 and less than or equal to 4, the neighboring block is a decoded image block spatially adjacent to the current block, and the current block includes a plurality of subblocks; determine, in the candidate motion vector list, target candidate motion vectors of the K control points of the current block based on the index value; obtain a 6-parameter affine transform model of the current block based on the target candidate motion vectors of the K control points of the current block; and obtain a predicted motion vector of each subblock of the current block based on the 6-parameter affine transform model of the current block.

For specific function implementation of the decoder, refer to related descriptions in the second aspect.

According to a seventh aspect, an embodiment of the present disclosure provides a computer-readable storage medium. The computer-readable storage medium stores an instruction, and when the instruction is executed, one or more processors are enabled to encode video data. The instruction enables the one or more processors to perform the method described in any possible embodiment of the first aspect.

According to an eighth aspect, an embodiment of the present disclosure provides a computer-readable storage medium. The computer-readable storage medium stores an instruction, and when the instruction is executed, one or more processors are enabled to encode video data. The instruction enables the one or more processors to perform the method described in any possible embodiment of the second aspect.

According to a ninth aspect, an embodiment of the present disclosure provides a computer program including program code. When the program code is run on a computer, the method described in any possible embodiment of the first aspect is performed.

According to a tenth aspect, an embodiment of the present disclosure provides a computer program including program code. When the program code is run on a computer, the method described in any possible embodiment of the second aspect is performed.

It can be learned that, in an embodiment of the present disclosure, in a process of encoding and decoding a current block, in a phase of parsing the current block (for example, in a phase of constructing a candidate motion vector list for an AMVP mode or a merge mode), an affine transform model of the current block can be constructed by using an affine transform model of a neighboring block. The affine transform models of the two blocks may be different. The affine transform model of the current block better satisfies an actual motion status/actual requirement of the current block. Therefore, this solution can improve efficiency and accuracy of encoding the current block, and satisfy a user requirement.

It can be further learned that, in the process of encoding and decoding the current block, a decoder side may uniformly use a 6-parameter affine transform model to predict an image block in a phase of reconstructing the image block. In this way, in this embodiment of the present disclosure, a good balance is achieved between model complexity and a modeling capability in a process of reconstructing the current block. Therefore, this solution can improve the coding efficiency and the accuracy in predicting the current block, and satisfy the user requirement.

BRIEF DESCRIPTION OF DRAWINGS

To describe the technical solutions in the embodiments of the present disclosure or in the background more clearly, the following briefly describes the accompanying drawings for describing the embodiments of the present disclosure or the background.

DESCRIPTION OF EMBODIMENTS

Figure 1:
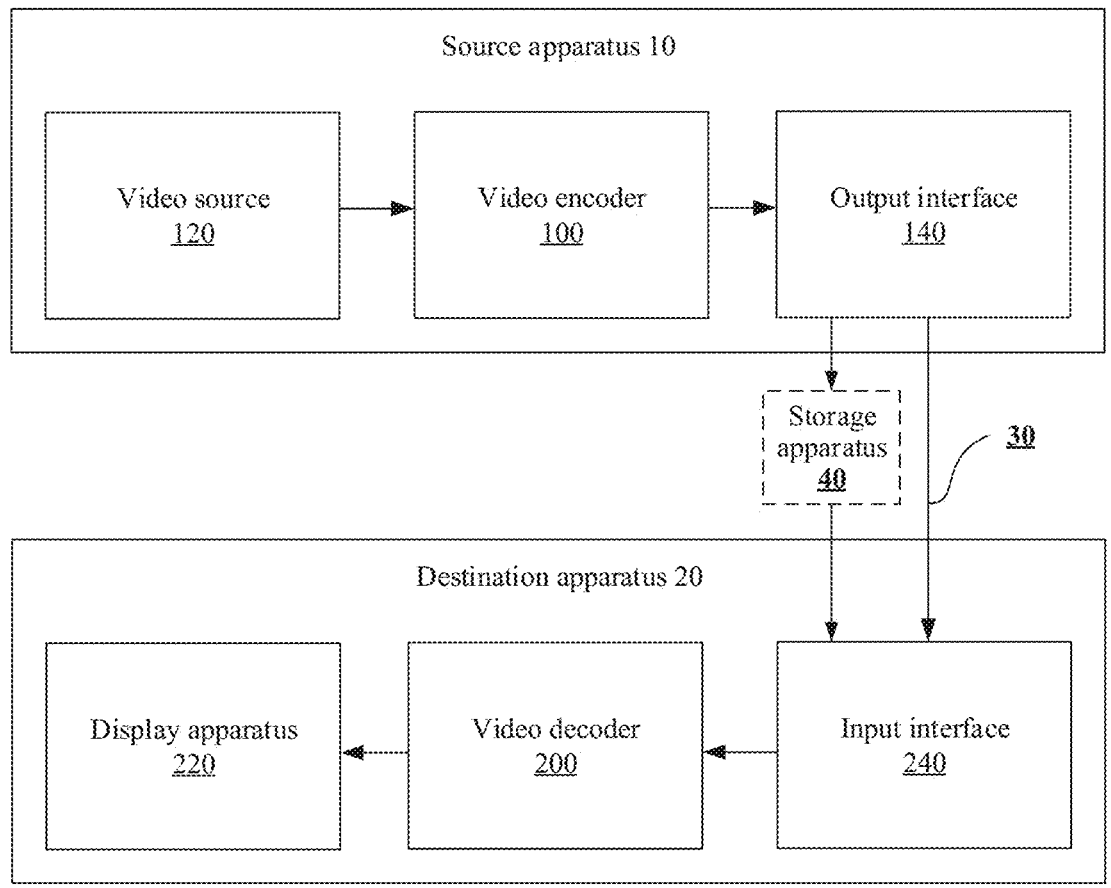
FIG. 1 is a block diagram showing an example structure of a video coding system for implementing embodiments of the present disclosure.

The following briefly describes related concepts in the embodiments of the present disclosure first. The technical solutions in the embodiments of the present disclosure may not only be applied to existing video coding standards (for example, standards such as H.264 and HEVC), but also be applied to future video coding standards (for example, the H.266 standard).

Video coding usually refers to processing a sequence of images that constitute a video or a video sequence. In the field of video coding, the terms "picture (picture)", "frame (frame)", and "image (image)" may be used as synonyms.

Video coding used in this specification includes video encoding and video decoding. Video coding is performed on a source side, and usually includes processing (for example, by compressing) an original video image to reduce an amount of data for representing the video image, for more efficient storage and/or transmission. Video decoding is performed on a destination side, and usually includes inverse processing compared with an encoder to reconstruct the video image. "Coding" of a video image in the embodiments should be understood as "encoding" or "decoding" of a video sequence. A combination of an encoding part and a decoding part is also referred to as CODEC (encoding and decoding).

The video sequence includes a series of images (picture), the image is further split into slices (slice), and the slice is further split into blocks (block). Video coding is performed by block. In some new video coding standards, a concept "block" is further extended. For example, a macroblock (macroblock, MB) is introduced in the H.264 standard. The macroblock may be further split into a plurality of prediction blocks (predictor) that can be used for predictive coding. In the high efficiency video coding (high efficiency video coding, HEVC) standard, basic concepts such as "coding unit" (coding unit, CU), "prediction unit" (prediction unit, PU), and "transform unit" (transform unit, TU) are used. A plurality of block units are obtained through functional division, and are described by using a new tree-based structure. For example, a CU may be split into smaller CUs based on a quadtree, and the smaller CU may further be split, to generate a quadtree structure. The CU is a basic unit for splitting and encoding a coded image. A PU and a TU also have similar tree structures. The PU may correspond to a prediction block, and is a basic unit for predictive coding. The CU is further split into a plurality of PUs based on a splitting pattern. The TU may correspond to a transform block, and is a basic unit for transforming a prediction residual. However, in essence, all of the CU, the PU, and the TU are conceptually blocks (or image blocks).

For example, in HEVC, a CTU is split into a plurality of CUs by using a quadtree structure represented as a coding tree. A decision on whether to encode an image area by using inter-image (temporal) or intra-image (spatial) prediction is made at a CU level. Each CU may be further split into one, two, or four PUs based on a PU splitting pattern. Inside one PU, a same prediction process is applied, and related information is transmitted to a decoder on a PU basis. After obtaining a residual block by applying the prediction process based on the PU splitting pattern, the CU may be partitioned into transform units (transform unit, TU) based on another quadtree structure similar to the coding tree used for the CU. In the recent development of video compression technologies, a quadtree plus binary tree (Quad-tree plus binary tree, QTBT) partition frame is used to partition a coding block. In a QTBT block structure, the CU may be square or rectangular.

In this specification, for ease of description and understanding, a to-be-encoded image block in a current coded image may be referred to as a current block. For example, in encoding, the current block is a block currently being encoded, and in decoding, the current block is a block currently being decoded. A decoded image block, in a reference image, used to predict the current block is referred to as a reference block. In other words, the reference block is a block that provides a reference signal for the current block, and the reference signal represents a pixel value in the image block. A block that provides a prediction signal for the current block in the reference image may be referred to as a prediction block, and the prediction signal represents a pixel value, a sampling value, or a sampling signal in the prediction block. For example, after a plurality of reference blocks are traversed, an optimal reference block is found. The optimal reference block provides prediction for the current block, and may be referred to as the prediction block.

The following describes a video coding system in the embodiments of the present disclosure. FIG. 1 is a block diagram of an example video coding system according to an embodiment of the present disclosure. As used in this specification, the term "video codec" generally refers to a video encoder and a video decoder. In the embodiments of the present disclosure, the term "video coding" or "coding" may generally refer to video encoding or video decoding. A video encoder 100 and a video decoder 200 in the video coding system are configured to predict motion information, for example, a motion vector, of a current coded image block or a subblock of the current coded image block according to various method examples described in any one of a plurality of new inter prediction modes provided in the embodiments of the present disclosure, so that a predicted motion vector maximally approximates a motion vector obtained by using a motion estimation method. In this way, a motion vector difference does not need to be transmitted during encoding, thereby further improving coding performance.

As shown in FIG. 1, the video coding system includes a source apparatus 10 and a destination apparatus 20. The source apparatus 10 generates encoded video data. Therefore, the source apparatus 10 may be referred to as a video encoding apparatus. The destination apparatus 20 may decode the encoded video data generated by the source apparatus 10. Therefore, the destination apparatus 20 may be referred to as a video decoding apparatus. In various implementation solutions, the source apparatus 10, the destination apparatus 20, or both the source apparatus 10 and the destination apparatus 20 may include one or more processors and a memory coupled to the one or more processors. The memory may include but is not limited to a RAM, a ROM, an EEPROM, a flash memory, or any other medium that can be used to store desired program code in a form of an instruction or a data structure accessible to a computer, as described in this specification.

The source apparatus 10 and the destination apparatus 20 may include various apparatuses, including a desktop computer, a mobile computing apparatus, a notebook (for example, laptop) computer, a tablet computer, a set top box, a handheld telephone set such as a "smart" phone, a television set, a camera, a display apparatus, a digital media player, a video game console, a vehicle-mounted computer, and a similar apparatus.

The destination apparatus 20 may receive the encoded video data from the source apparatus 10 through a link 30. The link 30 may include one or more media or apparatuses that can transfer the encoded video data from the source apparatus 10 to the destination apparatus 20. In an example, the link 30 may include one or more communications media that enable the source apparatus 10 to directly transmit the encoded video data to the destination apparatus 20 in real time. In this example, the source apparatus 10 may modulate the encoded video data according to a communications standard (for example, a wireless communications protocol), and may transmit modulated video data to the destination apparatus 20. The one or more communications media may include a wireless communications medium and/or a wired communications medium, for example, a radio frequency (RF) spectrum or one or more physical transmission cables. The one or more communications media may be a part of a packet-based network, and the packet-based network is, for example, a local area network, a wide area network, or a global network (for example, the internet). The one or more communications media may include a router, a switch, a base station, or another device facilitating communication from the source apparatus 10 to the destination apparatus 20.

In another example, the encoded data may be output to a storage apparatus 40 through an output interface 140. Similarly, the encoded data may be accessed from the storage apparatus 40 through an input interface 240. The storage apparatus 40 may include any one of a plurality of distributed or locally accessed data storage media, for example, a hard disk drive, a Blu-ray disc, a DVD, a CD-ROM, a flash memory, a volatile or non-volatile memory, or any other appropriate digital storage medium configured to store the encoded video data.

In another example, the storage apparatus 40 may correspond to a file server or another intermediate storage apparatus capable of storing the encoded video data generated by the source apparatus 10. The destination apparatus 20 may access the stored video data from the storage apparatus 40 through streaming transmission or downloading. The file server may be any type of server capable of storing the encoded video data and transmitting the encoded video data to the destination apparatus 20. For example, the file server includes a network server (for example, used for a website), an FTP server, a network-attached storage (NAS) apparatus, or a local disk drive. The destination apparatus 20 may access the encoded video data through any standard data connection (including an internet connection). The standard data connection may include a wireless channel (for example, a Wi-Fi connection), a wired connection (for example, a DSL or a cable modem), or a combination thereof that can be used to access the encoded video data stored in the file server. Transmission of the encoded video data from the storage apparatus 40 may be streaming transmission, downloading transmission, or a combination thereof.

A motion vector prediction technology in the embodiments of the present disclosure may be applied to video coding to support a plurality of multimedia applications, for example, over-the-air television broadcast, wireless television transmission, satellite television transmission, streaming video transmission (for example, through the internet), encoding of video data stored in a data storage medium, decoding of video data stored in a data storage medium, or another application. In some examples, the video coding system may be configured to support unidirectional or bidirectional video transmission, to support applications such as streaming video transmission, video playback, video broadcasting, and/or videotelephony.

The video coding system described in FIG. 1 is merely an example. The technologies in the embodiments of the present disclosure may be applicable to a video coding setting (for example, video encoding or video decoding) that does not necessarily include any data communication between an encoding apparatus and a decoding apparatus. In another example, data is retrieved from a local memory, is transmitted on a network in a streaming manner, and the like. The video encoding apparatus may encode the data and store the data in the memory, and/or the video decoding apparatus may retrieve the data from the memory and decode the data. In many examples, apparatuses that only encode data and store the data in the memory and/or retrieve the data from the memory and decode the data and that do not communicate with each other perform encoding and decoding.

In the example in FIG. 1, the source apparatus 10 includes a video source 120, the video encoder 100, and the output interface 140. In some examples, the output interface 140 may include a modulator/demodulator (modem) and/or a transmitter. The video source 120 may include a video capturing apparatus (for example, a camera), a video archive including previously captured video data, a video feed-in interface for receiving video data from a video content provider, and/or a computer graphics system for generating video data, or a combination of the foregoing video data sources.

The video encoder 100 may encode video data that is from the video source 120. In some examples, the source apparatus 10 directly transmits the encoded video data to the destination apparatus 20 through the output interface 140. In another example, the encoded video data may alternatively be stored in the storage apparatus 40, so that the destination apparatus 20 subsequently accesses the encoded video data for decoding and/or playing.

In the example in FIG. 1, the destination apparatus 20 includes the input interface 240, the video decoder 200, and a display apparatus 220. In some examples, the input interface 240 includes a receiver and/or a modem. The input interface 240 may receive the encoded video data through the link 30 and/or from the storage apparatus 40. The display apparatus 220 may be integrated with the destination apparatus 20 or may be disposed outside the destination apparatus 20. Usually, the display apparatus 220 displays decoded video data. The display apparatus 220 may include a plurality of types of display apparatuses, for example, a liquid crystal display (LCD), a plasma display, an organic light-emitting diode (OLED) display, or another type of display apparatus.

Although not shown in FIG. 1, in some aspects, the video encoder 100 and the video decoder 200 may be respectively integrated with an audio encoder and an audio decoder, and may include an appropriate multiplexer-demultiplexer unit or other hardware and software, to encode an audio and a video in a combined data stream or a separate data stream. In some examples, if applicable, the MUX-DEMUX unit may comply with the ITU H.223 multiplexer protocol, or another protocol such as the user datagram protocol (UDP).

The video encoder 100 and the video decoder 200 each may be implemented as, for example, any one of the following plurality of circuits: one or more microprocessors, digital signal processors (DSP), application-specific integrated circuits (ASIC), field programmable gate arrays (FPGA), discrete logic, hardware, or any combination thereof. If the embodiments of the present disclosure are implemented partially in software, the apparatus may store, in an appropriate non-volatile computer-readable storage medium, an instruction used for the software, and may use one or more processors to execute the instruction in hardware, to implement the technologies in the embodiments of the present disclosure. Any one of the foregoing content (including the hardware, the software, a combination of the hardware and the software, and the like) may be considered as one or more processors. The video encoder 100 and the video decoder 200 each may be included in one or more encoders or decoders, and the encoder or the decoder may be integrated as a part of a combined encoder/decoder (codec) in a corresponding apparatus.

In the embodiments of the present disclosure, the video encoder 100 may be generally an apparatus that "signals" or "transmits" some information to another apparatus such as the video decoder 200. The term "signaling" or "transmitting" may generally refer to transfer of a syntax element and/or other data used to decode compressed video data. The transfer may occur in real time or almost in real time. Alternatively, the communication may occur after a period of time. For example, the communication may occur when a syntax element in an encoded bitstream is stored in a computer-readable storage medium during encoding, and the decoding apparatus may then retrieve the syntax element at any time after the syntax element is stored in the medium.

The video encoder 100 and the video decoder 200 may operate according to a video compression standard, such as high efficiency video coding (HEVC), or an extension thereof, and may comply with an HEVC test model (HM). Alternatively, the video encoder 100 and the video decoder 200 may operate according to another industry standard, for example, the ITU-T H.264 standard, the H.265 standard, or an extension of such a standard. However, the technologies in the embodiments of the present disclosure are not limited to any particular coding standard.

In an example, the video encoder 100 is configured to encode a syntax element related to a current to-be-encoded image block into a digital video output bitstream (which is referred to as a bitstream or a bitstream for short). Herein, the syntax element used for inter prediction of the current image block is referred to as inter prediction data for short, and the inter prediction data includes, for example, indication information of an inter prediction mode. The inter prediction mode in the embodiments of the present disclosure includes at least one of an affine transform model-based AMVP mode and an affine transform model-based merge mode. When the inter prediction data includes indication information of the affine transform model-based AMVP mode, the inter prediction data may further include an index value (or referred to as an index number) of a candidate motion vector list corresponding to the AMVP mode, and a motion vector difference (MVD) of a control point of the current block. When the inter prediction data includes indication information of the affine transform model-based merge mode, the inter prediction data may further include an index value (or referred to as an index number) of a candidate motion vector list corresponding to the merge mode. In addition, in an optional embodiment, the inter prediction data in the foregoing example may further include indication information of an affine transform model (a quantity of model parameters) of the current block.

It should be understood that, if a difference (namely, a residual) between a prediction block generated based on motion information predicted based on a new inter prediction mode provided in the embodiments of the present disclosure and the current to-be-encoded image block (namely, an original block) is 0, the video encoder 100 only needs to encode the syntax element related to the current to-be-encoded image block into the bitstream (also referred to as the bitstream). Otherwise, in addition to the syntax element, the corresponding residual further needs to be encoded into the bitstream.

Figure 13:
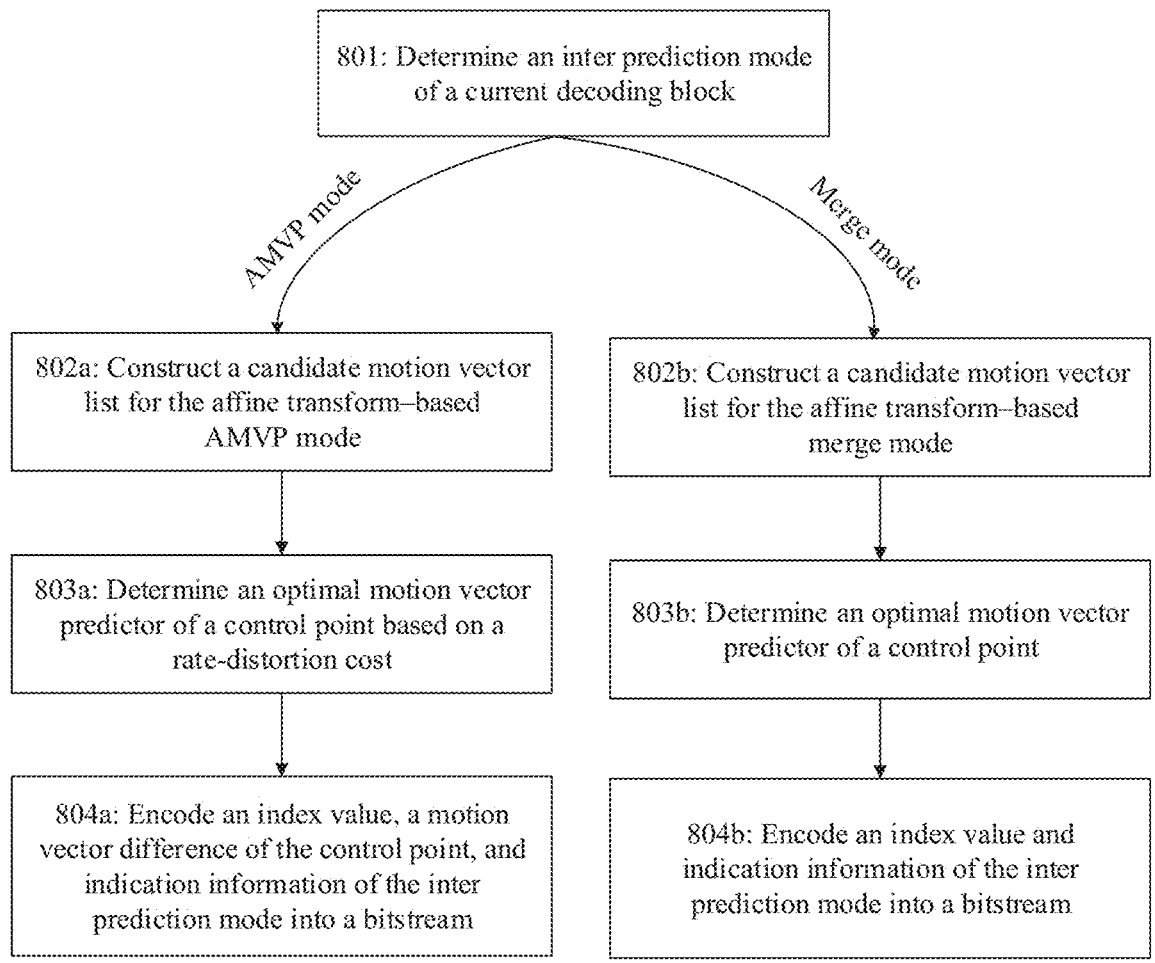
FIG. 13 is a flowchart of another motion vector prediction method according to an embodiment of the present disclosure.

In an embodiment, the video encoder 100 may be configured to execute the following embodiment described in FIG. 13, to implement application, on an encoder side, of the motion vector prediction method described herein.

In an example, the video decoder 200 is configured to decode a bitstream to obtain a syntax element related to a current to-be-decoded image block (S401). Herein, the syntax element used for inter prediction of the current image block is referred to as the inter prediction data for short, and the inter prediction data includes, for example, the indication information of the inter prediction mode. The inter prediction mode in the embodiments of the present disclosure includes at least one of the affine transform model-based AMVP mode and the affine transform model-based merge mode. When the inter prediction data includes the indication information of the affine transform model-based AMVP mode, the inter prediction data may further include the index value (or referred to as the index number) of the candidate motion vector list corresponding to the AMVP mode, and a motion vector difference (MVD) of a control point of the current block. When the inter prediction data includes the indication information of the affine transform model-based merge mode, the inter prediction data may further include the index value (or referred to as the index number) of the candidate motion vector list corresponding to the merge mode. In addition, in an optional embodiment, the inter prediction data in the foregoing example may further include indication information of an affine transform model (a quantity of model parameters) of the current block.

Figure 9:
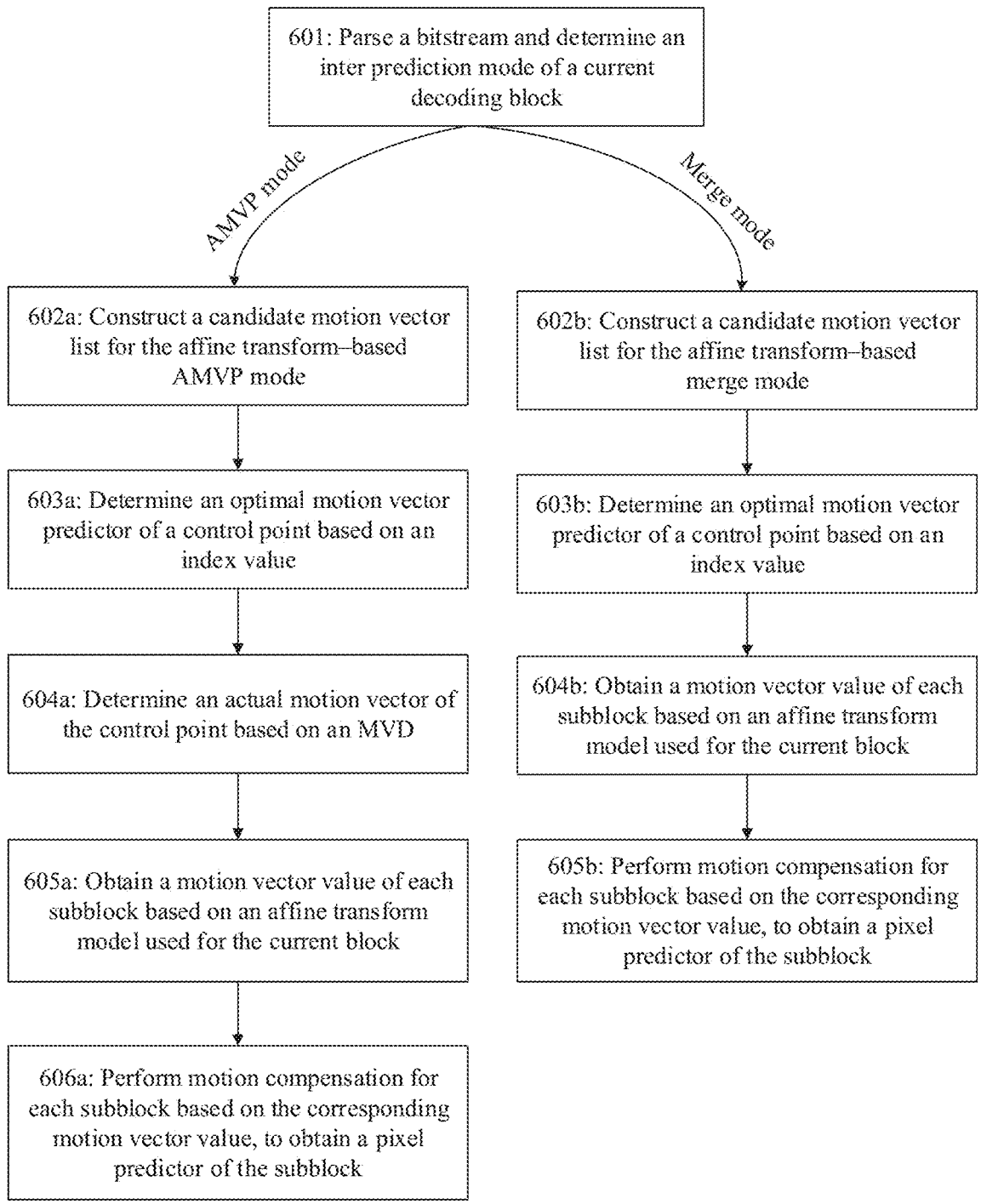
FIG. 9 is a flowchart of a motion vector prediction method according to an embodiment of the present disclosure.
Figure 12:
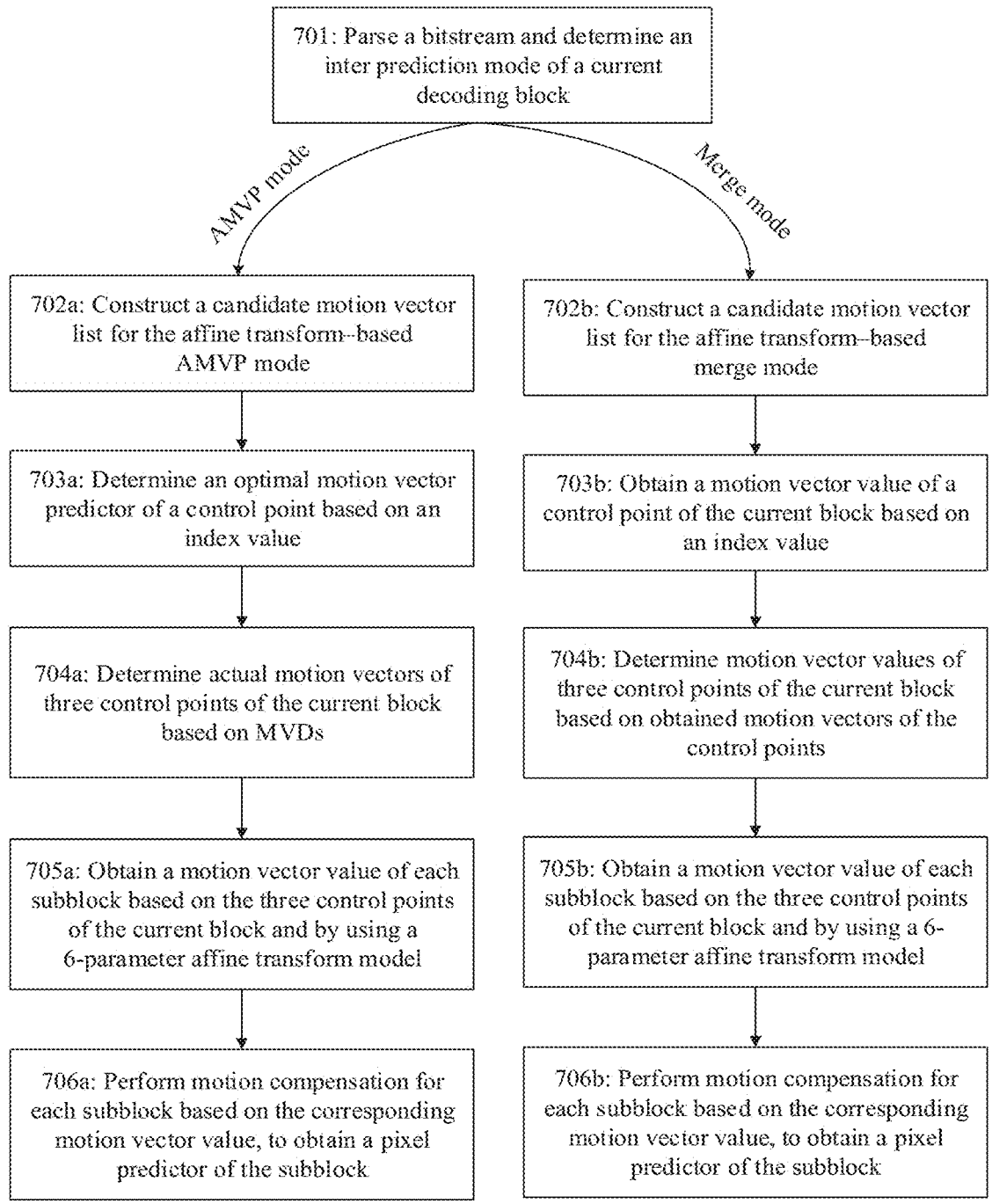
FIG. 12 is a flowchart of another motion vector prediction method according to an embodiment of the present disclosure.

In an embodiment, the video decoder 200 may be configured to execute the following embodiment described in FIG. 9 or FIG. 12, to implement application, on a decoder side, of the motion vector prediction method described herein.

Figure 2A:
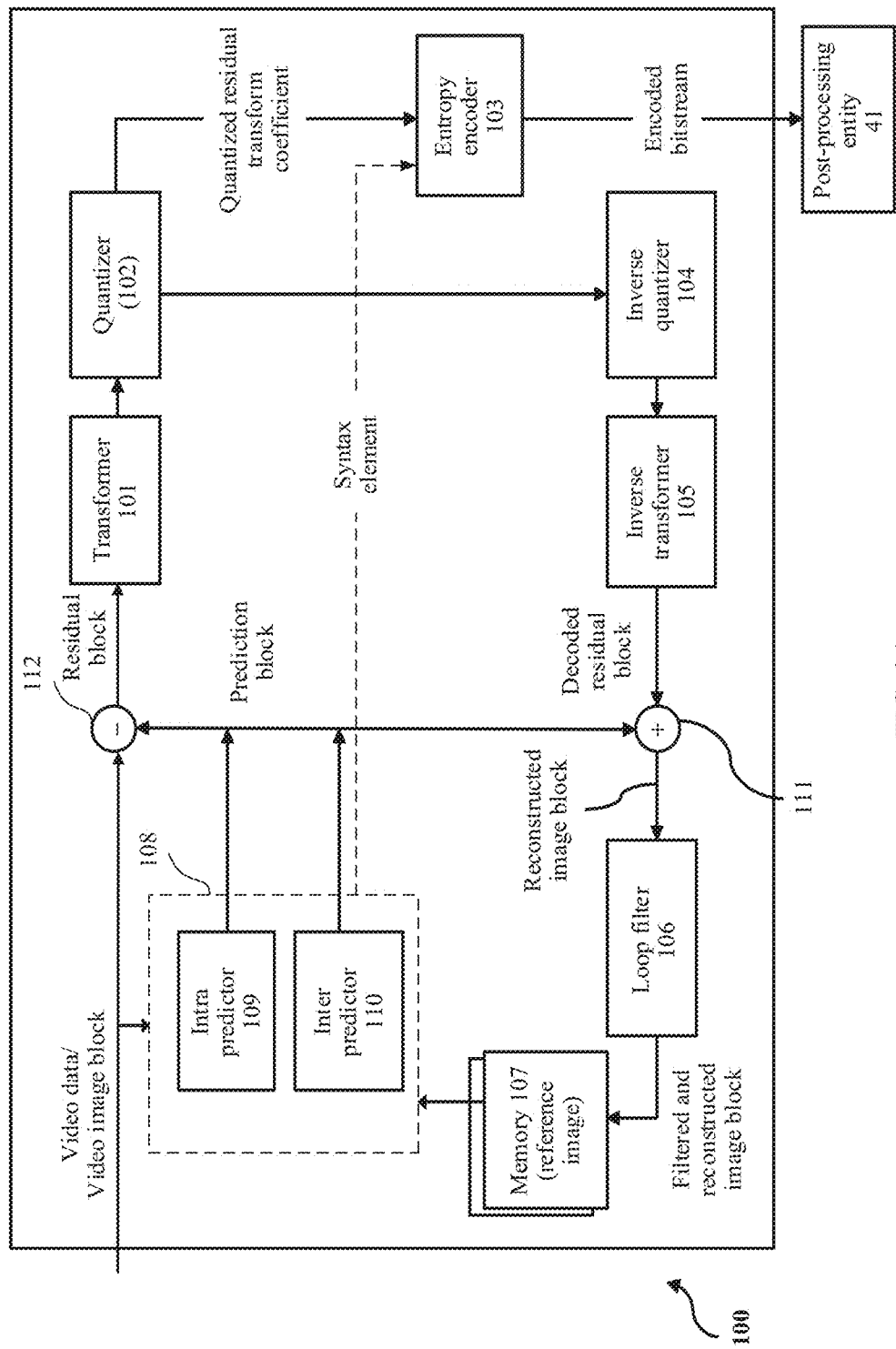
FIG. 2A is a block diagram showing an example structure of a video encoder for implementing embodiments of the present disclosure.

FIG. 2A is a block diagram of an example video encoder 100 according to an embodiment of the present disclosure. The video encoder 100 is configured to output a video to a post-processing entity 41. The post-processing entity 41 represents an example of a video entity capable of processing encoded video data that is from the video encoder 100. For example, the video entity is a media aware network element (MANE) or a splicing apparatus/an editing apparatus. In some cases, the post-processing entity 41 may be an example of a network entity. In some video encoding systems, the post-processing entity 41 and the video encoder 100 may be components of separate apparatuses. In other cases, functions described with respect to the post-processing entity 41 may be performed by a same apparatus including the video encoder 100. In an example, the post-processing entity 41 is an example of the storage apparatus 40 in FIG. 1.

In the example in FIG. 2A, the video encoder 100 includes a prediction processing unit 108, a filter unit 106, a decoded image buffer (DPB) 107, a summator 112, a transformer 101, a quantizer 102, and an entropy encoder 103. The prediction processing unit 108 includes an inter predictor 110 and an intra predictor 109. For image block reconstruction, the video encoder 100 further includes an inverse quantizer 104, an inverse transformer 105, and a summator 111. The filter unit 106 is intended to represent one or more loop filters, for example, a deblocking filter, an adaptive loop filter (ALF), and a sample adaptive offset (SAO) filter. Although the filter unit 106 is shown as an in-loop filter in FIG. 2A, in another implementation, the filter unit 106 may be implemented as a post-loop filter. In an example, the video encoder 100 may further include a video data memory and a partitioning unit (not shown in the figure).

The video data memory may store video data encoded by a component of the video encoder 100. The video data stored in the video data memory may be obtained from a video source 120. The DPB 107 may be a reference image memory that stores reference video data used by the video encoder 100 to encode the video data in an intra or inter coding mode. The video data memory and the DPB 107 each may be constituted by any one of a plurality of memory apparatuses, for example, a dynamic random access memory (DRAM) including a synchronous DRAM (SDRAM), a magnetoresistive RAM (MRAM), a resistive RAM (RRAM), or another type of memory apparatus. The video data memory and the DPB 107 may be provided by a same memory apparatus or separate memory apparatuses. In various examples, the video data memory may be integrated onto a chip together with other components of the video encoder 100, or may be disposed outside the chip relative to those components.

As shown in FIG. 2A, the video encoder 100 receives video data and stores the video data in the video data memory. The partitioning unit partitions the video data into several image blocks, and these image blocks may be further partitioned into smaller blocks, for example, partitioned based on a quadtree structure or a binary-tree structure. The partitioning may further include partitioning into slices (slice), tiles (tile), or other larger units. The video encoder 100 is usually a component for encoding an image block in a to-be-encoded video slice. The slice may be partitioned into a plurality of image blocks (and may be partitioned into image block sets referred to as tiles).

The intra predictor 109 in the prediction processing unit 108 may perform intra predictive encoding on a to-be-encoded current image block relative to one or more neighboring blocks that are in a same frame or slice as the current image block, to remove spatial redundancy. The inter predictor 110 in the prediction processing unit 108 may perform inter predictive encoding on the current image block relative to one or more prediction blocks in one or more reference images, to remove temporal redundancy.

For example, the inter predictor 110 may be configured to determine an inter prediction mode used to encode the current image block. For example, the inter predictor 110 may calculate, through rate-distortion analysis, rate-distortion values of various inter prediction modes in a candidate inter prediction mode set, and select an inter prediction mode with an optimal rate-distortion feature from the inter prediction modes. Rate-distortion analysis is usually to determine an amount of distortion (or error) between an encoded block and an original unencoded block that is to be encoded to generate the encoded block, and a bit rate (in other words, a quantity of bits) used to generate the encoded block. For example, the inter predictor 110 may determine, in the candidate inter prediction mode set, an inter prediction mode that has a smallest rate-distortion cost and that is used to encode the current image block, as the inter prediction mode used to perform inter prediction on the current image block. The following describes in detail an inter predictive encoding process, particularly a process of predicting motion information of one or more subblocks (which may be each subblock or all subblocks) in the current image block in various inter prediction modes used for a non-directional or directional motion field in the embodiments of the present disclosure.

The inter predictor 110 is configured to predict the motion information (for example, a motion vector) of the one or more subblocks in the current image block based on the determined inter prediction mode, and obtain or generate a prediction block of the current image block by using the motion information (for example, the motion vector) of the one or more subblocks in the current image block. The inter predictor 110 may locate, in one reference image in a reference image list, the prediction block to which the motion vector points. The inter predictor 110 may further generate a syntax element associated with an image block and a video slice, so that a video decoder 200 uses the syntax element to decode the image block of the video slice. Alternatively, in an example, the inter predictor 110 performs a motion compensation process by using motion information of each subblock, to generate a prediction block of the subblock, thereby obtaining the prediction block of the current image block. It should be understood that the inter predictor 110 herein performs a motion estimation process and the motion compensation process.

For example, after selecting the inter prediction mode for the current image block, the inter predictor 110 may provide, to the entropy encoder 103, information indicating the selected inter prediction mode of the current image block, so that the entropy encoder 103 encodes the information indicating the selected inter prediction mode. In this embodiment of the present disclosure, the video encoder 100 may add inter prediction data related to the current image block to a bitstream transmitted by the video encoder 100. The inter prediction data includes, for example, the indication information of the inter prediction mode. The inter prediction mode in the embodiments of the present disclosure includes at least one of an affine transform model-based AMVP mode and an affine transform model-based merge mode. When the inter prediction data includes indication information of the affine transform model-based AMVP mode, the inter prediction data may further include an index value (or referred to as an index number) of a candidate motion vector list corresponding to the AMVP mode, and a motion vector difference (MVD) of a control point of the current block. When the inter prediction data includes indication information of the affine transform model-based merge mode, the inter prediction data may further include an index value (or referred to as an index number) of a candidate motion vector list corresponding to the merge mode. In addition, in an optional embodiment, the inter prediction data in the foregoing example may further include indication information of an affine transform model (a quantity of model parameters) of the current block.

In an embodiment, the inter predictor 110 may be configured to perform a related step in the following embodiment described in FIG. 13, to implement application, on an encoder side, of the motion vector prediction method described herein.

The intra predictor 109 may perform intra prediction on the current image block. For example, the intra predictor 109 may determine an intra prediction mode used to encode the current block. For example, the intra predictor 109 may calculate rate-distortion values of various to-be-tested intra prediction modes through rate-distortion analysis, and select an intra prediction mode with an optimal rate-distortion feature from the to-be-tested modes. In any case, after selecting the intra prediction mode for the image block, the intra predictor 109 may provide, to the entropy encoder 103, information indicating the selected intra prediction mode of the current image block, so that the entropy encoder 103 encodes the information indicating the selected intra prediction mode.

After the prediction processing unit 108 generates the prediction block of the current image block through inter prediction and intra prediction, the video encoder 100 subtracts the prediction block from the to-be-encoded current image block to generate a residual image block. The summator 112 represents one or more components that perform the subtraction operation. Residual video data in the residual block may be included in one or more TUs, and applied to the transformer 101. The transformer 101 transforms the residual video data into a residual transform coefficient through transform such as discrete cosine transform (DCT) or conceptually similar transform. The transformer 101 may convert the residual video data from a pixel value domain to a transform domain, for example, a frequency domain.

The transformer 101 may send the obtained transform coefficient to the quantizer 102. The quantizer 102 quantizes the transform coefficient to further reduce the bit rate. In some examples, the quantizer 102 may further scan a matrix including a quantized transform coefficient. Alternatively, the entropy encoder 103 may perform scanning.

After quantization, the entropy encoder 103 performs entropy encoding on the quantized transform coefficient. For example, the entropy encoder 103 may perform context-adaptive variable-length coding (CAVLC), context-adaptive binary arithmetic coding (CABAC), syntax-based context-adaptive binary arithmetic coding (SBAC), probability interval partitioning entropy (PIPE) coding, or another entropy coding method or technology. After the entropy encoder 103 performs entropy encoding, an encoded bitstream may be transmitted to the video decoder 200, or archived for subsequent transmission or to be retrieved by the video decoder 200. The entropy encoder 103 may further perform entropy encoding on a syntax element of the to-be-encoded current image block.

The inverse quantizer 104 and the inverse transformer 105 respectively apply inverse quantization and inverse transform, to reconstruct the residual block in a pixel domain, for example, to be subsequently used as a reference block of the reference image. The summator 111 adds a reconstructed residual block to the prediction block generated by the inter predictor 110 or the intra predictor 109, to generate a reconstructed image block. The filter unit 106 may be applicable to the reconstructed image block to reduce distortion such as blocking artifacts (blocking artifacts). Then, the reconstructed image block is stored as the reference block in the decoded image buffer 107, and may be used by the inter predictor 110 as the reference block to perform inter prediction on a block in a subsequent video frame or image.

It should be understood that other structural variants of the video encoder 100 can be used to encode a video stream. For example, for some image blocks or image frames, the video encoder 100 may directly quantize a residual signal, and correspondingly, processing by the transformer 101 and the inverse transformer 105 is not required. Alternatively, for some image blocks or image frames, the video encoder 100 does not generate residual data, and correspondingly, processing by the transformer 101, the quantizer 102, the inverse quantizer 104, and the inverse transformer 105 is not required. Alternatively, the video encoder 100 may directly store the reconstructed image block as the reference block, without processing by the filter unit 106. Alternatively, the quantizer 102 and the inverse quantizer 104 in the video encoder 100 may be combined.

For example, in this embodiment of the present disclosure, the video encoder 100 is configured to perform the motion vector prediction method described in the following embodiments.

Figure 2B:
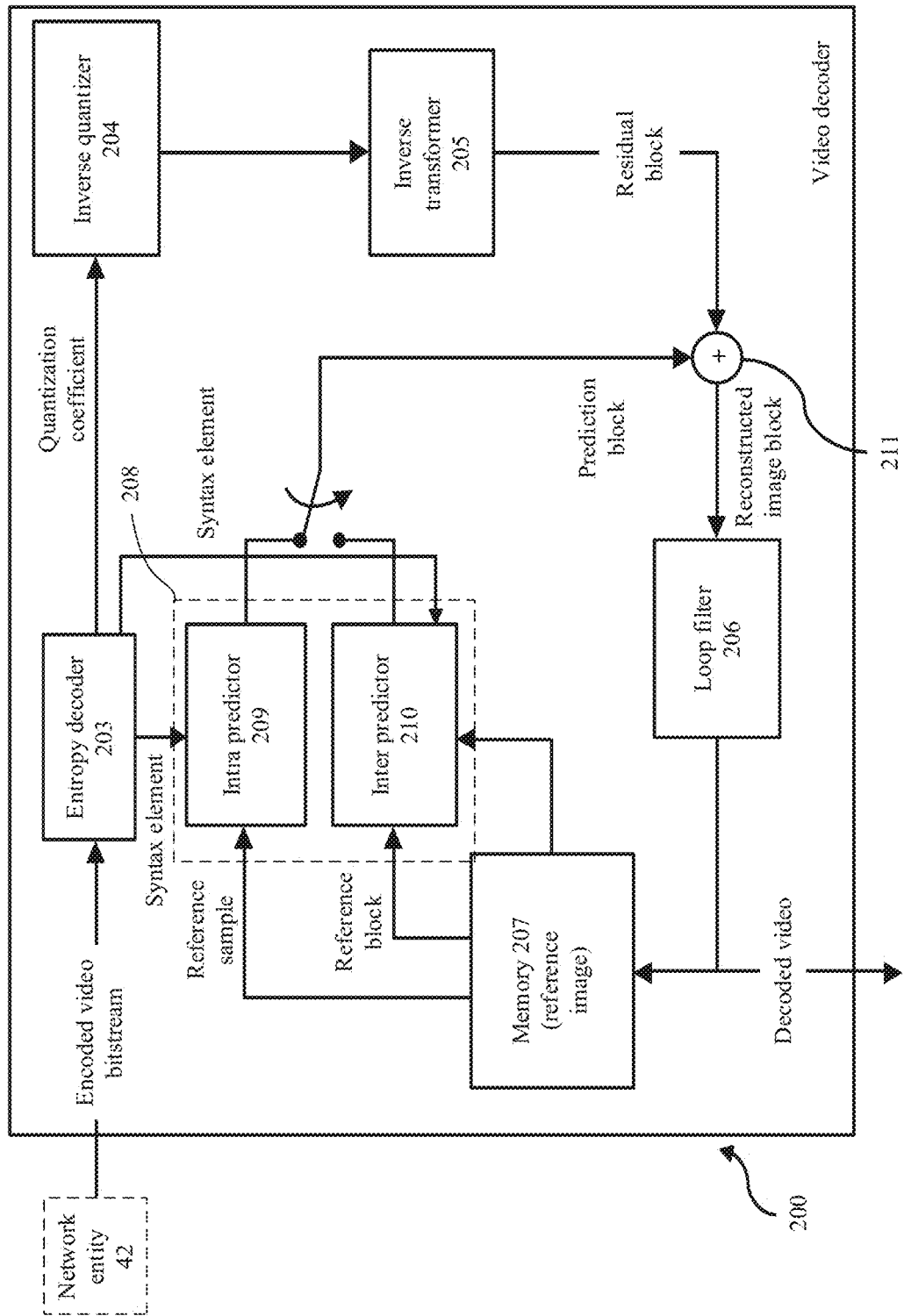
FIG. 2B is a block diagram showing an example structure of a video decoder for implementing embodiments of the present disclosure.

FIG. 2B is a block diagram of an example video decoder 200 according to an embodiment of the present disclosure. In the example in FIG. 2B, the video decoder 200 includes an entropy decoder 203, a prediction processing unit 208, an inverse quantizer 204, an inverse transformer 205, a summator 211, a filter unit 206, and a decoded image buffer 207. The prediction processing unit 208 may include an inter predictor 210 and an intra predictor 209. In some examples, the video decoder 200 may perform a decoding process that is substantially inverse to the encoding process described with respect to the video encoder 100 in FIG. 2A.

During decoding, the video decoder 200 receives, from the video encoder 100, an encoded video bitstream that represents an image block of an encoded video slice and an associated syntax element. The video decoder 200 may receive video data from a network entity 42, and optionally, may further store the video data in a video data memory (which is not shown in the figure). The video data memory may store video data that is to be decoded by a component of the video decoder 200, for example, the encoded video bitstream. The video data stored in the video data memory may be obtained from, for example, a local video source such as a storage apparatus 40 or a camera through wired or wireless network communication of the video data, or by accessing a physical data storage medium. The video data memory may be used as the decoded image buffer (DPB) configured to store encoded video data that is from the encoded video bitstream. Therefore, although the video data memory is not shown in FIG. 2B, the video data memory and the DPB 207 may be a same memory, or may be separately disposed memories. The video data memory and the DPB 207 each may be constituted by any one of a plurality of memory apparatuses, for example, a dynamic random access memory (DRAM) including a synchronous DRAM (SDRAM), a magnetoresistive RAM (MRAM), a resistive RAM (RRAM), or another type of memory apparatus. In various examples, the video data memory may be integrated onto a chip together with other components of the video decoder 200, or may be disposed outside the chip relative to those components.

The network entity 42 may be, for example, a server, a MANE, a video editor/splicer, or another similar apparatus configured to implement one or more of the technologies described above. The network entity 42 may or may not include a video encoder, for example, the video encoder 100. Before the network entity 42 sends the encoded video bitstream to the video decoder 200, the network entity 42 may implement a part of the technologies described in the embodiments of the present disclosure. In some video decoding systems, the network entity 42 and the video decoder 200 may be components of separate apparatuses. In other cases, functions described with respect to the network entity 42 may be performed by a same apparatus including the video decoder 200. In some cases, the network entity 42 may be an example of the storage apparatus 40 in FIG. 1.

The entropy decoder 203 of the video decoder 200 performs entropy decoding on the bitstream to generate a quantized coefficient and some syntax elements. The entropy decoder 203 forwards the syntax elements to the prediction processing unit 208. The video decoder 200 may receive syntax elements/a syntax element at a video slice level and/or an image block level.

When the video slice is decoded into an intra-decoded (I) slice, the intra predictor 209 of the prediction processing unit 208 may generate a prediction block of the image block of the current video slice based on a signaled intra prediction mode and data of a previously decoded block of a current frame or image. When the video slice is decoded into an inter-decoded (in other words, B or P) slice, the inter predictor 210 of the prediction processing unit 208 may determine, based on the syntax element received from the entropy decoder 203, an inter prediction mode used to decode a current image block of the current video slice, and decode (for example, perform inter prediction on) the current image block based on the determined inter prediction mode. For example, the inter predictor 210 may determine whether to use a new inter prediction mode to predict the current image block of the current video slice. If the syntax element indicates to use the new inter prediction mode to predict the current image block, the inter predictor 210 predicts motion information of the current image block of the current video slice or motion information of a subblock of the current image block based on the new inter prediction mode (for example, a new inter prediction mode indicated by the syntax element or a default new inter prediction mode), to obtain or generate a prediction block for the current image block or the subblock of the current image block based on the predicted motion information of the current image block or the predicted motion information of the subblock of the current image block by using a motion compensation process. The motion information herein may include reference image information and a motion vector. The reference image information may include but is not limited to unidirectional/bidirectional prediction information, a reference image list number, and a reference image index corresponding to a reference image list. For inter prediction, the prediction block may be generated from one of reference images in one of reference image lists. The video decoder 200 may construct the reference image lists, namely, a list 0 and a list 1, based on reference images stored in the DPB 207. A reference frame index of the current image may be included in one or more of a reference frame list 0 and a reference frame list 1. It should be understood that the inter predictor 210 herein performs the motion compensation process. The following describes in detail an inter prediction process of predicting, in various new inter prediction modes, the motion information of the current image block or the motion information of the subblock of the current image block by using motion information of a reference block.

In an example, the inter predictor 210 may predict a current to-be-decoded image block based on a syntax element that is related to the current to-be-decoded image block and that is obtained by decoding the bitstream (S401). Herein, the syntax element used for inter prediction of the current image block is referred to as inter prediction data for short, and the inter prediction data includes, for example, indication information of an inter prediction mode. The inter prediction mode in the embodiments of the present disclosure includes at least one of an affine transform model-based AMVP mode and an affine transform model-based merge mode. When the inter prediction data includes indication information of the affine transform model-based AMVP mode, the inter prediction data may further include an index value (or referred to as an index number) of a candidate motion vector list corresponding to the AMVP mode, and a motion vector difference (MVD) of a control point of the current block. When the inter prediction data includes indication information of the affine transform model-based merge mode, the inter prediction data may further include an index value (or referred to as an index number) of a candidate motion vector list corresponding to the merge mode. In addition, in an optional embodiment, the inter prediction data in the foregoing example may further include indication information of an affine transform model (a quantity of model parameters) of the current block.

In an embodiment, the inter predictor 210 may be configured to perform a related step in the following embodiment described in FIG. 9 or FIG. 12, to implement application, on a decoder side, of the motion vector prediction method described in the present disclosure.

The inverse quantizer 204 performs inverse quantization on, in other words, dequantizes, a quantized transform coefficient provided in the bitstream and decoded by the entropy decoder 203. An inverse quantization process may include: determining a to-be-applied quantization degree by using a quantization parameter calculated by the video encoder 100 for each image block in the video slice, and similarly determining a to-be-applied inverse quantization degree. The inverse transformer 205 applies inverse transform, for example, inverse DCT, inverse integer transform, or a conceptually similar inverse transform process, to the transform coefficient, to generate a pixel-domain residual block.

After the inter predictor 210 generates the prediction block used for the current image block or the subblock of the current image block, the video decoder 200 summates the residual block from the inverse transformer 205 and the corresponding prediction block generated by the inter predictor 210, to obtain a reconstructed block, in other words, a decoded image block. The summator 211 represents a component that performs the summation operation. When necessary, a loop filter (in or after a decoding loop) may be further used to smoothen pixels, or video quality may be improved in another manner. The filter unit 206 may represent one or more loop filters, for example, a deblocking filter, an adaptive loop filter (ALF), and a sample adaptive offset (SAO) filter. Although the filter unit 206 is shown as an in-loop filter in FIG. 2B, in another implementation, the filter unit 206 may be implemented as a post-loop filter. In an example, the filter unit 206 is applicable to the reconstructed block to reduce block distortion, and the result is output as a decoded video stream. In addition, a decoded image block in a given frame or image may further be stored in the decoded image buffer 207, and the decoded image buffer 207 stores a reference image used for subsequent motion compensation. The decoded image buffer 207 may be a part of a memory, and may further store a decoded video for subsequent presentation on a display apparatus (for example, the display apparatus 220 in FIG. 1). Alternatively, the decoded image buffer 207 may be separated from such a memory.

It should be understood that other structural variants of the video decoder 200 can be used to decode the encoded video bitstream. For example, the video decoder 200 may generate an output video stream, without processing by the filter unit 206. Alternatively, for some image blocks or image frames, the entropy decoder 203 of the video decoder 200 does not obtain a quantized coefficient through decoding, and correspondingly, processing by the inverse quantizer 204 and the inverse transformer 205 is not required.

For example, in this embodiment of the present disclosure, the video decoder 200 is configured to perform the motion vector prediction method described in the following embodiments.

Figure 3:
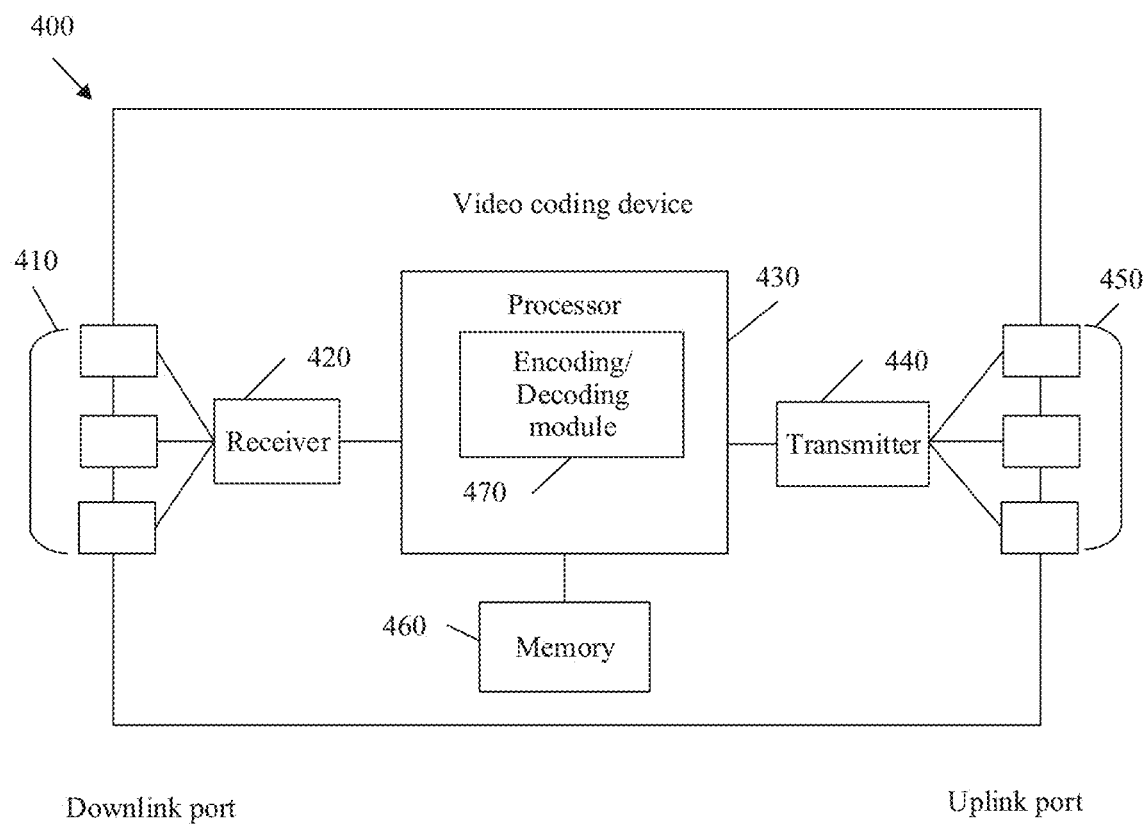
FIG. 3 is a block diagram showing an example of a video coding device for implementing embodiments of the present disclosure.

FIG. 3 is a schematic structural diagram of a video coding device 400 (for example, a video encoding device 400 or a video decoding device 400) according to an embodiment of the present disclosure. The video coding device 400 is applicable to the embodiments described in this specification. In an embodiment, the video coding device 400 may be a video decoder (for example, the video decoder 200 in FIG. 1) or a video encoder (for example, the video encoder 100 in FIG. 1). In another embodiment, the video coding device 400 may be one or more components in the video decoder 200 in FIG. 1 or the video encoder 100 in FIG. 1.

The video coding device 400 includes: ingress ports 410 and a receiver unit (Rx) 420 that are configured to receive data; a processor, a logic unit, or a central processing unit (CPU) 430 that is configured to process the data; a transmitter unit (Tx) 440 and egress ports 450 that are configured to transmit data; and a memory 460 configured to store the data. The video coding device 400 may further include an optical-to-electrical and electrical-to-optical (EO) conversion component coupled to the ingress ports 410, the receiver unit 420, the transmitter unit 440, and the egress ports 450, for egress or ingress of an optical or electrical signal.

The processor 430 is implemented by hardware and software. The processor 430 may be implemented as one or more CPU chips, cores (for example, a multi-core processor), FPGAs, ASICs, or DSPs. The processor 430 communicates with the ingress ports 410, the receiver unit 420, the transmitter unit 440, the egress ports 450, and the memory 460. The processor 430 includes a coding module 470 (for example, an encoding module 470 or a decoding module 470). The encoding/decoding module 470 implements the embodiments disclosed in this specification, to implement the motion vector prediction method provided in the embodiments of the present disclosure. For example, the encoding/decoding module 470 performs, processes, or provides various coding operations. Therefore, the encoding/decoding module 470 substantially improves functions of the video coding device 400 and affects transform of the video coding device 400 to a different state. Alternatively, the encoding/decoding module 470 is implemented as an instruction stored in the memory 460 and executed by the processor 430.

The memory 460 includes one or more disks, tape drives, and solid state drives, and may be used as an overflow data storage device, to store programs when such programs are selectively executed, and to store instructions and data that are read during program execution. The memory 460 may be volatile and/or non-volatile, and may be a read-only memory (ROM), a random access memory (RANI), a ternary content-addressable memory (ternary content-addressable memory, TCAM), and/or a static random access memory (SRAM).

It should be understood that, in the video encoder 100 and the video decoder 200 in this application, a processing result for a procedure may be output to a next procedure after being further processed. For example, after a procedure such as interpolation filtering, motion vector derivation, or loop filtering, an operation such as clipping or shift is further performed on a processing result for the corresponding procedure.

For example, a motion vector that is of a control point of a current image block and that is derived based on a motion vector of a neighboring affine coding block may be further processed. This is not limited in this application. For example, a value range of the motion vector is restricted, so that the motor vector is within a specific bit depth. Assuming that an allowed bit depth of the motion vector is bitDepth, a motion vector range is from $-2^{\wedge}(\text{bitDepth}-1)$ to $2^{\wedge}(\text{bitDepth}-1)-1$, where the symbol "^" represents a power. If bitDepth is 16, the value range is from $-32768$ to $32767$. If bitDepth is 18, the value range is from $-131072$ to $131071$. The value range of the motion vector may be restricted in either of the following two manners:

Manner 1: An overflowing high-order bit of the motion vector is removed:

$$ux = (vx + 2^{bitDepth})\%2^{bitDepth}$$

$$vx = (ux >= 2^{bitDepth-1})?(ux - 2^{bitDepth}):ux$$

$$uy = (vy + 2^{bitDepth})\%2^{bitDepth}$$

$$vy = (uy >= 2^{bitDepth-1})?(uy - 2^{bitDepth}):uy$$

For example, a value of vx is −32769, and 32767 is obtained according to the foregoing formulas. A value is stored in a computer in a two's complement form, a two's complement of −32769 is 1,0111,1111,1111,1111 (17 bits), and processing performed by the computer for overflowing is discarding a high-order bit. Therefore, the value of vx is 0111,1111,1111,1111, namely, 32767, which is consistent with the result obtained according to the formulas.

Manner 2: Clipping is performed on the motion vector, as shown in the following formulas:

$$vx = \text{Clip3}(-2^{bitDepth-1}, 2^{bitDepth-1} - 1, vx)$$
$$vy = \text{Clip3}(-2^{bitDepth-1}, 2^{bitDepth-1} - 1, vy)$$

In the foregoing formulas, Clip3 is defined as clipping a value of z to a range [x, y].

$$\text{Clip } 3(x, y, z) = \begin{cases} x; & z < x \\ y; & z > y \\ z; & \text{otherwise} \end{cases}$$

Figure 4:
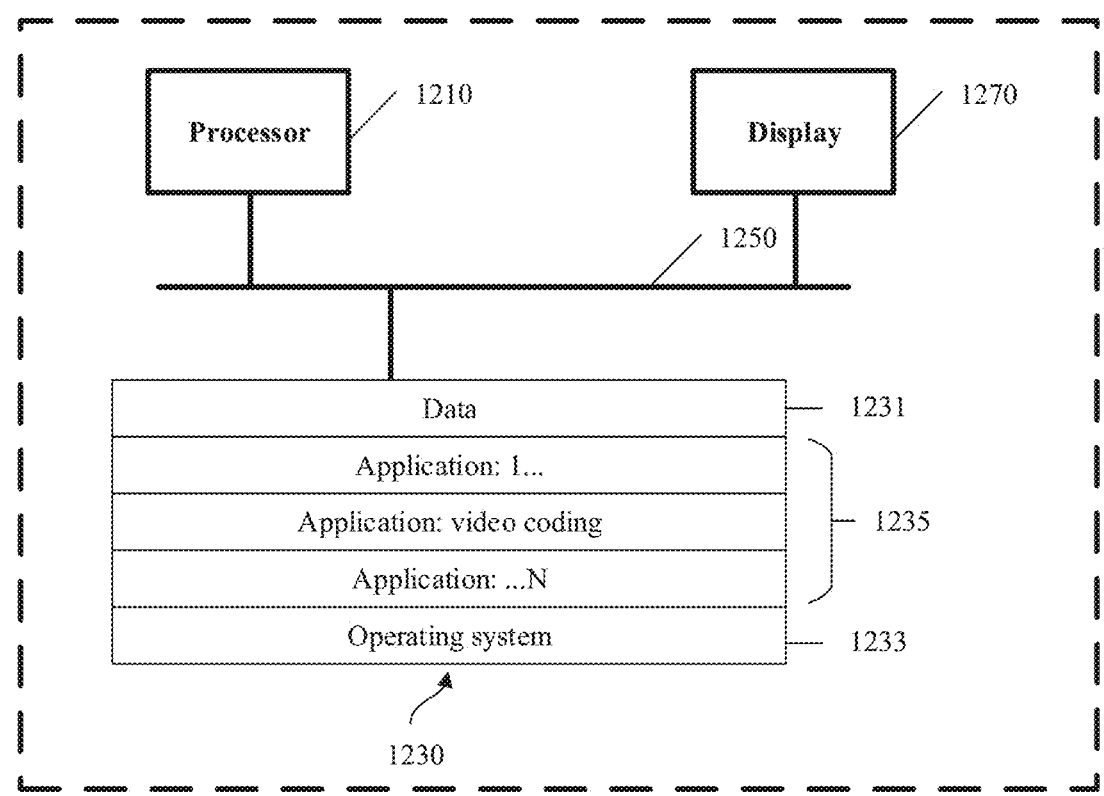
FIG. 4 is a block diagram showing an example of an encoding apparatus or a decoding apparatus for implementing embodiments of the present disclosure.

FIG. 4 is a schematic block diagram of an implementation of an encoding device or a decoding device (coding device 1200 for short) according to an embodiment of the present disclosure. The coding device 1200 may include a processor 1210, a memory 1230, and a bus system 1250. The processor and the memory are connected to each other by using the bus system. The memory is configured to store an instruction. The processor is configured to execute the instruction stored in the memory. The memory of the encoding device stores program code. The processor may invoke the program code stored in the memory, to perform various video encoding or decoding methods described in the embodiments of the present disclosure, particularly video encoding or decoding methods in various new inter prediction modes and motion information prediction methods in the new inter prediction modes. To avoid repetition, details are not described herein again.

In this embodiment of the present disclosure, the processor 1210 may be a central processing unit (Central Processing Unit, "CPU" for short), or the processor 1210 may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The memory 1230 may include a read-only memory (ROM) device or a random access memory (RAM) device. Any other appropriate type of storage device may also be used as the memory 1230. The memory 1230 may include code and data 1231 that are accessed by the processor 1210 by using the bus system 1250. The memory 1230 may further include an operating system 1233 and an application program 1235. The application program 1235 includes at least one program that allows the processor 1210 to perform the video encoding or decoding methods described in the embodiments of the present disclosure (particularly the motion vector prediction method described in the embodiments of the present disclosure). For example, the application program 1235 may include applications 1 to N, and further includes a video encoding or decoding application (video coding application for short) that performs the video encoding or decoding methods described in the embodiments of the present disclosure.

In addition to a data bus, the bus system 1250 may further include a power bus, a control bus, a status signal bus, and the like. However, for clear description, various types of buses in the figure are marked as the bus system 1250.

Optionally, the coding device 1200 may further include one or more output devices, for example, a display 1270. In an example, the display 1270 may be a touch display that combines a display and a touch unit that operably senses touch input. The display 1270 may be connected to the processor 1210 by using the bus 1250.

To better understand the technical solutions in the embodiments of the present disclosure, the following further describes an inter prediction mode, a non-translational motion model, an inherited control point motion vector prediction method, and a constructed control point motion vector prediction method in the embodiments of the present disclosure.

(1) Inter prediction mode. In HEVC, two inter prediction modes are used: an advanced motion vector prediction (advanced motion vector prediction, AMVP) mode and a merge (merge) mode.

In the AMVP mode, spatially or temporally neighboring encoded blocks (denoted as neighboring blocks) of a current block are first traversed. A candidate motion vector list (which may also be referred to as a motion information candidate list) is constructed based on motion information of the neighboring blocks. Then, an optimal motion vector is determined in the candidate motion vector list based on a rate-distortion cost, and candidate motion information with a minimum rate-distortion cost is used as a motion vector predictor (motion vector predictor, MVP) of the current block. Locations and a traversal order of the neighboring blocks are predefined. The rate-distortion cost is calculated according to a formula (1), where J represents the rate-distortion cost RD cost, SAD is a sum of absolute differences (sum of absolute differences, SAD) between an original pixel value and a predicted pixel value obtained through motion estimation by using a candidate motion vector predictor, R represents a bit rate, and λ represents a Lagrange multiplier. An encoder side transfers an index value of the selected motion vector predictor in the candidate motion vector list and a reference frame index value to a decoder side. Further, motion search is performed in a neighborhood centered on the MVP, to obtain an actual motion vector of the current block. The encoder side transfers a difference (motion vector difference) between the MVP and the actual motion vector to the decoder side.

$$J=\text{SAD}+\lambda R \tag{1}$$

Figure 5:
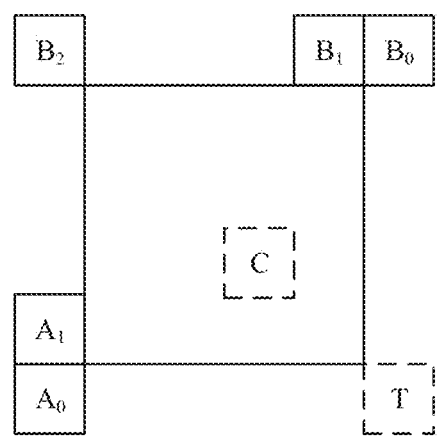
FIG. 5 is a schematic diagram showing a scenario in which an example operation is performed on a current block.

In the merge mode, a candidate motion vector list is first constructed based on motion information of spatially or temporally neighboring encoded blocks of a current block. Then, a rate-distortion cost is calculated to determine optimal motion information in the candidate motion vector list as motion information of the current block, and an index value (denoted as a merge index hereinafter) of a location of the optimal motion information in the candidate motion vector list is transferred to the decoder side. FIG. 5 shows spatial and temporal candidate motion information of the current block. The spatial candidate motion information is from five spatially neighboring blocks (A0, A1, B0, B1, and B2). If a neighboring block is unavailable (the neighboring block does not exist, or the neighboring block is not encoded, or a prediction mode used for the neighboring block is not the inter prediction mode), motion information of the neighboring block is not added to the candidate motion vector list. The temporal candidate motion information of the current block is obtained by scaling an MV of a block at a corresponding location in a reference frame based on picture order counts (picture order count, POC) of the reference frame and a current frame. Whether a block at a location T in the reference frame is available is first determined. If the block is unavailable, a block at a location C is selected.

Similar to the AMVP mode, in the merge mode, locations and a traversal order of the neighboring blocks are also predefined. In addition, the locations and the traversal order of the neighboring blocks may be different in different modes.

It can be learned that a candidate motion vector list needs to be maintained in both the AMVP mode and the merge mode. Before new motion information is added to the candidate list each time, whether same motion information already exists in the list is first checked. If the same motion information exists in the list, the motion information is not added to the list. This checking process is referred to as pruning of the candidate motion vector list. Pruning of the list is to avoid the same motion information in the list, to avoid redundant rate-distortion cost calculation.

During inter prediction in HEVC, same motion information is used for all pixels in a coding block (in other words, motion of all the pixels in the coding block is consistent), and then motion compensation is performed based on the motion information, to obtain a pixel predictor of the coding block. In the coding block, however, not all pixels have same motion characteristics. Using the same motion information may result in inaccurate motion-compensated prediction and more residual information.

In other words, in an existing video coding standard, block-matching motion estimation based on a translational motion model is used. However, in the real world, there are a variety of movements. Many objects, for example, a rotating object, a roller coaster rotating in different directions, fireworks, and some stunts in movies, are not in translational motion. If these moving objects, especially those in a UGC scenario, are encoded by using a block motion compensation technology based on the translational motion model in the current coding standard, coding efficiency is greatly affected. Therefore, the non-translational motion model, for example, an affine motion model, is introduced to further improve the coding efficiency.

On this basis, in terms of different motion models, the AMVP mode may be classified into a translational model-based AMVP mode and a non-translational model-based AMVP mode, and the merge mode may be classified into a translational model-based merge mode and a non-translational model-based merge mode.

(2) Non-translational motion model. In non-translational motion model-based prediction, a codec side uses one motion model to derive motion information of each motion compensation subunit in a current block, and performs motion compensation based on the motion information of the motion compensation subunit to obtain a prediction block. This can improve prediction efficiency. The motion compensation subunit in the embodiments of the present disclosure may be a sample or a pixel block that is obtained through splitting according to a specific method and whose size is $N_1 \times N_2$, where $N_1$ and $N_2$ are both positive integers, and $N_1$ may be equal to $N_2$ or may not be equal to $N_2$.

Frequently used non-translational motion models include a 4-parameter affine transform model and a 6-parameter affine transform model, and further include an 8-parameter bilinear model in a possible application scenario. These models are separately described below.

The 4-parameter affine transform model is shown in the following formula (2):

$$\begin{cases} vx = a_1 + a_3 x + a_4 y \\ vy = a_2 - a_4 x + a_3 y \end{cases} \quad (2)$$

The 4-parameter affine transform model may be represented by using motion vectors of two samples and coordinates of the two samples relative to a sample in the top-left corner of a current block. A sample used for representing a motion model parameter is referred to as a control point. If the sample in the top-left corner (0, 0) and a sample in the top-right corner (W, 0) are used as control points, motion vectors (vx0, vy0) and (vx1, vy1) of the control points in the top-left corner and the top-right corner of the current block are first determined. Then, motion information of each motion compensation subunit of the current block is obtained according to the following formula (3), where (x, y) is coordinates of a motion compensation subunit relative to the sample in the top-left corner of the current block, and W represents the width of the current block.

$$\begin{cases} vx = \dfrac{vx_1 - vx_0}{W} x - \dfrac{vy_1 - vy_0}{W} y + vx_0 \\ vy = \dfrac{vy_1 - vy_0}{W} x + \dfrac{vx_1 - vx_0}{W} y + vy_0 \end{cases} \quad (3)$$

The 6-parameter affine transform model is shown in the following formula (4):

$$\begin{cases} vx = a_1 + a_3 x + a_4 y \\ vy = a_2 + a_5 x + a_6 y \end{cases} \quad (4)$$

The 6-parameter affine transform model may be represented by using motion vectors of three samples and coordinates of the three samples relative to a sample in the top-left corner of a current block. If the sample in the top-left corner (0, 0), a sample in the top-right corner (W, 0), and a sample in the bottom-left corner (0, H) are used as control points, motion vectors of the control points in the top-left corner, the top-right corner, and the bottom-left corner of the current block are first determined and are (vx0, vy0), (vx1, vy1), and (vx2, vy2) respectively. Then, motion information of each motion compensation subunit of the current block is obtained according to the following formula (5), where (x, y) is coordinates of a motion compensation subunit relative to the sample in the top-left corner of the current block, and W and H represent the width and the height of the current block respectively.

$$\begin{cases} vx = \dfrac{vx_1 - vx_0}{W} x + \dfrac{vx_2 - vy_0}{H} y + vx_0 \\ vy = \dfrac{vy_1 - vy_0}{W} x + \dfrac{vy_2 - vx_0}{H} y + vy_0 \end{cases} \quad (5)$$

The 8-parameter bilinear model is shown in the following formula (6):

$$\begin{cases} vx = a_1 + a_3x + a_4y + a_7xy \\ vy = a_2 + a_5x + a_6y + a_8xy \end{cases} \quad (6)$$

The 8-parameter bilinear model may be represented by using motion vectors of four samples and coordinates of the four samples relative to a sample in a top-left corner of a current coding block. If the sample in the top-left corner (0, 0), a sample in the top-right corner (W, 0), a sample in the bottom-left corner (0, H), and a sample in the bottom-right corner (W, H) are used as control points, motion vectors (vx0, vy0), (vx1, vy1), (vx2, vy2), and (vx3, vy3) of the control points in the top-left corner, the top-right corner, the bottom-left corner, and the bottom-right corner of the current coding block are first determined. Then, motion information of each motion compensation subunit of the current coding block is derived according to the following formula (7), where (x, y) is coordinates of a motion compensation subunit relative to the sample in the top-left corner of the current coding block, and W and H are the width and the height of the current coding block respectively.

$$\begin{cases} v_x = \frac{v_{1x} - v_{0x}}{W}x + \frac{v_{2x} - v_{0x}}{H}y + \frac{v_{3x} + v_{0x} - v_{1x} - v_{2x}}{WH}y + v_{0x} \\ v_y = \frac{v_{1y} - v_{0y}}{W}x + \frac{v_{2y} - v_{0y}}{H}y + \frac{v_{3y} + v_{0y} - v_{1y} - v_{2y}}{WH}y + v_{0y} \end{cases} \quad (7)$$

A coding block predicted by using an affine transform model may also be referred to as an affine coding block. It can be learned from the foregoing description that the affine transform model is directly related to motion information of a control point of the affine coding block.

Usually, the motion information of the control point of the affine coding block may be obtained by using an affine transform model-based AMVP mode or an affine transform model-based merge mode. In the affine transform model-based AMVP mode or the affine transform model-based merge mode, the motion information of the control point of the affine coding block may be obtained according to an inherited control point motion vector prediction method or a constructed control point motion vector prediction method. The following further describes the two methods.

(3) Inherited control point motion vector prediction method. In the inherited control point motion vector prediction method, a candidate motion vector of a control point of a current block is determined by using an affine transform model of a neighboring encoded affine coding block of the current block. A parameter quantity (for example, four parameters, six parameters, or eight parameters) of the affine transform model of the affine coding block is the same as that of an affine transform model of the current block.

Figure 6:
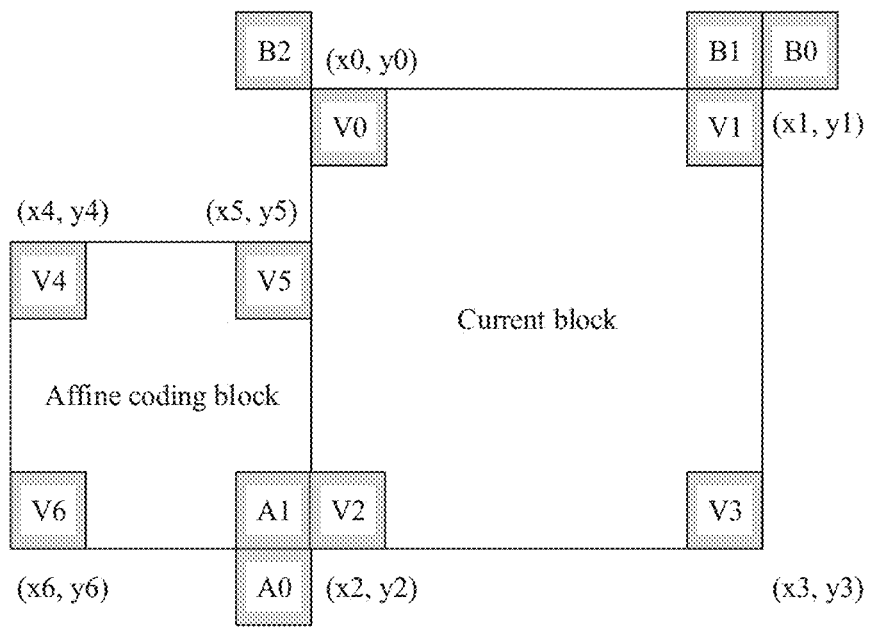
FIG. 6 is a schematic diagram showing a scenario in which another example operation is performed on a current block.

A current block shown in FIG. 6 is used as an example. Neighboring blocks of the current block are traversed in a specified order, for example, A1→B1→B0→A0→B2, to find an affine coding block in which a neighboring block of the current block is located, and obtain motion information of a control point of the affine coding block. Further, a motion vector (for a merge mode) of a control point or a motion vector predictor (for an AMVP mode) of a control point is derived for the current block by using an affine transform model constructed based on the motion information of the control point of the affine coding block. The order A1→B1→B0→A0→B2 is merely used as an example. Another combination order is also applicable to the embodiments of the present disclosure. In addition, the neighboring blocks are not limited to A1, B1, B0, A0, and B2. The neighboring block may be a sample, or may be a pixel block that is of a preset size and that is obtained according to a particular splitting method, for example, a 4×4 pixel block, a 4×2 pixel block, or a pixel block of another size. This is not limited. The affine coding block is an encoded block (which may also be referred to as a neighboring affine coding block for short) that is adjacent to the current block and that is predicted by using the affine transform model in an encoding phase.

The following uses A1 shown in FIG. 6 as an example to describe a process of determining the candidate motion vector of the control point of the current block. Other cases are deduced by analogy.

If an affine coding block in which A1 is located is a 4-parameter affine coding block (in other words, the affine coding block is predicted by using a 4-parameter affine transform model), a motion vector (vx4, vy4) of the top-left corner (x4, y4) of the affine coding block and a motion vector (vx5, vy5) of the top-right corner (x5, y5) of the affine coding block are obtained.

Then, a motion vector (vx0, vy0) of the top-left corner (x0, y0) of the current block is calculated according to the following formula (8):

$$\begin{cases} vx_0 = vx_4 + \frac{(vx_5 - vx_4)}{x_5 - x_4} \times (x_0 - x_4) - \frac{(vy_5 - vy_4)}{x_5 - x_4} \times (y_0 - y_4) \\ vy_0 = vy_4 + \frac{(vy_5 - vy_4)}{x_5 - x_4} \times (x_0 - x_4) + \frac{(vx_5 - vx_4)}{x_5 - x_4} \times (y_0 - y_4) \end{cases} \quad (8)$$

A motion vector (vx1, vy1) of the top-right corner (x1, y1) of the current block is calculated according to the following formula (9):

$$\begin{cases} vx_1 = vx_4 + \frac{(vx_5 - vx_4)}{x_5 - x_4} \times (x_1 - x_4) - \frac{(vy_5 - vy_4)}{x_5 - x_4} \times (y_1 - y_4) \\ vy_1 = vy_4 + \frac{(vy_5 - vy_4)}{x_5 - x_4} \times (x_1 - x_4) + \frac{(vx_5 - vx_4)}{x_5 - x_4} \times (y_1 - y_4) \end{cases} \quad (9)$$

A combination of the motion vector (vx0, vy0) of the top-left corner (x0, y0) of the current block and the motion vector (vx1, vy1) of the top-right corner (x1, y1) of the current block that are obtained based on the affine coding block in which A1 is located is the candidate motion vector of the control point of the current block.

If the coding block in which A1 is located is a 6-parameter affine coding block (in other words, the affine coding block is predicted by using a 6-parameter affine transform model), the motion vector (vx4, vy4) of the top-left corner (x4, y4) of the affine coding block, the motion vector (vx5, vy5) of the top-right corner (x5, y5) of the affine coding block, and a motion vector (vx6, vy6) of the bottom-left corner (x6, y6) of the affine coding block are obtained.

Then, the motion vector (vx0, vy0) of the top-left corner (x0, y0) of the current block is calculated according to the following formula (10):

$$\begin{cases} vx_0 = vx_4 + \frac{(vx_5 - vx_4)}{x_5 - x_4} \times (x_0 - x_4) + \frac{(vx_6 - vx_4)}{y_6 - y_4} \times (y_0 - y_4) \\ vy_0 = vy_4 + \frac{(vy_5 - vy_4)}{x_5 - x_4} \times (x_0 - x_4) + \frac{(vy_6 - vy_4)}{y_6 - y_4} \times (y_0 - y_4) \end{cases} \quad (10)$$

The motion vector (vx1, vy1) of the top-right corner (x1, y1) of the current block is calculated according to the following formula (11):

$$\begin{cases} vx_1 = vx_4 + \frac{(vx_5 - vx_4)}{x_5 - x_4} \times (x_1 - x_4) + \frac{(vx_6 - vx_4)}{y_6 - y_4} \times (y_1 - y_4) \\ vy_1 = vy_4 + \frac{(vy_5 - vy_4)}{x_5 - x_4} \times (x_1 - x_4) + \frac{(vy_6 - vy_4)}{y_6 - y_4} \times (y_1 - y_4) \end{cases} \quad (11)$$

A motion vector (vx2, vy2) of the bottom-left corner (x2, y2) of the current block is calculated according to the following formula (12):

$$\begin{cases} vx_2 = vx_4 + \frac{(vx_5 - vx_4)}{x_5 - x_4} \times (x_2 - x_4) + \frac{(vx_6 - vx_4)}{y_6 - y_4} \times (y_2 - y_4) \\ vy_2 = vy_4 + \frac{(vy_5 - vy_4)}{x_5 - x_4} \times (x_2 - x_4) + \frac{(vy_6 - vy_4)}{y_6 - y_4} \times (y_2 - y_4) \end{cases} \quad (12)$$

A combination of the motion vector (vx0, vy0) of the top-left corner (x0, y0), the motion vector (vx1, vy1) of the top-right corner (x1, y1), and the motion vector (vx2, vy2) of the bottom-left corner (x2, y2) of the current block that are obtained based on the affine coding block in which A1 is located is the candidate motion vector of the control point of the current block.

It should be noted that another motion model, candidate location, and search and traversal order are also applicable to the embodiments of the present disclosure. Details are not described in the embodiments of the present disclosure.

It should be noted that a method for representing motion models of the current and neighboring coding blocks by using other control points may also be applicable to the embodiments of the present disclosure. Details are not described herein.

(4) Constructed control point motion vector prediction method. In the constructed control point motion vector prediction method, motion vectors of neighboring encoded blocks of a control point of a current block are combined as a motion vector of a control point of a current affine coding block, and there is no need to consider whether the neighboring encoded blocks are affine coding blocks. Constructed control point motion vector prediction methods based on different prediction modes (an affine transform model-based AMVP mode and an affine transform model-based merge mode) are different, and are separately described in the following.

A constructed control point motion vector prediction method based on the affine transform model-based AMVP mode is first described.

Figure 7:
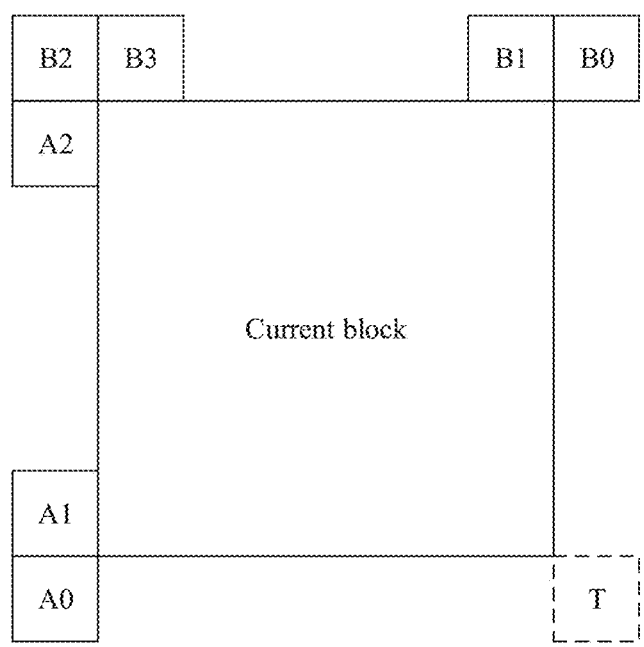
FIG. 7 is a schematic diagram showing a scenario in which another example operation is performed on a current block.

FIG. 7 is used as an example to describe the constructed control point motion vector prediction method, to determine motion vectors of the top-left corner and the top-right corner of a current block by using motion information of a neighboring encoded block of the current coding block.

If the current block is a 4-parameter affine coding block (in other words, the current block is predicted by using a 4-parameter affine transform model), a motion vector of an encoded block A2, B2, or B3 adjacent to the top-left corner may be used as a candidate motion vector of the motion vector of the top-left corner of the current block. A motion vector of an encoded block B1 or B0 adjacent to the top-right corner is used as a candidate motion vector of the motion vector of the top-right corner of the current block. The candidate motion vectors of the top-left corner and the top-right corner are combined to constitute a plurality of 2-tuples. Motion vectors of two encoded blocks included in a 2-tuple may be used as candidate control point motion vectors of the current block. The plurality of 2-tuples are shown as follows (13A):

$$(v_{A2},v_{B1}),(v_{A2},v_{B0}),(v_{B2},v_{B1}),(v_{B2},v_{B0}),(v_{B3},v_{B1}),(v_{B3},v_{B0}) \quad (13A)$$

$v_{A2}$ represents the motion vector of A2, $v_{B1}$ represents the motion vector of B1, $v_{B0}$ represents the motion vector of B0, $v_{B2}$ represents the motion vector of B2, and $v_{B3}$ represents the motion vector of B3.

If the current block is a 6-parameter affine coding block (in other words, the current block is predicted by using a 6-parameter affine transform model), a motion vector of an encoded block A2, B2, or B3 adjacent to the top-left corner may be used as a candidate motion vector of the motion vector of the top-left corner of the current block. A motion vector of an encoded block B1 or B0 adjacent to the top-right corner is used as a candidate motion vector of the motion vector of the top-right corner of the current block. A motion vector of an encoded block A0 or A1 adjacent to the bottom-left corner is used as a candidate motion vector of a motion vector of the bottom-left corner of the current block. The candidate motion vectors of the top-left corner, the top-right corner, and the bottom-left corner are combined to constitute a plurality of triplets. Motion vectors of three encoded blocks included in a triplet may be used as candidate control point motion vectors of the current block. The plurality of triplets are shown as follows ((13B) and (13C)):

$$(v_{A2},v_{B1},v_{A0}),(v_{A2},v_{B0},v_{A0}),(v_{B2},v_{B1},v_{A0}),(v_{B2},v_{B0},v_{A0}), \\ (v_{B3},v_{B1},v_{A0}),(v_{B3},v_{B0},v_{A0}) \quad (13B)$$

$$(v_{A2},v_{B1},v_{A1}),(v_{A2},v_{B0},v_{A1}),(v_{B2},v_{B1},v_{A1}),(v_{B2},v_{B0},v_{A1}), \\ (v_{B3},v_{B1},v_{A1}),(v_{B3},v_{B0},v_{A1}) \quad (13C)$$

$v_{A2}$ represents the motion vector of A2, $v_{B1}$ represents the motion vector of B1, $v_{130}$ represents the motion vector of B0, $v_{B2}$ represents the motion vector of B2, $v_{B3}$ represents the motion vector of B3, $v_{A0}$ represents the motion vector of A0, and $v_m$ represents the motion vector of A1.

It should be noted that FIG. 7 is merely an example. It should be noted that another method for combining control point motion vectors may also be applicable to the embodiments of the present disclosure. Details are not described herein.

It should be noted that a method for representing motion models of the current and neighboring coding blocks by using other control points may also be applicable to the embodiments of the present disclosure. Details are not described herein.

The following describes a constructed control point motion vector prediction method based on the affine transform model-based merge mode.

Figure 8:
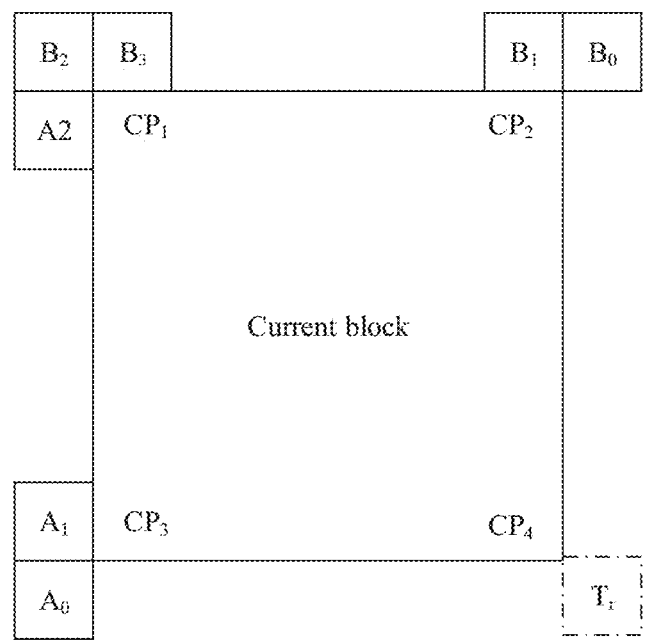
FIG. 8 is a schematic diagram showing a scenario in which another example operation is performed on a current block.

FIG. 8 is used as an example to describe the constructed control point motion vector prediction method, to determine motion vectors of the top-left corner and the top-right corner of a current block by using motion information of a neighboring encoded block of the current coding block. It should be noted that FIG. 8 is merely an example.

As shown in FIG. 8, CPk (k=1, 2, 3, 4) represents the $k^{th}$ control point. A0, A1, A2, B0, B1, B2, and B3 are spatially neighboring locations of the current block and are used to predict CP1, CP2, or CP3. T is a temporally neighboring location of the current block and is used to predict CP4. It is assumed that coordinates of CP1, CP2, CP3, and CP4 are (0, 0), (W, 0), (H, 0), and (W, H) respectively, where W and H represent the width and the height of the current block. In this case, motion information of each control point of the current block is obtained in the following order:

1. For CP1, a check order is B2→A2→B3. If B2 is available, motion information of B2 is used. Otherwise, A2 and B3 are checked. If motion information of all the three locations is unavailable, motion information of CP1 cannot be obtained.

2. For CP2, a check order is B0→B1. If B0 is available, motion information of B0 is used for CP2. Otherwise, B1 is checked. If motion information of both locations is unavailable, motion information of CP2 cannot be obtained.

3. For CP3, a check order is A0→A1.

4. For CP4, motion information of T is used.

Herein, that X is available means that a block at a location X (X is A0, A1, A2, B0, B1, B2, B3, or T) is already encoded and an inter prediction mode is used for the block. Otherwise, the location X is unavailable. It should be noted that another method for obtaining control point motion information may also be applicable to the embodiments of the present disclosure. Details are not described herein.

Then, control point motion information of the current block is combined to obtain constructed control point motion information.

If the 4-parameter affine transform model is used for the current block, motion information of two control points of the current block is combined to constitute a 2-tuple, to construct the 4-parameter affine transform model. The two control points may be combined as follows: {CP1, CP4}, {CP2, CP3}, {CP1, CP2}, {CP2, CP4}, {CP1, CP3}, and {CP3, CP4}. For example, a 4-parameter affine transform model constructed by using a 2-tuple including the control points CP1 and CP2 may be denoted as Affine (CP1, CP2).

If the 6-parameter affine transform model is used for the current block, motion information of three control points of the current block is combined to constitute a triplet, to construct the 6-parameter affine transform model. The three control points may be combined as follows: {CP1, CP2, CP4}, {CP1, CP2, CP3}, {CP2, CP3, CP4}, and {CP1, CP3, CP4}. For example, a 6-parameter affine transform model constructed by using a triplet including the control points CP1, CP2, and CP3 may be denoted as Affine (CP1, CP2, CP3).

If an 8-parameter bilinear model is used for the current block, motion information of four control points of the current block is combined to constitute a quadruple, to construct the 8-parameter bilinear model. An 8-parameter bilinear model constructed by using a quadruple including the control points CP1, CP2, CP3, and CP4 may be denoted as Bilinear (CP1, CP2, CP3, CP4).

In this specification, for ease of description, a combination of motion information of two control points (or two encoded blocks) is referred to as a 2-tuple for short, a combination of motion information of three control points (or three encoded blocks) is referred to as a triplet for short, and a combination of motion information of four control points (or four encoded blocks) is referred to as a quadruple for short.

These models are traversed in a preset order. If motion information of a control point corresponding to a combination model is unavailable, it is considered that the model is unavailable. Otherwise, a reference frame index of the model is determined, and a motion vector of the control point is scaled. If motion information of all control points after scaling is consistent, the model is invalid. If all motion information of control points controlling the model is available, and the model is valid, the motion information of the control points used to construct the model is added to a motion information candidate list.

A method for scaling a control point motion vector is shown in the following formula (14):

$$MV_s = \frac{CurPoc - DesPoc}{CurPoc - SrcPoc} \times MV \tag{14}$$

CurPoc represents a POC number of a current frame, DesPoc represents a POC number of a reference frame of the current block, SrcPoc represents a POC number of a reference frame of a control point, $Mv_3$ represents a motion vector obtained through scaling, and MV represents a motion vector of the control point.

It should be noted that a combination of different control points may alternatively be converted into control points at a same location.

For example, a 4-parameter affine transform model obtained through a combination {CP1, CP4}, {CP2, CP3}, {CP2, CP4}, {CP1, CP3}, or {CP3, CP4} is represented by {CP1, CP2} or {CP1, CP2, CP3}. A conversion method is: substituting a motion vector and coordinate information of a control point into the foregoing formula (2), to obtain a model parameter; and then substituting coordinate information of {CP1, CP2} into the foregoing formula (3), to obtain the motion vector of the control point.

More directly, conversion may be performed according to the following formulas (15) to (23), where W represents the width of the current block, and H represents the height of the current block. In the formulas (15) to (23), $(vx_0, vy_0)$ represents a motion vector of CP1, and $(vx_1, vy1)$ represents a motion vector of CP2, $(vx_2, vy_2)$ represents a motion vector of CP3, and $(vx_3, vy_3)$ represents a motion vector of CP4.

{CP1, CP2} may be converted into {CP1, CP2, CP3} according to the following formula (15). In other words, the motion vector of CP3 in {CP1, CP2, CP3} may be determined according to the formula (15):

$$\begin{cases} vx_2 = -\frac{vy_1 - vy_0}{W} H + vx_0 \\ vy_2 = +\frac{vx_1 - vx_0}{W} H + vy_0 \end{cases} \tag{15}$$

{CP1, CP3} may be converted into {CP1, CP2} or {CP1, CP2, CP3} according to the following formula (16):

$$\begin{cases} vx_1 = +\frac{vy_2 - vy_0}{H} W + vx_0 \\ vy_1 = -\frac{vx_2 - vx_0}{H} W + vy_0 \end{cases} \tag{16}$$

{CP2, CP3} may be converted into {CP1, CP2} or {CP1, CP2, CP3} according to the following formula (17):

$$\begin{cases} vx_0 = \frac{vx_2 - vx_1}{W*W + H*H} W*W - \frac{vy_2 - vy_1}{W*W + H*H} H*W + vx_1 \\ vy_0 = \frac{vy_2 - vy_1}{W*W + H*H} W*W + \frac{vx_2 - vx_1}{W*W + H*H} H*W + vy_1 \end{cases} \tag{17}$$

{CP1, CP4} may be converted into {CP1, CP2} or {CP1, CP2, CP3} according to the following formula (18) or (19):

$$\begin{cases} vx_1 = \frac{vx_3 - vx_0}{W*W + H*H} W*W + \frac{vy_3 - vy_0}{W*W + H*H} H*W + vx_0 \\ vy_1 = \frac{vy_3 - vy_0}{W*W + H*H} W*W - \frac{vx_3 - vx_0}{W*W + H*H} H*W + vy_0 \end{cases} \quad (18)$$

$$\begin{cases} vx_2 = \frac{vx_3 - vx_0}{W*W + H*H} W*W + \frac{vy_3 - vy_0}{W*W + H*H} H*W + vx_0 \\ vy_2 = \frac{vy_3 - vy_0}{W*W + H*H} W*W - \frac{vx_3 - vx_0}{W*W + H*H} H*W + vy_0 \end{cases} \quad (19)$$

{CP2, CP4} may be converted into {CP1, CP2} according to the following formula (20), and {CP2, CP4} may be converted into {CP1, CP2, CP3} according to the following formulas (20) and (21):

$$\begin{cases} vx_0 = -\frac{vy_8 - vy_1}{H} W + vx_1 \\ vy_0 = +\frac{vx_8 - vx_1}{H} W + vy_1 \end{cases} \quad (20)$$

$$\begin{cases} vx_2 = -\frac{vy_8 - vy_1}{H} W + vx_3 \\ vy_2 = +\frac{vx_8 - vx_1}{H} W + vy_3 \end{cases} \quad (21)$$

{CP3, CP4} may be converted into {CP1, CP2} according to the following formula (22), and {CP3, CP4} may be converted into {CP1, CP2, CP3} according to the following formulas (22) and (23):

$$\begin{cases} vx_0 = +\frac{vy_8 - vy_2}{W} H + vx_2 \\ vy_0 = -\frac{vx_8 - vx_2}{W} H + vy_2 \end{cases} \quad (22)$$

$$\begin{cases} vx_1 = +\frac{vy_8 - vy_2}{W} H + vx_3 \\ vy_1 = -\frac{vx_8 - vx_2}{W} H + vy_3 \end{cases} \quad (23)$$

For example, a 6-parameter affine transform model obtained through a combination {CP1, CP2, CP4}, {CP2, CP3, CP4}, or {CP1, CP3, CP4} is represented by the control points {CP1, CP2, CP3}. A conversion method is: substituting a motion vector and coordinate information of a control point into the foregoing formula (4), to obtain a model parameter; and then substituting coordinate information of {CP1, CP2, CP3} into the foregoing formula (5), to obtain the motion vector of the control point.

More directly, conversion may be performed according to the following formulas (24) to (26), where W represents the width of the current block, and H represents the height of the current block. In the formulas (24) to (26), ($vx_0$, $vy_0$) represents the motion vector of CP1, and ($vx_1$, $vy_1$) represents the motion vector of CP2, ($vx_1$, $vy_1$) represents the motion vector of CP3, and ($vx_3$, $vy_3$) represents the motion vector of CP4.

{CP1, CP2, CP4} may be converted into {CP1, CP2, CP3} according to the formula (22):

$$\begin{cases} vx_2 = vx_3 + vx_0 - vx_1 \\ vy_2 = vy_3 + vy_0 - vy_1 \end{cases} \quad (24)$$

{CP2, CP3, CP4} may be converted into {CP1, CP2, CP3} according to the formula (23):

$$\begin{cases} vx_0 = vx_1 + vx_2 - vx_3 \\ vy_0 = vy_1 + vy_2 - vy_3 \end{cases} \quad (25)$$

{CP1, CP3, CP4} may be converted into {CP1, CP2, CP3} according to the formula (24):

$$\begin{cases} vx_1 = vx_3 + vx_0 - vx_2 \\ vy_1 = vy_3 + vy_0 - vy_2 \end{cases} \quad (26)$$

In an embodiment, after currently constructed control point motion information is added to a candidate motion vector list, if a length of the candidate list is less than a maximum list length (for example, MaxAffineNumMrgCand), these combinations are traversed in a preset order, and an obtained valid combination is used as candidate motion information of a control point. If the candidate motion vector list is empty, the candidate motion information of the control point is added to the candidate motion vector list. Otherwise, motion information in the candidate motion vector list is sequentially traversed, and whether motion information that is the same as the candidate motion information of the control point exists in the candidate motion vector list is checked. If the motion information that is the same as the candidate motion information of the control point does not exist in the candidate motion vector list, the candidate motion information of the control point is added to the candidate motion vector list.

For example, a preset order is as follows: Affine (CP1, CP2, CP3)→Affine (CP1, CP2, CP4)→Affine (CP1, CP3, CP4)→Affine (CP2, CP3, CP4)→Affine (CP1, CP2)→Affine (CP1, CP3)→Affine (CP2, CP3)→Affine (CP1, CP4)→Affine (CP2, CP4)→Affine (CP3, CP4). There are 10 combinations in total.

If control point motion information corresponding to a combination is unavailable, it is considered that the combination is unavailable. If a combination is available, a reference frame index of the combination is determined (in a case of two control points, a minimum reference frame index is selected as the reference frame index of the combination; in a case of more than two control points, a reference frame index that appears most frequently is selected, and if quantities of times that a plurality of reference frame indexes appear are the same, a minimum reference frame index is selected as the reference frame index of the combination), and a control point motion vector is scaled. If motion information of all control points after scaling is consistent, the combination is invalid.

Optionally, in the embodiments of the present disclosure, the candidate motion vector list may alternatively be padded. For example, after the foregoing traversal process, if the length of the candidate motion vector list is less than the maximum list length (for example, MaxAffineNumMrgCand), the candidate motion vector list may be padded until the list length is equal to the maximum list length.

The padding may be performed by padding a zero motion vector, or by combining or weighted averaging existing candidate motion information in the existing list. It should be noted that another method for padding the candidate motion vector list may also be applicable to the embodiments of the present disclosure. Details are not described herein.

In an existing solution, for an inherited control point motion vector prediction method, a non-translational motion model used for a same image sequence is fixed, and quantities of parameters of affine transform models used for different blocks in an image are the same. In other words, a quantity of parameters of an affine transform model used for an affine coding block is the same as that of an affine transform model used for a current block. Therefore, a quantity of control points of the affine coding block is the same as that of the current block, and a location of a control point in the affine coding block is the same as a location of the control point in the current block.

For example, if the 4-parameter affine transform model is used for the affine coding block, the 4-parameter affine transform model is also used for the current block. A decoder side obtains motion vector information of each subblock of the current block based on the 4-parameter affine transform model of the current block, to reconstruct each subblock.

For another example, if the 8-parameter bilinear model is used for the affine coding block, the 8-parameter bilinear model is also used for the current block. The decoder side obtains the motion vector information of each subblock of the current block based on the 8-parameter bilinear model of the current block, to reconstruct each subblock.

Practice shows that affine motion of different blocks in an image may be different (in other words, affine motion of a current block may be different from affine motion of an affine coding block). Therefore, in an existing method in which the current block is parsed (for example, the candidate motion vector list is established) and reconstructed based on an affine transform model that has a same order as the affine coding block, coding efficiency and accuracy in predicting the current block are not high, and it is still difficult to satisfy a user requirement in some scenarios.

To overcome defects of the existing solution and improve coding efficiency and accuracy during prediction in a coding process, the inherited control point motion vector prediction method is improved in the embodiments of the present disclosure. There are two improved solutions: a first improved solution and a second improved solution. The first improved solution may also be referred to as a first motion model-based motion vector prediction method, and the second improved solution may also be referred to as a second motion model-based motion vector prediction method. The following separately describes the two methods.

(5) First motion model-based motion vector prediction method. In the first motion model-based motion vector prediction method, affine transform models used for different blocks of an image in an image sequence are not limited, in other words, different affine transform models may be used for the different blocks. In a process of encoding and decoding a current block, an affine transform model used for the current block is first determined. The affine transform model used for the current block may be predefined, or may be selected from a plurality of affine transform models based on an actual motion status or an actual requirement of the current block. It is assumed that a 2×N-parameter affine transform model is used for a neighboring block (also referred to as an affine coding block at an encoder side or an affine decoding block at a decoder side) of the current block, a 2×K-parameter affine transform model is used for the current block, and NKK. In this case, motion vectors (candidate motion vectors) of K control points of the current block are obtained through interpolation calculation based on the 2×N-parameter affine transform model used for the neighboring block.

Figure 10:
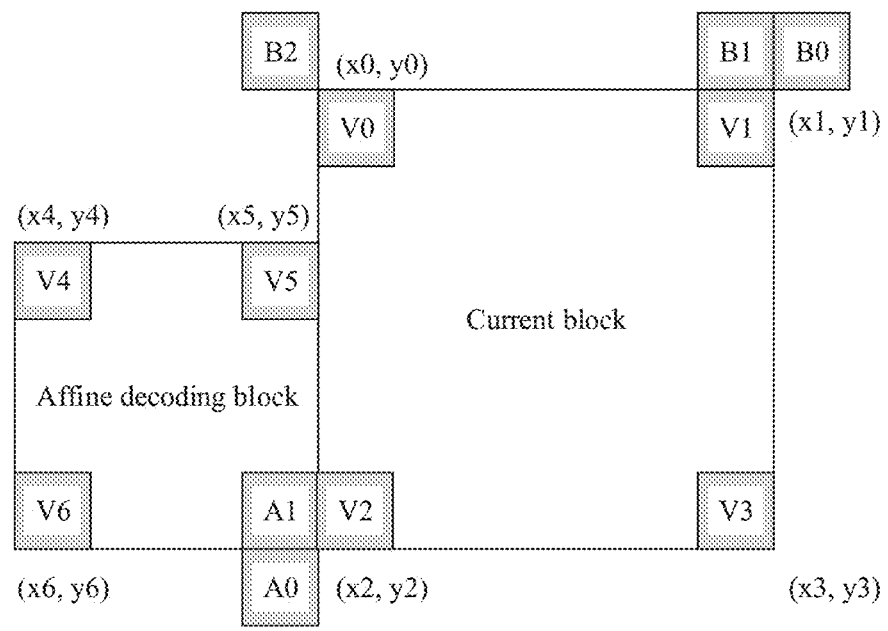
FIG. 10 is a schematic diagram showing a scenario in which another example operation is performed on a current block.

The following uses A1 shown in FIG. 10 as an example to describe a process of determining a candidate motion vector of a control point of the current block. The determining process is mainly described from a perspective of the decoder side. In this case, a neighboring block in which A1 is located is the affine decoding block. It may be understood that implementation on the encoder side may be deduced by analogy. In other words, on the encoder side, the neighboring block of the current block is the affine coding block. Details about the implementation are not described in this specification again.

For example, if a 6-parameter affine transform model is used for the affine decoding block in which A1 is located, and a 4-parameter affine transform model is used for the current block, a motion vector (vx4, vy4) of the top-left corner (x4, y4) of the affine decoding block, a motion vector (vx5, vy5) of the top-right corner (x5, y5) of the affine decoding block, and a motion vector (vx6, vy6) of the bottom-left corner (x6, y6) of the affine decoding block are obtained. According to the following formulas (27) and (28) for the 6-parameter affine transform model, interpolation calculation is separately performed by using a 6-parameter affine transform model constituted by the motion vectors of the foregoing three control points of the affine decoding block, to obtain a motion vector (vx0, vy0) of the top-left corner (x0, y0) of the current block and a motion vector (vx1, vy1) of the top-right corner (x1, y1) of the current block:

$$\begin{cases} vx_0 = vx_4 + \frac{(vx_5 - vx_4)}{x_5 - x_4} \times (x_0 - x_4) + \frac{(vx_6 - vx_4)}{y_6 - y_4} \times (y_0 - y_4) \\ vy_0 = vx_4 + \frac{(vy_5 - vy_4)}{x_5 - x_4} \times (x_0 - x_4) + \frac{(vy_6 - vy_4)}{y_6 - y_4} \times (y_0 - y_4) \end{cases} \quad (27)$$

$$\begin{cases} vx_1 = vx_4 + \frac{(vx_5 - vx_4)}{x_5 - x_4} \times (x_1 - x_4) + \frac{(vx_6 - vx_4)}{y_6 - y_4} \times (y_0 - y_4) \\ vy_1 = vx_4 + \frac{(vy_5 - vy_4)}{x_5 - x_4} \times (x_1 - x_4) + \frac{(vy_6 - vy_4)}{y_6 - y_4} \times (y_0 - y_4) \end{cases} \quad (28)$$

For another example, if a 4-parameter affine transform model is used for the affine decoding block in which A1 is located, and a 6-parameter affine transform model is used for the current block, a motion vector (vx4, vy4) of the top-left corner (x4, y4) of the affine decoding block and a motion vector (vx5, vy5) of the top-right corner (x5, y5) of the affine decoding block are obtained. In this case, motion vectors of two control points of the affine decoding block are obtained: the motion vector (vx4, vy4) of the top-left control point (x4, y4) and the motion vector (vx5, vy5) of the top-right control point (x5, y5). According to the following formulas (29), (30), and (31) for the 4-parameter affine transform model, interpolation calculation is separately performed by using a 4-parameter affine transform model constituted by the motion vectors of the two control points of the affine decoding block, to obtain a motion vector (vx0, vy0) of the top-left corner (x0, y0) of the current block, a motion vector (vx1, vy1) of the top-right corner (x1, y1) of the current block, and a motion vector (vx2, vy2) of the bottom-left corner (x2, y2) of the current block:

$$\begin{cases} vx_0 = vx_4 + \dfrac{(vx_5 - vx_4)}{x_5 - x_4} \times (x_0 - x_4) - \dfrac{(vy_5 - vy_4)}{x_5 - x_4} \times (y_0 - y_4) \\ vy_0 = vx_4 + \dfrac{(vy_5 - vy_4)}{x_5 - x_4} \times (x_0 - x_4) + \dfrac{(vx_5 - vx_4)}{x_5 - x_4} \times (y_0 - y_4) \end{cases} \quad (29)$$

$$\begin{cases} vx_1 = vx_4 + \dfrac{(vx_5 - vx_4)}{x_5 - x_4} \times (x_1 - x_4) - \dfrac{(vy_5 - vy_4)}{x_5 - x_4} \times (y_1 - y_4) \\ vy_1 = vx_4 + \dfrac{(vy_5 - vy_4)}{x_5 - x_4} \times (x_1 - x_4) + \dfrac{(vx_5 - vx_4)}{x_5 - x_4} \times (y_1 - y_4) \end{cases} \quad (30)$$

$$\begin{cases} vx_2 = vx_4 + \dfrac{(vx_5 - vx_4)}{x_5 - x_4} \times (x_2 - x_4) - \dfrac{(vy_5 - vy_4)}{x_5 - x_4} \times (y_2 - y_4) \\ vy_2 = vx_4 + \dfrac{(vy_5 - vy_4)}{x_5 - x_4} \times (x_2 - x_4) + \dfrac{(vx_5 - vx_4)}{x_5 - x_4} \times (y_2 - y_4) \end{cases} \quad (31)$$

It should be noted that the foregoing examples are merely used to explain the technical solutions of the present disclosure, but are not intended to limit the present disclosure. In addition, for a case in which other affine transform models are used for the current block and the neighboring block (for example, the 4-parameter affine transform model is used for the current block, and an 8-parameter bilinear model is used for the neighboring block; or the 6-parameter affine transform model is used for the current block, and an 8-parameter bilinear model is used for the neighboring block), refer to the implementation of the foregoing examples. Details are not described herein again.

It should further be noted that, in this solution, whether a quantity of model parameters of the current block is the same as that of the neighboring block is not limited. Therefore, in some implementation scenarios, the quantity of model parameters of the current block may also be the same as that of the neighboring block.

For example, if the 4-parameter affine transform model is used for the affine decoding block in which A1 is located, and the 4-parameter affine transform model is also used for the current block, the motion vector (vx4, vy4) of the top-left corner (x4, y4) of the affine decoding block and the motion vector (vx5, vy5) of the top-right corner (x5, y5) of the affine decoding block are obtained. According to the following formulas (32) and (33) for the 4-parameter affine transform model, interpolation calculation is separately performed by using the 4-parameter affine transform model constituted by the motion vectors of the foregoing two control points of the affine decoding block, to obtain the motion vector (vx0, vy0) of the top-left corner (x0, y0) of the current block and the motion vector (vx1, vy1) of the top-right corner (x1, y1) of the current block:

$$\begin{cases} vx_0 = vx_4 + \dfrac{(vx_5 - vx_4)}{x_5 - x_4} \times (x_0 - x_4) - \dfrac{(vy_5 - vy_4)}{x_5 - x_4} \times (y_0 - y_4) \\ vy_0 = vx_4 + \dfrac{(vy_5 - vy_4)}{x_5 - x_4} \times (x_0 - x_4) + \dfrac{(vx_5 - vx_4)}{x_5 - x_4} \times (y_0 - y_4) \end{cases} \quad (32)$$

$$\begin{cases} vx_1 = vx_4 + \dfrac{(vx_5 - vx_4)}{x_5 - x_4} \times (x_1 - x_4) - \dfrac{(vy_5 - vy_4)}{x_5 - x_4} \times (y_1 - y_4) \\ vy_1 = vx_4 + \dfrac{(vy_5 - vy_4)}{x_5 - x_4} \times (x_1 - x_4) + \dfrac{(vx_5 - vx_4)}{x_5 - x_4} \times (y_1 - y_4) \end{cases} \quad (33)$$

For another example, if the 6-parameter affine transform model is used for the affine decoding block in which A1 is located, and the 6-parameter affine transform model is used for the current block, the motion vector (vx4, vy4) of the top-left corner (x4, y4) of the affine decoding block, the motion vector (vx5, vy5) of the top-right corner (x5, y5) of the affine decoding block, and the motion vector (vx6, vy6) of the bottom-left corner (x6, y6) of the affine decoding block are obtained. According to the following formulas (34), (35), and (36) for the 6-parameter affine transform model, interpolation calculation is separately performed by using the 6-parameter affine transform model constituted by the three control points of the affine decoding block, to obtain the motion vector (vx0, vy0) of the top-left corner (x0, y0) of the current block, the motion vector (vx1, vy1) of the top-right corner (x1, y1) of the current block, and the motion vector (vx2, vy2) of the bottom-left corner (x2, y2) of the current block:

$$\begin{cases} vx_0 = vx_4 + \dfrac{(vx_5 - vx_4)}{x_5 - x_4} \times (x_0 - x_4) + \dfrac{(vx_6 - vx_4)}{y_6 - y_4} \times (y_0 - y_4) \\ vy_0 = vx_4 + \dfrac{(vy_5 - vy_4)}{x_5 - x_4} \times (x_0 - x_4) + \dfrac{(vy_6 - vy_4)}{y_6 - y_4} \times (y_0 - y_4) \end{cases} \quad (34)$$

$$\begin{cases} vx_1 = vx_4 + \dfrac{(vx_5 - vx_4)}{x_5 - x_4} \times (x_1 - x_4) + \dfrac{(vx_6 - vx_4)}{y_6 - y_4} \times (y_1 - y_4) \\ vy_1 = vx_4 + \dfrac{(vy_5 - vy_4)}{x_5 - x_4} \times (x_1 - x_4) + \dfrac{(vy_6 - vy_4)}{y_6 - y_4} \times (y_1 - y_4) \end{cases} \quad (35)$$

$$\begin{cases} vx_2 = vx_4 + \dfrac{(vx_5 - vx_4)}{x_5 - x_4} \times (x_2 - x_4) + \dfrac{(vx_6 - vx_4)}{y_6 - y_4} \times (y_2 - y_4) \\ vy_2 = vx_4 + \dfrac{(vy_5 - vy_4)}{x_5 - x_4} \times (x_2 - x_4) + \dfrac{(vy_6 - vy_4)}{y_6 - y_4} \times (y_2 - y_4) \end{cases} \quad (36)$$

It should be noted that the foregoing examples are merely used to explain the technical solutions of the present disclosure, but are not intended to limit the present disclosure. In addition, for a case in which other affine transform models are used for the current block and the neighboring block (for example, the 8-parameter affine transform model is used for both the current block and the neighboring block), refer to the implementation of the foregoing examples. Details are not described herein again.

According to the first motion model-based motion vector prediction method in the present disclosure, in a phase of parsing the current block (for example, in a phase of constructing a candidate motion vector list), an affine transform model of the neighboring block can be used to construct the affine transform model of the current block. The affine transform models of the two blocks may be different. The affine transform model of the current block better satisfies the actual motion status/actual requirement of the current block. Therefore, this solution can improve the coding efficiency and the accuracy in predicting the current block, and satisfy the user requirement.

(6) Second motion model-based motion vector prediction method. In the second motion model-based motion vector prediction method, affine transform models used for different blocks of an image in an image sequence are not limited, and a same affine transform model or different affine transform models may be used for the different blocks. In other words, if a 2×N-parameter affine transform model is used for a neighboring block (also referred to as an affine coding block on an encoder side or an affine decoding block on a decoder side) of a current block, and a 2×K-parameter affine transform model is used for the current block, N may be equal or unequal to K. In a parsing phase (for example, a phase of constructing a candidate motion vector list), control points (for example, two, three, or four control points) of the current block may be obtained according to the inherited control point motion vector prediction method described in "(3)" or the first motion model-based motion vector prediction method described in "(5)". Then, in a phase of reconstructing the current block, a 6-parameter affine transform model is uniformly used to obtain motion vector information of each subblock of the current block based on the control points of the current block, to reconstruct each subblock.

The following also uses A1 shown in FIG. 6 as an example to describe a process of determining a candidate motion vector of a control point of the current block (from a perspective of the decoder side). Other cases are deduced by analogy.

For example, a 4-parameter affine transform model is used for the current block in the parsing phase, and the 4-parameter affine transform model or another parameter affine model may be used for the neighboring block. Therefore, motion vectors of two control points of the current block may be obtained according to the inherited control point motion vector prediction method described in "(3)" or the first motion model-based motion vector prediction method described in "(5)", for example, a motion vector (vx4, vy4) of the top-left control point (x4, y4) of the current block and a motion vector (vx5, vy5) of the top-right control point (x5, y5) of the current block. Then, in the phase of reconstructing the current block, the 6-parameter affine transform model needs to be constructed based on the motion vectors of the two control points of the current block.

For example, based on a motion vector (vx0, vy0) of the top-left control point (x0, y0) of the current block and a motion vector (vx1, vy1) of the top-right control point (x1, y1) of the current block, a motion vector of a third control point may be obtained according to the following formula (40). The motion vector of the third control point is, for example, a motion vector (vx2, vy2) of the bottom-left corner (x2, y2) of the current block.

$$\begin{cases} vx_2 = -\dfrac{vy_1 - vy_0}{W}H + vx_0 \\ vy_2 = +\dfrac{vx_1 - vx_0}{W}H + vy_0 \end{cases} \quad (40)$$

W represents the width of the current block, and H represents the height of the current block.

Then, the 6-parameter affine model of the current block in the reconstruction phase is obtained by using the motion vector (vx0, vy0) of the top-left control point (x0, y0) of the current block, the motion vector (vx1, vy1) of the top-right control point (x1, y1) of the current block, and the motion vector (vx2, vy2) of the bottom-left control point (x2, y2) of the current block. A formula for the 6-parameter affine model is shown in the following formula (37):

$$\begin{cases} vx = \dfrac{vx_1 - vx_0}{W}x + \dfrac{vx_2 - vy_0}{H}y + vx_0 \\ vy = \dfrac{vy_1 - vy_0}{W}x + \dfrac{vy_2 - vx_0}{H}y + vy_0 \end{cases} \quad (37)$$

Then, coordinates ($x_{(i,j)}$, $y_{(i,j)}$) of the center point of each subblock (or each motion compensation unit) of the current block relative to the top-left corner (or another reference point) of the current block are substituted into the foregoing formula (37) to obtain motion information of the center point of each subblock (or each motion compensation unit), to subsequently reconstruct each subblock.

It should be noted that the foregoing example is merely used to explain the technical solutions of the present disclosure, but is not intended to limit the present disclosure. In addition, for a case in which another affine transform model (for example, the 6-parameter affine transform model or an 8-parameter bilinear model) is used for the current block in the parsing phase, refer to the implementation of the foregoing example. Details are not described herein again.

According to the second motion model-based motion vector prediction method in the present disclosure, in the phase of reconstructing the current block, the 6-parameter affine transform model can be uniformly used to predict the current block. A larger quantity of parameters of a motion model describing affine motion of the current block indicates higher precision and higher calculation complexity. In this solution, the 6-parameter affine transform model constructed in the reconstruction phase can describe affine transform such as translation, scaling, and rotation of an image block, and achieve a good balance between model complexity and a modeling capability. Therefore, this solution can improve coding efficiency and accuracy in predicting the current block, and satisfy a user requirement.

It may be understood that, in some embodiments of the present disclosure, both the first improved solution and the second improved solution may alternatively be used for implementation.

For example, when the 4-parameter affine transform model is used for the current block in the parsing phase, and the 6-parameter affine transform model is used for the neighboring block, motion vectors of two control points of the current block may be obtained according to the first motion model-based motion vector prediction method described in "(5)". Then, according to the second motion model-based motion vector prediction method described in "(6)", the motion vectors of the two control points are converted into the 6-parameter affine transform model in the reconstruction phase, to subsequently reconstruct each subblock of the current block.

For another example, when the 6-parameter affine transform model is used for the current block in the parsing phase, and the 4-parameter affine transform model is used for the neighboring block, motion vectors of three control points of the current block may be obtained according to the first motion model-based motion vector prediction method described in "(5)". Then, according to the formula (32) in the second motion model-based motion vector prediction method described in "(6)", the motion vectors of the three control points are combined to obtain the 6-parameter affine transform model in the reconstruction phase, to subsequently reconstruct each subblock of the current block.

Certainly, a solution in which both the first improved solution and the second improved solution are used for implementation may alternatively be implemented as another embodiment. Details are not described herein.

Based on the foregoing description, the following further describes an affine transform model-based AMVP mode (Affine AMVP mode) and an affine transform model-based merge mode (Affine Merge mode) in the embodiments of the present disclosure.

The affine transform model-based AMVP mode is first described.

For the affine transform model-based AMVP mode, in an embodiment, a candidate motion vector list (or referred to as a control point motion vector predictor candidate list) based on the AMVP mode may also be constructed by using a first motion model-based motion vector prediction method and/or a constructed control point motion vector prediction method. In another embodiment, a candidate motion vector list (or referred to as a control point motion vector predictor candidate list) based on the AMVP mode may be constructed by using an inherited control point motion vector prediction method and/or a constructed control point motion vector prediction method. Control point motion vector predictors in the list may include two candidate control point motion vectors (for example, when a 4-parameter affine transform model is used for a current block), or include three candidate control point motion vectors (for example, when a 6-parameter affine transform model is used for a current block), or include four candidate control point motion vectors (for example, when an 8-parameter bilinear model is used for a current block).

In a possible application scenario, the control point motion vector predictor candidate list may further be pruned and sorted according to a particular rule, and may be truncated or padded to obtain control point motion vector predictor candidates of a particular quantity.

Then, on an encoder side, an encoder (for example, the video encoder 100) obtains a motion vector of each motion compensation subunit of the current coding block by using each control point motion vector predictor in the control point motion vector predictor candidate list and according to the foregoing formula (3), (5), or (7). Further, the encoder obtains a pixel value of a corresponding location in a reference frame to which the motion vector of each motion compensation subunit points, and uses the pixel value as a pixel predictor of the motion compensation subunit to perform affine transform model-based motion compensation. An average difference between an original value and a predictor of each sample in the current coding block is calculated. A control point motion vector predictor corresponding to a minimum average difference is selected as an optimal control point motion vector predictor, and used as motion vector predictors of two, three, or four control points of the current coding block. In addition, on the encoder side, a control point motion vector predictor may further be used as a search start point to perform motion search within a specific search range to obtain a control point motion vector (control point motion vectors, CPMV), and a difference (control point motion vectors differences, CPMVD) between the control point motion vector and the control point motion vector predictor is calculated. Then, the encoder encodes an index value indicating a location of the control point motion vector predictor in the control point motion vector predictor candidate list and the CPMVD into a bitstream, and transfers the bitstream to a decoder side.

On the decoder side, a decoder (for example, the video decoder 200) parses the bitstream to obtain the index value and the control point motion vector difference (CPMVD), determines the control point motion vector predictor (control point motion vectors predictor, CPMVP) in the control point motion vector predictor candidate list based on the index value, and adds the CPMVP and the CPMVD to obtain the control point motion vector.

The following describes the affine transform model-based merge mode.

For the affine transform model-based merge mode, in an embodiment, a candidate motion vector list (or referred to as a control point motion vector merge candidate list) for the merge mode may be constructed by using an inherited control point motion vector prediction method and/or a constructed control point motion vector prediction method. In another embodiment, a candidate motion vector list (or referred to as a control point motion vector merge candidate list) for the merge mode may alternatively be constructed by using a first motion model-based motion vector prediction method and/or a constructed control point motion vector prediction method.

In a possible application scenario, the control point motion vector merge candidate list may further be pruned and sorted according to a particular rule, and may be truncated or padded to obtain control point motion vector candidates of a particular quantity.

Then, on an encoder side, an encoder (for example, the video encoder 100) obtains a motion vector of each motion compensation subunit (sample or pixel block with a size of M×N and obtained through splitting according to a particular method) of a current coding block by using each control point motion vector in the merge candidate list and according to the foregoing formula (3), (5), or (7). Further, the encoder obtains a pixel value of a location in a reference frame to which the motion vector of each motion compensation subunit points, and uses the pixel value as a pixel predictor of the motion compensation subunit to perform affine motion compensation. An average difference between an original value and a predictor of each sample in the current coding block is calculated. A control point motion vector corresponding to a minimum average difference is selected as motion vectors of two, three, or four control points of the current coding block. An index number indicating a location of the control point motion vector in the candidate list is encoded into a bitstream and sent to a decoder side.

On the decoder side, a decoder (for example, the video decoder 200) parses the bitstream to obtain the index value, and determines the control point motion vector (control point motion vectors, CPMVP) in the control point motion vector merge candidate list based on the index value.

In addition, it should be noted that, in the embodiments of the present disclosure, "at least one" means one or more, and "a plurality of" means two or more than two. The term "and/or" describes an association relationship for describing associated objects and represents that three relationships may exist. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural.

Refer to FIG. 9. Based on a design solution of a first motion model-based motion vector prediction method, an embodiment of the present disclosure provides a motion vector prediction method. The method may be performed by a video decoder 200, and specifically, may be performed by an inter predictor 210 of the video decoder 200. The video decoder 200 may perform, based on a video data stream having a plurality of video frames, a part or all of the following steps to predict motion information of each sub-block of a current decoding block (referred to as a current block for short) of a current video frame and perform motion compensation. As shown in FIG. 9, the method includes but is not limited to the following steps.

Step 601: Parse a bitstream and determine an inter prediction mode of the current decoding block.

For example, the video decoder 200 on a decoder side may parse a syntax element in the bitstream transmitted from an encoder side, to obtain indication information used to indicate the inter prediction mode, to determine the inter prediction mode of the current block based on the indication information.

If it is determined that the inter prediction mode of the current block is an affine transform model-based AMVP mode, steps 602a to 606a are performed subsequently.

If it is determined that the inter prediction mode of the current block is an affine transform model-based merge mode, steps 602b to 605b are performed subsequently.

Step 602a: Construct a candidate motion vector list for the affine transform model-based AMVP mode.

In some embodiments of the present disclosure, a candidate motion vector of a control point of the current block may be obtained by using the first motion model-based motion vector prediction method, and added to the candidate motion vector list corresponding to the AMVP mode.

In some other embodiments of the present disclosure, a candidate motion vector of a control point of the current block may alternatively be obtained separately by using the first motion model-based motion vector prediction method and a constructed control point motion vector prediction method, and added to the candidate motion vector list corresponding to the AMVP mode.

If a 4-parameter affine transform model is used for the current block, the candidate motion vector list for the AMVP mode may be a 2-tuple list. The 2-tuple list includes one or more 2-tuples used to construct the 4-parameter affine transform model.

If a 6-parameter affine transform model is used for the current block, the candidate motion vector list for the AMVP mode may be a triplet list. The triplet list includes one or more triplets used to construct the 6-parameter affine transform model.

If an 8-parameter bilinear model is used for the current block, the candidate motion vector list for the AMVP mode may be a quadruple list. The quadruple list includes one or more quadruples used to construct the 8-parameter bilinear model.

In a possible application scenario, the candidate motion vector 2-tuple/triplet/quadruple list may be pruned and sorted according to a particular rule, and may be truncated or padded to obtain candidate motion vector candidates of a particular quantity.

For the first motion model-based motion vector prediction method, for example, as shown in FIG. 10, neighboring blocks of the current block may be traversed in an order of A1→B1→B0→A0→B2 in FIG. 10, to find an affine decoding block in which a neighboring block is located (for example, an affine decoding block in which A1 is located in FIG. 10). An affine transform model of the affine decoding block is constructed by using a control point of the affine decoding block, and then the candidate motion vector (for example, a candidate motion vector 2-tuple/triplet/quadruple) of the control point of the current block is derived by using the affine transform model of the affine decoding block, and added to the candidate motion vector list corresponding to the AMVP mode. It should be noted that another search order may also be applicable to the embodiments of the present disclosure. Details are not described herein.

It should be noted that, when there are a plurality of neighboring blocks, in other words, when the current block has a plurality of neighboring affine decoding blocks, in a possible embodiment, both the encoder side and the decoder side can first obtain a candidate motion vector of a control point of the current block by using an affine decoding block whose quantity of model parameters is the same as that of the current block, and add the obtained candidate motion vector to the candidate motion vector list corresponding to the AMVP mode. Then, a candidate motion vector of the control point of the current block may be obtained by using an affine decoding block whose quantity of model parameters is different from that of the current block, and added to the candidate motion vector list corresponding to the AMVP mode. In this way, the candidate motion vector that is of the control point of the current block and that is obtained by using the affine decoding block whose quantity of model parameters is the same as that of the current block is located at a front location of the list. This design helps reduce a quantity of bits transmitted in the bitstream.

FIG. 10 is used as an example. It is assumed that a parameter model of the current decoding block is the 4-parameter affine transform model. After the neighboring blocks of the current block are traversed, it is determined that the 4-parameter affine transform model is used for an affine decoding block in which B1 is located and the 6-parameter affine transform model is used for the affine decoding block in which A1 is located. In this case, motion vectors of two control points of the current block may be first derived by using the affine decoding block in which B1 is located, and added to the list. Then, motion vectors of two control points of the current block are derived by using the affine decoding block in which A1 is located, and added to the list.

Alternatively, it is assumed that a parameter model of the current decoding block is the 6-parameter affine transform model. After the neighboring blocks of the current block are traversed, it is determined that the 6-parameter affine transform model is used for the affine decoding block in which A1 is located and the 4-parameter affine transform model is used for an affine decoding block in which B1 is located. In this case, motion vectors of three control points of the current block may be first derived by using the affine decoding block in which A1 is located, and added to the list. Then, motion vectors of three control points of the current block are derived by using the affine decoding block in which B1 is located, and added to the list.

It should be noted that the technical solutions of the present disclosure are not limited to the foregoing examples, and another neighboring block, motion model, and search order may also be applicable to the present disclosure. Details are not described herein.

In the step 602a, affine transform models used for different blocks are not limited. In other words, a quantity of parameters of an affine transform model used for the current block may be different from or the same as that of an affine decoding block. In an embodiment, the affine transform model used for the current block may be determined by parsing the bitstream. In other words, in this case, the bitstream includes indication information of the affine transform model of the current block. In an embodiment, the affine transform model used for the current block may be pre-configured. In an embodiment, the affine transform model used for the current block may be selected from a plurality of affine transform models based on an actual motion status or an actual requirement of the current block.

Some content about obtaining the candidate motion vector of the control point of the current block by using the constructed control point motion vector prediction method has been described in detail in the foregoing "(4)". For brevity of this specification, details are not described herein again.

Some content about obtaining the candidate motion vector of the control point of the current block by using the first motion model-based motion vector prediction method has been described in detail in the foregoing "(5)". For brevity of this specification, details are not described herein again.

It should be noted that, in some embodiments in which the first motion model-based motion vector prediction method is used, in a process in which the decoder side derives the candidate motion vector of the control point of the current block, flag information (flag) of an affine transform model of an affine decoding block may need to be obtained. The flag is pre-stored locally on the decoder side, and is used to indicate the affine transform model that is of the affine decoding block and that is actually used to predict a sub-block of the affine decoding block.

For example, in an application scenario, when the decoder side determines, by identifying the flag of the affine decoding block, that a quantity of model parameters of the affine transform model actually used for the affine decoding block is different from (or the same as) that of the affine transform model used for the current block, the decoder side is triggered to derive the candidate motion vector of the control point of the current block by using the affine transform model actually used for the affine decoding block.

For example, when the 4-parameter affine transform model is used for the current block, if the decoder side identifies the flag of the affine decoding block, and determines that the quantity of model parameters of the affine transform model actually used for the affine decoding block is different from that of the affine transform model used for the current block, for example, the 6-parameter affine transform model is used for the affine decoding block, the decoder side obtains motion vectors of three control points of the affine decoding block: a motion vector (vx4, vy4) of the top-left corner (x4, y4), a motion vector (vx5, vy5) of the top-right corner (x5, y5), and a motion vector (vx6, vy6) of the bottom-left corner (x6, y6). Based on the 6-parameter affine transform model constituted by the three control points of the affine decoding block, candidate motion vectors of the top-left and top-right control points of the current block are respectively derived according to the formulas (27) and (28) for the 6-parameter affine transform model.

For another example, when the 4-parameter affine transform model is used for the current block, if the decoder side identifies the flag of the affine decoding block, and determines that the quantity of model parameters of the affine transform model actually used for the affine decoding block is the same as that of the affine transform model used for the current block, for example, the 4-parameter affine transform model is also used for the affine decoding block, the decoder side obtains motion vectors of two control points of the affine decoding block: a motion vector (vx4, vy4) of the top-left control point (x4, y4) and a motion vector (vx5, vy5) of the top-right control point (x5, y5). Based on the 4-parameter affine transform model constituted by the two control points of the affine decoding block, candidate motion vectors of the top-left and top-right control points of the current block are respectively derived according to the formulas (32) and (33) for the 4-parameter affine transform model.

It should be noted that, in some other embodiments in which the first motion model-based motion vector prediction method is used, in a process in which the decoder side derives the candidate motion vector of the control point of the current block, a flag of an affine transform model of an affine decoding block may not be required.

For example, in an application scenario, after the decoder side determines the affine transform model used for the current block, the decoder side obtains control points of a specific quantity (the specific quantity is the same as or different from a quantity of control points of the current block) of the affine decoding block, constructs the affine transform model by using the control points of the specific quantity of the affine decoding block, and then derives the candidate motion vector of the control point of the current block by using the affine transform model.

For example, when the 4-parameter affine transform model is used for the current block, the decoder side does not determine the affine transform model actually used for the affine decoding block (the affine transform model actually used for the affine decoding block may be the 4-parameter affine transform model, the 6-parameter affine transform model, or the 8-parameter bilinear model), but directly obtains motion vectors of two control points of the affine decoding block: a motion vector (vx4, vy4) of the top-left control point (x4, y4) and a motion vector (vx5, vy5) of the top-right control point (x5, y5). Based on the 4-parameter affine model constituted by the two control points of the affine decoding block, motion vectors of the top-left and top-right control points of the current block are respectively derived according to the formulas (32) and (33) for the 4-parameter affine model.

It should be noted that the technical solutions of the present disclosure are not limited to the foregoing examples, and another control point, motion model, candidate location, and search order may also be applicable to the present disclosure. Details are not described herein.

Step 603a: Determine an optimal motion vector predictor of the control point based on an index value.

For example, the index value of the candidate motion vector list is obtained by parsing the bitstream, and the optimal motion vector predictor of the control point is determined, based on the index value, in the candidate motion vector list constructed in the step 602a.

For example, if the 4-parameter affine motion model is used for the current block, the index value is obtained through parsing, and optimal motion vector predictors of two control points are determined in the candidate motion vector 2-tuple list based on the index value.

For another example, if the 6-parameter affine motion model is used for the current block, the index value is obtained through parsing, and optimal motion vector predictors of three control points are determined in the candidate motion vector triplet list based on the index value.

For another example, if the 8-parameter bilinear model is used for the current block, the index value is obtained through parsing, and optimal motion vector predictors of four control points are determined in the candidate motion vector quadruple list based on the index value.

Step 604a: Determine an actual motion vector of the control point based on a motion vector difference.

For example, the motion vector difference of the control point is obtained by parsing the bitstream, and then the motion vector of the control point is obtained based on the motion vector difference of the control point and the optimal motion vector predictor that is of the control point and that is determined in the step 603a.

For example, if the 4-parameter affine motion model is used for the current block, motion vector differences of two control points of the current block are obtained by decoding the bitstream. For example, a motion vector difference of the top-left control point and a motion vector difference of the top-right control point may be obtained by decoding the bitstream. Then, a motion vector difference and a motion vector predictor of each control point are added to obtain an actual motion vector of the control point. In other words, the motion vectors of the top-left and top-right control points of the current block are obtained.

For another example, if the 6-parameter affine motion model is used for the current block, motion vector differences of three control points of the current block are obtained by decoding the bitstream. For example, a motion vector difference of the top-left control point, a motion vector difference of the top-right control point, and a motion vector difference of the bottom-left control point may be obtained by decoding the bitstream. Then, a motion vector difference and a motion vector predictor of each control point are added to obtain an actual motion vector of the control point. In other words, motion vectors of the top-left, top-right, and bottom-left control points of the current block are obtained.

It should be noted that, in this embodiment of the present disclosure, another affine motion model and another control point location may also be used. Details are not described herein.

Step 605a: Obtain a motion vector of each subblock of the current block based on the affine transform model used for the current block.

For each M×N subblock in a P x Q current block (one subblock may be equivalent to one motion compensation unit, and at least one of the width or the height of the M×N subblock is less than the width or the height of the current block), motion information of a sample at a preset location in the motion compensation unit may be used to represent motion information of all samples in the motion compensation unit. Assuming that a size of the motion compensation unit is M×N, the sample at the preset location may be the center point (M/2, N/2), the top-left sample (0, 0), the top-right sample (M−1, 0), or a sample at another location of the motion compensation unit.

Figure 11A:
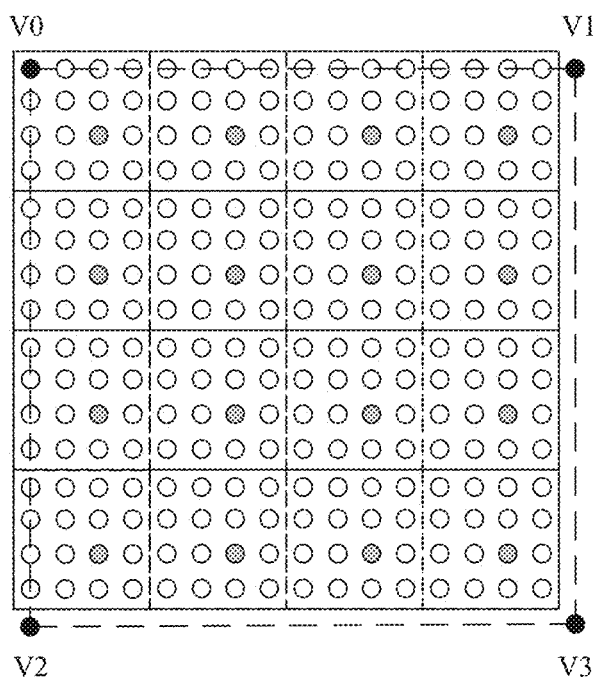
FIG. 11A is a schematic diagram of a current block and a motion compensation unit of the current block according to an embodiment of the present disclosure.
Figure 11B:
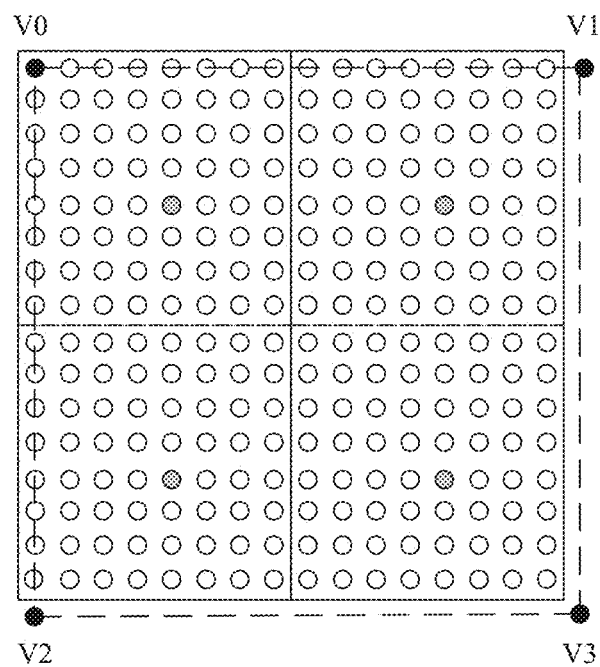
FIG. 11B is a schematic diagram of another current block and a motion compensation unit of the current block according to an embodiment of the present disclosure.

The following uses the center point of the motion compensation unit as an example for description. Refer to FIG. 11A and FIG. 11B.

FIG. 11A shows an example of a current block and a motion compensation unit of the current block. Each small box in the figure represents one motion compensation unit. In the figure, a specification of each motion compensation unit is 4×4, and a gray point in each motion compensation unit represents the center point of the motion compensation unit. In FIG. 11A, V0 represents a motion vector of the top-left control point of the current block, V1 represents a motion vector of the top-right control point of the current block, and V2 represents a motion vector of the bottom-left control point of the current block.

FIG. 11B shows an example of another current block and a motion compensation unit of the current block. Each small box in the figure represents one motion compensation unit. In the figure, a specification of each motion compensation unit is 8×8, and a gray point in each motion compensation unit represents the center point of the motion compensation unit. In FIG. 11B, V0 represents a motion vector of the top-left control point of the current block, V1 represents a motion vector of the top-right control point of the current block, and V2 represents a motion vector of the bottom-left control point of the current block.

Coordinates of the center point of the motion compensation unit relative to the top-left pixel of the current block may be calculated according to the following formula (38):

$$\begin{cases} x_{(i,j)} = M \times i + \dfrac{M}{2}, i = 0, 1 \ldots \\ y_{(i,j)} = N \times j + \dfrac{N}{2}, j = 0, 1 \ldots \end{cases} \quad (38)$$

In the foregoing formula, i is the $i^{th}$ motion compensation unit (from left to right) in a horizontal direction, j is the $i^{th}$ motion compensation unit (from top to bottom) in a vertical direction, and $(x_{(i,j)}, y_{(i,j)})$ indicates coordinates of the center point of the $(i, j)^{th}$ motion compensation unit relative to a pixel at the top-left control point of a current affine decoding block.

If the 6-parameter affine motion model is used for the current affine decoding block, $(x_{(i,j)}, y_{(i,j)})$ is substituted into the following formula (37) for the 6-parameter affine motion model to obtain a motion vector of the center point of each motion compensation unit, and the obtained motion vector is used as motion vectors $(vx_{(i,j)}, vy_{(i,j)})$ of all samples in the motion compensation unit:

$$\begin{cases} vx = \dfrac{vx_1 - vx_0}{W}x + \dfrac{vx_2 - vy_0}{H}y + vx_0 \\ vy = \dfrac{vy_1 - vy_0}{W}x + \dfrac{vy_2 - vx_0}{H}y + vy_0 \end{cases} \quad (37)$$

If the 4-parameter affine motion model is used for the current affine decoding block, $(x_{(i,j)}, y_{(i,j)})$ is substituted into the following formula (39) for the 4-parameter affine motion model to obtain a motion vector of the center point of each motion compensation unit, and the obtained motion vector is used as motion vectors $(vx_{(i,j)}, vy_{(i,j)})$ of all samples in the motion compensation unit:

$$\begin{cases} vx = \dfrac{vx_1 - vx_0}{W}x - \dfrac{vy_1 - vy_0}{W}y + vx_0 \\ vy = \dfrac{vy_1 - vy_0}{W}x + \dfrac{vx_1 - vx_0}{W}y + vy_0 \end{cases} \quad (39)$$

Step 606a: Perform motion compensation for each subblock based on the determined motion vector of the subblock, to obtain a pixel predictor of the subblock.

Step 602b: Construct a candidate motion vector list for the affine transform model-based merge mode.

In some embodiments of the present disclosure, a candidate motion vector of a control point of the current block may alternatively be obtained by using the first motion model-based motion vector prediction method, and added to the candidate motion vector list corresponding to the merge mode.

In some other embodiments of the present disclosure, a candidate motion vector of a control point of the current block may alternatively be obtained separately by using the first motion model-based motion vector prediction method and a constructed control point motion vector prediction method, and added to the candidate motion vector list corresponding to the merge mode.

Likewise, for the candidate motion vector list corresponding to the merge mode, if a 4-parameter affine transform model is used for the current block, the candidate motion vector list may be a 2-tuple list. The 2-tuple list includes one or more 2-tuples used to construct the 4-parameter affine transform model.

If a 6-parameter affine transform model is used for the current block, the candidate motion vector list may be a triplet list. The triplet list includes one or more triplets used to construct the 6-parameter affine transform model.

If an 8-parameter bilinear model is used for the current block, the candidate motion vector list may be a quadruple list. The quadruple list includes one or more quadruples used to construct the 8-parameter bilinear model.

In a possible application scenario, the candidate motion vector 2-tuple/triplet/quadruple list may be pruned and sorted according to a particular rule, and may be truncated or padded to obtain candidate motion vector candidates of a particular quantity.

Likewise, for the first motion model-based motion vector prediction method, for example, as shown in FIG. 10, neighboring blocks of the current block may be traversed in an order of A1→B1→B0→A0→B2 in FIG. 10, to find an affine decoding block in which a neighboring block is located. An affine transform model of the affine decoding block is constructed by using a control point of the affine decoding block, and then the candidate motion vector (for example, a candidate motion vector 2-tuple/triplet/quadruple) of the control point of the current block is derived by using the affine transform model of the affine decoding block, and added to the candidate motion vector list corresponding to the merge mode. It should be noted that another search order may also be applicable to the embodiments of the present disclosure. Details are not described herein.

For example, in the foregoing traversal process, if the candidate motion vector list is empty, candidate motion information of the control point is added to the candidate list. Otherwise, motion information in the candidate motion vector list is sequentially traversed, and whether motion information that is the same as the candidate motion information of the control point exists in the candidate motion vector list is checked. If the motion information that is the same as the candidate motion information of the control point does not exist in the candidate motion vector list, the candidate motion information of the control point is added to the candidate motion vector list.

To determine whether two pieces of candidate motion information are the same, it can be sequentially determined whether forward reference frames, backward reference frames, horizontal and vertical components of each forward motion vector, and horizontal and vertical components of each backward motion vector in the two pieces of candidate motion information are the same. The two pieces of candidate motion information are considered as different only when all these elements are different.

If a quantity of pieces of motion information in the candidate motion vector list reaches a maximum list length, the candidate list construction is completed; otherwise, a next neighboring block is traversed.

Some content about obtaining the candidate motion vector of the control point of the current block by using the constructed control point motion vector prediction method has been described in detail in the foregoing "(4)". For brevity of this specification, details are not described herein again.

Some content about obtaining the candidate motion vector of the control point of the current block by using the first motion model-based motion vector prediction method has been described in detail in the foregoing "(5)". For brevity of this specification, details are not described herein again.

It should be noted that, in some embodiments in which the first motion model-based motion vector prediction method is used, for the affine transform model-based merge mode, affine transform models such as the 4-parameter affine transform model, the 6-parameter affine transform model, and the 8-parameter bilinear model may alternatively not be distinguished for different blocks in an image, in other words, affine transform models with a same quantity of parameters may be used for the different blocks.

For example, the 6-parameter affine transform model is used for all blocks in the image. A1 in FIG. 10 is used as an example. Motion vectors of three control points of an affine decoding block in which A1 is located are obtained: a motion vector (vx4, vy4) of the top-left control point (x4, y4), a motion vector (vx5, vy5) of the top-right control point (x5, y5), and a motion vector (vx6, vy6) of the bottom-left control point (x6, y6). Then, based on the 6-parameter affine model constituted by the three control points of the neighboring affine decoding block, motion vectors of the top-left control point, the top-right control point, and the bottom-left control point of the current block are respectively derived according to the formulas (34), (35), and (36).

It should be noted that the technical solutions of the present disclosure are not limited to the foregoing example, and another control point, motion model, candidate location, and search order may also be applicable to the present disclosure. Details are not described herein.

Step 603b: Determine a motion vector of the control point based on an index value.

For example, the index value of the candidate motion vector list is obtained by parsing the bitstream, and the actual motion vector of the control point is determined, based on the index value, in the candidate motion vector list constructed in the step 602b.

For example, if the 4-parameter affine motion model is used for the current block, the index value is obtained through parsing, and motion vectors of two control points are determined in the candidate motion vector 2-tuple list based on the index value.

For another example, if the 6-parameter affine motion model is used for the current block, the index value is obtained through parsing, and motion vectors of three control points are determined in the candidate motion vector triplet list based on the index value.

For another example, if the 8-parameter bilinear model is used for the current block, the index value is obtained through parsing, and motion vectors of four control points are determined in the candidate motion vector quadruple list based on the index value.

Step 604b: Obtain a motion vector of each subblock of the current block based on an affine transform model used for the current block. For detailed implementation of this step, refer to descriptions of the step 605a. For brevity of this specification, details are not described herein again.

Step 605b: Perform motion compensation for each subblock based on the corresponding motion vector, to obtain a pixel predictor of the subblock.

It can be learned that, in this embodiment of the present disclosure, the decoder side uses the first motion model-based motion vector prediction method in a process of predicting the current block. In this way, an affine transform model of a neighboring block can be used to construct the affine transform model of the current block in a phase of parsing the current block (for example, in a phase of constructing the candidate motion vector list for the AMVP mode or the merge mode). The affine transform models of the two blocks may be different or the same. The affine transform model of the current block better satisfies the actual motion status/actual requirement of the current block. Therefore, this solution can improve the coding efficiency and the accuracy in predicting the current block, and satisfy the user requirement.

Refer to FIG. 12. Based on a design solution of a second motion model-based motion vector prediction method, an embodiment of the present disclosure provides another motion vector prediction method. The method may be performed by a video decoder 200, and specifically, may be performed by an inter predictor 210 of the video decoder 200. The video decoder 200 may perform, based on a video data stream having a plurality of video frames, a part or all of the following steps to predict motion information of each subblock of a current decoding block (referred to as a current block for short) of a current video frame and perform motion compensation.

As shown in FIG. 12, the method includes but is not limited to the following steps.

Step 701: Parse a bitstream and determine an inter prediction mode of the current decoding block.

For example, the video decoder 200 on a decoder side may parse a syntax element in the bitstream transmitted from an encoder side, to obtain indication information used to indicate the inter prediction mode, to determine the inter prediction mode of the current block based on the indication information.

If it is determined that the inter prediction mode of the current block is an affine transform model-based AMVP mode, steps 702a to 706a are performed subsequently.

If it is determined that the inter prediction mode of the current block is an affine transform model-based merge mode, steps 702b to 705b are performed subsequently.

Step 702a: Construct a candidate motion vector list for the affine transform model-based AMVP mode.

In this embodiment of the present disclosure, affine transform models used for different blocks of an image in an image sequence are not limited, in other words, different affine transform models may be used for the different blocks.

In an embodiment, a candidate motion vector of a control point of the current block may be obtained by using an inherited control point motion vector prediction method, and added to the candidate motion vector list corresponding to the AMVP mode.

In an embodiment, a candidate motion vector of a control point of the current block may be obtained by using a first motion model-based motion vector prediction method, and added to the candidate motion vector list corresponding to the AMVP mode.

In an embodiment, a candidate motion vector of a control point of the current block may be obtained by using a constructed control point motion vector prediction method, and added to the candidate motion vector list corresponding to the AMVP mode.

In some other embodiments, a candidate motion vector of a control point of the current block may alternatively be obtained separately by using any two of an inherited control point motion vector prediction method, the second motion model-based motion vector prediction method, or a constructed control point motion vector prediction method, and added to the candidate motion vector list corresponding to the AMVP mode.

In some other embodiments, a candidate motion vector of a control point of the current block may alternatively be obtained separately by using an inherited control point motion vector prediction method, the second motion model-based motion vector prediction method, and a constructed control point motion vector prediction method, and added to the candidate motion vector list corresponding to the AMVP mode.

Some content about obtaining the candidate motion vector of the control point of the current block by using the inherited control point motion vector prediction method has been described in detail in the foregoing "(3)". For brevity of this specification, details are not described herein again.

Some content about obtaining the candidate motion vector of the control point of the current block by using the constructed control point motion vector prediction method has been described in detail in the foregoing "(4)". For brevity of this specification, details are not described herein again.

Some content about obtaining the candidate motion vector of the control point of the current block by using the first motion model-based motion vector prediction method has been described in detail in the foregoing "(5)" and in the step 602a in the embodiment in FIG. 9. For brevity of this specification, details are not described herein again.

For example, if a 4-parameter affine transform model is used for the current block, the candidate motion vector list for the AMVP mode may be a 2-tuple list. The 2-tuple list includes one or more 2-tuples used to construct the 4-parameter affine transform model.

If a 6-parameter affine transform model is used for the current block, the candidate motion vector list for the AMVP mode may be a triplet list. The triplet list includes one or more triplets used to construct the 6-parameter affine transform model.

If an 8-parameter bilinear model is used for the current block, the candidate motion vector list for the AMVP mode may be a quadruple list. The quadruple list includes one or more quadruples used to construct the 8-parameter bilinear model.

In a possible application scenario, the candidate motion vector 2-tuple/triplet/quadruple list may further be pruned and sorted according to a particular rule, and may be truncated or padded to obtain candidate motion vector candidates of a particular quantity.

Step 703a: Determine an optimal motion vector predictor of the control point based on an index value. For specific content, refer to related descriptions in the step 603a in the embodiment in FIG. 9. Details are not described herein again.

Step 704a: Determine motion vectors of three control points of the current block based on motion vector differences.

For example, a motion vector difference of the control point is obtained by parsing the bitstream, and then a motion vector of the control point is obtained based on the motion vector difference of the control point and the optimal motion vector predictor that is of the control point and that is determined in the step 703a. Then, the motion vectors of the three control points of the current block are determined based on obtained motion vectors of the control points.

For example, if the candidate motion vector list constructed by the decoder side in step 702a is the 2-tuple list, the index value is obtained through parsing in the step 703a, and motion vector predictors (MVP) of two control points (namely, a 2-tuple) are determined in the candidate motion vector list based on the index value. Motion vector differences (MVD) of the two control points of the current block are obtained by parsing the bitstream in the step 704a. Then, motion vectors (MV) of the two control points are respectively obtained based on the MVPs and the MVDs of the two control points. The motion vectors of the two control points are, for example, a motion vector (vx0, vy0) of the top-left control point (x0, y0) of the current block and a motion vector (vx1, vy1) of the top-right control point (x1, y1) of the current block. Then, the 4-parameter affine transform model is constructed based on the motion vectors of the two control points of the current block. A motion vector of a third control point is obtained according to a formula (40) for the 4-parameter affine transform model. The motion vector of the third control point is, for example, a motion vector (vx2, vy2) of the bottom-left corner (x2, y2) of the current block. In this way, the motion vectors of the top-left control point, the top-right control point, and the bottom-left control point of the current block are determined.

For another example, if the candidate motion vector list constructed by the decoder side in step 702a is the triplet list, the index value is obtained through parsing in the step 703a, and motion vector predictors (MVP) of three control points (namely, a triplet) are determined in the candidate motion vector list based on the index value. Motion vector differences (MVD) of the three control points of the current block are obtained by parsing the bitstream in the step 704a. Then, motion vectors (MV) of the three control points are respectively obtained based on the MVPs and the MVDs of the three control points. The motion vectors of the three control points are, for example, a motion vector (vx0, vy0) of the top-left control point (x0, y0) of the current block, a motion vector (vx1, vy1) of the top-right control point (x1, y1) of the current block, and a motion vector (vx2, vy2) of the bottom-left corner (x2, y2) of the current block.

In this way, the motion vectors of the top-left control point, the top-right control point, and the bottom-left control point of the current block are determined.

For another example, if the candidate motion vector list constructed by the decoder side in step 702a is the quadruple list, the index value is obtained through parsing in the step 703a, and motion vector predictors (MVP) of four control points (namely, a quadruple) are determined in the candidate motion vector list based on the index value. Motion vector differences (MVD) of the four control points of the current block are obtained by parsing the bitstream in the step 704a. Then, motion vectors (MV) of the four control points are respectively obtained based on the MVPs and the MVDs of the four control points. The motion vectors of the four control points are, for example, a motion vector (vx0, vy0) of the top-left control point (x0, y0) of the current block, a motion vector (vx1, vy1) of the top-right control point (x1, y1) of the current block, a motion vector (vx2, vy2) of the bottom-left corner (x2, y2) of the current block, and a motion vector (vx3, vy3) of the bottom-right corner (x3, vy3) of the current block. Then, the decoder side may use only motion vectors of the top-left control point, the top-right control point, and the bottom-left control point of the current block.

It should be noted that the technical solutions of the present disclosure are not limited to the foregoing examples, and another control point and motion model may also be applicable to the present disclosure. Details are not described herein.

Step 705a: Obtain a motion vector of each subblock based on the three control points of the current block and by using the 6-parameter affine transform model.

For example, the motion vectors of the three control points of the current block have been determined in the step 704a. Therefore, the 6-parameter affine transform model may be constructed based on the motion vectors of the three control points of the current block, and the motion vector of each subblock is obtained by using the 6-parameter affine transform model.

For example, the motion vectors of the three control points are, for example, the motion vector (vx0, vy0) of the top-left control point (x0, y0) of the current block, the motion vector (vx1, vy1) of the top-right control point (x1, y1) of the current block, and the motion vector (vx2, vy2) of the bottom-left control point (x2, y2) of the current block. In this case, the 6-parameter affine model of the current block in a reconstruction phase is obtained by using the motion vector (vx0, vy0) of the top-left control point (x0, y0) of the current block, the motion vector (vx1, vy1) of the top-right control point (x1, y1) of the current block, and the motion vector (vx2, vy2) of the bottom-left corner (x2, y2) of the current block. A formula for the 6-parameter affine model is shown in the formula (37).

Then, coordinates $(x_{(i,j)}, y_{(i,j)})$ of a sample at a preset location in each subblock (or each motion compensation unit) of the current block relative to the top-left corner (or another reference point) of the current block are substituted into the foregoing formula (37) to obtain the motion vector of each subblock. The sample at the preset location may be the center point of each subblock (or each motion compensation unit). Coordinates $(x_{(i,j)}, y_{(i,j)})$ of the center point of each subblock (or each motion compensation unit) relative to the top-left pixel of the current block may be calculated according to the following formula (38). For specific content, refer to related descriptions in the embodiment in FIG. 11A and the embodiment in FIG. 11B. Details are not described herein again.

Step 706a: Perform motion compensation for each subblock based on the corresponding motion vector, to obtain a pixel predictor of the subblock.

Step 702b: Construct a candidate motion vector list for the affine transform-based merge mode.

Likewise, in this embodiment of the present disclosure, affine transform models used for different blocks of an image in an image sequence are not limited, in other words, different affine transform models may be used for the different blocks.

In an embodiment, a candidate motion vector of a control point of the current block may be obtained by using an inherited control point motion vector prediction method, and added to the candidate motion vector list corresponding to the merge mode.

In an embodiment, a candidate motion vector of a control point of the current block may be obtained by using a first motion model-based motion vector prediction method, and added to the candidate motion vector list corresponding to the merge mode.

In an embodiment, a candidate motion vector of a control point of the current block may be obtained by using a constructed control point motion vector prediction method, and added to the candidate motion vector list corresponding to the merge mode.

In some other embodiments, a candidate motion vector of a control point of the current block may alternatively be obtained separately by using any two of an inherited control point motion vector prediction method, the second motion model-based motion vector prediction method, or a constructed control point motion vector prediction method, and added to the candidate motion vector list corresponding to the merge mode.

In some other embodiments, a candidate motion vector of a control point of the current block may alternatively be obtained separately by using an inherited control point motion vector prediction method, the second motion model-based motion vector prediction method, and a constructed control point motion vector prediction method, and added to the candidate motion vector list corresponding to the merge mode.

Some content about obtaining the candidate motion vector of the control point of the current block by using the inherited control point motion vector prediction method has been described in detail in the foregoing "(3)". For brevity of this specification, details are not described herein again.

Some content about obtaining the candidate motion vector of the control point of the current block by using the constructed control point motion vector prediction method has been described in detail in the foregoing "(4)". For brevity of this specification, details are not described herein again.

Some content about obtaining the candidate motion vector of the control point of the current block by using the first motion model-based motion vector prediction method has been described in detail in the foregoing "(5)" and in the step $602a$ in the embodiment in FIG. 9. For brevity of this specification, details are not described herein again.

It should be noted that, in still some other embodiments, for the affine transform model-based merge mode, the candidate motion vector list established by the decoder side may be a candidate motion vector 2-tuple/triplet/quadruple list. In addition, the candidate motion vector 2-tuple/triplet/quadruple list may further be pruned and sorted according to a particular rule, and may be truncated or padded to obtain candidate motion vector candidates of a particular quantity.

It should be noted that, in still some other embodiments, for the affine transform model-based merge mode, affine transform models such as a 4-parameter affine transform model, a 6-parameter affine transform model, and an 8-parameter bilinear model may alternatively not be distinguished for different blocks in an image, in other words, affine transform models with a same quantity of parameters may be used for the different blocks.

Step 703b: Obtain a motion vector of the control point based on an index value. For example, the index value of the candidate motion vector list is obtained by parsing the bitstream, and the actual motion vector of the control point is determined, based on the index value, in the candidate motion vector list constructed in the step 702b. For an example implementation of this step, refer to related descriptions in the step 603b in the embodiment in FIG. 9. Details are not described herein again.

Step 704b: Determine motion vectors of three control points of the current block based on obtained motion vectors of the control points.

For example, the decoder side obtains motion vectors of two control points (namely, a 2-tuple) in the step 703b. The motion vectors of the two control points are, for example, a motion vector (vx0, vy0) of the top-left control point (x0, y0) of the current block and a motion vector (vx1, vy1) of the top-right control point (x1, y1) of the current block. Then, the 4-parameter affine transform model is constructed based on the motion vectors of the two control points of the current block. A motion vector of a third control point is obtained according to a formula (31) for the 4-parameter affine transform model. The motion vector of the third control point is, for example, a motion vector (vx2, vy2) of the bottom-left corner (x2, y2) of the current block. In this way, the motion vectors of the top-left control point, the top-right control point, and the bottom-left control point of the current block are determined.

For another example, the decoder side obtains motion vectors of three control points (namely, a triplet) in the step 703b. The motion vectors of the three control points are, for example, a motion vector (vx0, vy0) of the top-left control point (x0, y0) of the current block, a motion vector (vx1, vy1) of the top-right control point (x1, y1) of the current block, and a motion vector (vx2, vy2) of the bottom-left corner (x2, y2) of the current block. In this way, the motion vectors of the top-left control point, the top-right control point, and the bottom-left control point of the current block are determined.

For another example, the decoder side obtains motion vectors of four control points (namely, a quadruple) in the step 703b. The motion vectors of the four control points are, for example, a motion vector (vx0, vy0) of the top-left control point (x0, y0) of the current block, a motion vector (vx1, vy1) of the top-right control point (x1, y1) of the current block, a motion vector (vx2, vy2) of the bottom-left corner (x2, y2) of the current block, and a motion vector (vx3, vy3) of the bottom-right corner (x3, vy3) of the current block. Then, the decoder side may use only motion vectors of the top-left control point, the top-right control point, and the bottom-left control point of the current block.

It should be noted that the technical solutions of the present disclosure are not limited to the foregoing examples, and another control point and motion model may also be applicable to the present disclosure. Details are not described herein.

Step 705b: Obtain a motion vector of each subblock based on the three control points of the current block and by using the 6-parameter affine transform model. For an example implementation of this step, refer to related descriptions in the step 705a. Details are not described herein again.

Step 706b: Perform motion compensation for each subblock based on the corresponding motion vector, to obtain a pixel predictor of the subblock.

It can be learned that, in this embodiment of the present disclosure, the decoder side uses the second motion model-based motion vector prediction method in a process of predicting the current block. In this way, in a parsing phase, a quantity of parameters of an affine transform model used for the current block may be different from or the same as that of an affine transform model used for a neighboring block, and the 6-parameter affine transform model can be uniformly used to predict the current block in the phase of reconstructing the current block (including a phase of predicting a motion vector of a subblock). In this solution, the 6-parameter affine transform model constructed in the reconstruction phase can describe affine transform such as translation, scaling, and rotation of an image block, and achieve a good balance between model complexity and a modeling capability. Therefore, this solution can improve coding efficiency and accuracy in predicting the current block, and satisfy a user requirement.

FIG. 13 is a flowchart of still another motion vector prediction method according to an embodiment of the present disclosure. The method may be performed by a video encoder 100, and specifically, may be performed by an inter predictor 110 of the video encoder 100. The video encoder 100 may perform, based on a video data stream having a plurality of video frames, a part or all of the following steps to encode a current coding block (referred to as a current block for short) of a current video frame. As shown in FIG. 13, the method includes but is not limited to the following steps.

801: Determine an inter prediction mode of the current coding block.

In an example implementation, a plurality of inter prediction modes may be preset for inter prediction on an encoder side. For example, the plurality of inter prediction modes include the affine motion model-based AMVP mode and the affine motion model-based merge mode that are described above. The encoder side traverses the plurality of inter prediction modes to determine an optimal inter prediction mode for predicting the current block.

In another example implementation, only one inter prediction mode may be preset for inter prediction on an encoder side. In this case, the encoder side directly determines that a default inter prediction mode is currently used. The default inter prediction mode is the affine motion model-based AMVP mode or the affine motion model-based merge mode.

In this embodiment of the present disclosure, if it is determined that the inter prediction mode of the current block is the affine motion model-based AMVP mode, steps 802*a* to 804*a* are performed subsequently.

In this embodiment of the present disclosure, if it is determined that the inter prediction mode of the current block is the affine motion model-based merge mode, step 802*b* to step 804*b* are performed subsequently.

802*a*: Construct a candidate motion vector list for the affine transform-based AMVP mode.

In some embodiments, the encoder side uses a design solution of a first motion model-based motion vector prediction method. Therefore, for example implementation of this step, refer to descriptions of the step 602*a* in the embodiment in FIG. 9. Details are not described herein again.

In some other embodiments, the encoder side uses a design solution of a second motion model-based motion vector prediction method. Therefore, for example implementation of this step, refer to descriptions of the step 702*a* in the embodiment in FIG. 12. Details are not described herein again.

803*a*: Determine an optimal motion vector predictor of a control point based on a rate-distortion cost.

In some examples, the encoder side may obtain a motion vector of each motion compensation subunit of the current block by using a control point motion vector predictor (for example, a candidate motion vector 2-tuple/triplet/quadruple) in the candidate motion vector list and according to the formula (3), (5), or (7). Further, the encoder side obtains a pixel value of a corresponding location in a reference frame to which the motion vector of each motion compensation subunit points, and uses the pixel value as a pixel predictor of the motion compensation subunit to perform affine motion model-based motion compensation. An average difference between an original value and a predictor of each sample in the current coding block is calculated. A control point motion vector predictor corresponding to a minimum average difference is selected as an optimal control point motion vector predictor, and used as motion vector predictors of two, three, or four control points of the current block.

804*a*: Encode an index value, a motion vector difference of the control point, and indication information of the inter prediction mode into a bitstream.

In some examples, the encoder side may perform motion search within a specific search range by using the optimal control point motion vector predictor as a search start point to obtain a control point motion vector (control point motion vectors, CPMV), and calculate a difference (control point motion vectors differences, CPMVD) between the control point motion vector and the control point motion vector predictor. Then, the encoder side encodes the index value indicating a location of the control point motion vector predictor in the candidate motion vector list and the CPMVD into the bitstream. The indication information of the inter prediction mode may further be encoded into the bitstream, so that the bitstream is subsequently transmitted to a decoder side.

In another possible example, the encoder side may encode indication information indicating an affine transform model (a quantity of parameters) used for the current block into the bitstream and subsequently transmit the bitstream to the decoder side. In this way, the decoder side determines, based on the indication information, the affine transform model used for the current block.

802*b*: Construct a candidate motion vector list for the affine transform-based merge mode.

In some embodiments, the encoder side uses a design solution of a first motion model-based motion vector prediction method. Therefore, for example implementation of this step, refer to descriptions of the step 602*b* in the embodiment in FIG. 9. Details are not described herein again.

In some other embodiments, the encoder side uses a design solution of a second motion model-based motion vector prediction method. Therefore, for example implementation of this step, refer to descriptions of the step 702*b* in the embodiment in FIG. 12. Details are not described herein again.

803*b*: Determine an optimal motion vector predictor of a control point.

In some examples, the encoder side may obtain a motion vector of each motion compensation subunit of the current coding block by using a control point motion vector (for example, a candidate motion vector 2-tuple/triplet/quadruple) in the candidate motion vector list and according to the formula (3), (5), or (7). Further, the encoder side obtains a pixel value of a location in a reference frame to which the motion vector of each motion compensation subunit points, and uses the pixel value as a pixel predictor of the motion compensation subunit to perform affine motion compensation. An average difference between an original value and a predictor of each sample in the current coding block is calculated. A control point motion vector corresponding to a minimum average difference is selected as an optimal control point motion vector. The optimal control point motion vector is used as motion vectors of two, three, or four control points of the current coding block.

804*b*: Encode an index value and indication information of the inter prediction mode into a bitstream.

In an example, the encoder side may encode the index value indicating a location of the control point motion vector in the candidate list, and the indication information of the inter prediction mode into the bitstream, so that the bitstream is subsequently transmitted to a decoder side.

In another possible example, the encoder side may encode indication information indicating an affine transform model (a quantity of parameters) used for the current block into the bitstream and subsequently transmit the bitstream to the decoder side. In this way, the decoder side determines, based on the indication information, the affine transform model used for the current block.

It should be noted that the foregoing embodiment describes only a process in which the encoder side performs encoding and sends the bitstream. According to the foregoing descriptions, a person skilled in the art understands that the encoder side may also perform, in another procedure, another method described in the embodiments of the present disclosure. For example, during prediction performed by the encoder side on the current block, for example implementation of a process of reconstructing the current block, refer to a related method (as shown in the embodiment in FIG. 9 or FIG. 12) described above on the decoder side. Details are not described herein again.

It can be learned that, in an embodiment of the present disclosure, the encoder side encodes the current block according to the design solution of the first motion model-based motion vector prediction method. In this way, an affine transform model of a neighboring block can be used to construct the affine transform model of the current block in a phase of parsing the current block (for example, in a phase of constructing the candidate motion vector list for the AMVP mode or the merge mode). The affine transform models of the two blocks may be different or the same. The affine transform model of the current block better satisfies an actual motion status/actual requirement of the current block. Therefore, this solution can improve efficiency and accuracy of encoding the current block, and satisfy a user requirement.

It can further be learned that, in an embodiment of the present disclosure, the encoder side encodes the current block according to the design solution of the second motion model-based motion vector prediction method. This helps the decoder side uniformly use a 6-parameter affine transform model to predict an image block in a phase of reconstructing the image block. Therefore, this solution can improve the coding efficiency and the accuracy in predicting the current block, and satisfy the user requirement.

A person skilled in the art can understand that the functions described with reference to various illustrative logical blocks, modules, and algorithm steps disclosed and described in this specification can be implemented by hardware, software, firmware, or any combination thereof. If implemented in software, the functions described with reference to the illustrative logical blocks, modules, and steps may be stored or transmitted on a computer-readable medium as one or more instructions or code and executed by a hardware-based processing unit. The computer-readable medium may include a computer-readable storage medium, which corresponds to a tangible medium such as a data storage medium, or include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in the embodiments of the present disclosure. A computer program product may include a computer-readable medium.

By way of example and not by way of limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave are included in a definition of a medium. However, it should be understood that the computer-readable storage medium and the data storage medium do not include connections, carriers, signals, or other transitory media, but are actually non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included in a scope of the computer-readable medium.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may be any one of the foregoing structures or any other structure applicable to the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in the embodiments of the present disclosure may be implemented in various apparatuses or devices, including a wireless handset, an integrated circuit (IC), or a set of ICs (for example, a chip set). Various components, modules, or units are described in the embodiments of the present disclosure to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

The foregoing descriptions are merely example specific implementations of the embodiments of the present disclosure, but are not intended to limit the protection scope of the embodiments of the present disclosure. Any variation or replacement readily figured out by a person skilled in the art within the technical scope disclosed in the embodiments of the present disclosure shall fall within the protection scope of the embodiments of the present disclosure. Therefore, the protection scope of the embodiments of the present disclosure shall be subject to the protection scope of the claims.

What is claimed is:

1. A motion vector prediction method implemented by a coding device, comprising:
   parsing a bitstream to obtain an index value of a control point motion vector predictor candidate list and motion vector differences (MVD)s of K control points of the current block;

when an affine model of a current block is a 2×K-parameter affine transform model, and an affine transform model of a neighboring block of the current block is a 2×N-parameter affine transform model, obtaining, according to the 2×N-parameter affine transform model for the neighboring block, candidate motion vector predictors of K control points of the current block, wherein the 2×N-parameter affine transform model is obtained based on motion vectors of N control points of the neighboring block, N is an integer equal to 2, K is an integer equal to 3, the neighboring block is a decoded image block spatially adjacent to the current block, and the current block comprises a plurality of subblocks;

constructing the control point motion vector predictor candidate list, wherein the control point motion vector predictor candidate list comprises the candidate motion vector predictors of K control points of the current block;

determining, in the control point motion vector predictor candidate list, target candidate motion vector predictors of the K control points based on the index value;

obtaining a motion vector of each subblock of the plurality of subblocks in the current block based on motion vectors (MV)s of the K control points of the current block, wherein the MVs of the K control points of the current block are obtained based on the target candidate motion vector predictors of the K control points and the MVDs of the K control points of the current block; and generating a prediction block of the current block based on the motion vectors of the plurality of subblocks in the current block.

2. The method according to claim 1, wherein candidate motion vector predictors of three control points of the current block are obtained based on a 4-parameter affine transform model for the neighboring block of the current block, wherein the N control points of the neighboring block are a top-left control point and a top-right control point of the neighboring block, but the K control points of the current block are a top-left control point, a bottom-left control point and a top-right control point of the current block.

3. The method according to claim 1, wherein the obtaining the motion vector of each subblock of the plurality of subblocks in the current block based on the MVs of the K control points of the current block comprises:

obtaining the MVs of the K control points of the current block based on the target candidate motion vector predictors of the K control points and the MVDs of the K control points of the current block;

obtaining the 2×K-parameter affine transform model of the current block based on the MVs of the K control points of the current block; and obtaining the motion vector of each subblock of the current block based on the 2×K-parameter affine transform model.

4. The method according to claim 1, wherein the method further comprises after the determining, in the control point motion vector predictor candidate list, the target candidate motion vector predictors of the K control points based on the index value, obtaining the 2×K-parameter affine transform model of the current block based on the MVs of the K control points of the current block; and correspondingly, the obtaining the motion vector of each subblock of the plurality of subblocks in the current block based on the MVs of the K control points of the current block comprises:

obtaining the motion vector of each subblock of the plurality of subblocks in the current block based on the 2×K-parameter affine transform model of the current block.

5. A decoding device, comprising:

a non-transitory computer-readable medium configured to store computer-readable instructions; and a processor in communication with the non-transitory computer-readable medium and configured to execute the computer-readable instructions stored in the non-transitory computer-readable medium thereby performing operations of:

parsing a bitstream to obtain an index value of a control point motion vector predictor candidate list and motion vector differences (MVD)s of K control points of the current block;

when an affine model of a current block is a 2×K-parameter affine transform model, and an affine transform model of a neighboring block of the current block is a 2×N-parameter affine transform model, obtaining, according to the 2×N-parameter affine transform model used for the neighboring block, candidate motion vector predictors of K control points of the current block, wherein the 2×N-parameter affine transform model is obtained based on motion vectors of N control points of the neighboring block, N is an integer equal to 2, K is an integer equal to 3, the neighboring block is a decoded image block spatially adjacent to the current block, and the current block comprises a plurality of subblocks; and construct the control point motion vector predictor candidate list, wherein the control point motion vector predictor candidate list comprises the candidate motion vector predictors of K control points of the current block;

determining, in the control point motion vector predictor candidate list, target candidate motion vector predictors of the K control points of the current block based on the index value;

obtaining a motion vector of each subblock of the plurality of subblocks in the current block based on motion vectors (MV)s of the K control points of the current block, wherein the MVs of the K control points of the current block are obtained based on the target candidate motion vector predictors of the K control points of the current block and the MVDs of the K control points of the current block; and generating a prediction block of the current block based on the motion vectors of the plurality of subblocks in the current block.

6. The decoding device according to claim 5, wherein candidate motion vector predictors of three control points of the current block are obtained based on a 4-parameter affine transform model for the neighboring block of the current block, wherein the N control points of the neighboring block are a top-left control point and a top-right control point of the neighboring block, but the K control points of the current block are a top-left control point, a bottom-left control point and a top-right control point of the current block.

7. The decoding device according to claim 5, wherein the processor is further configured to execute the computer-readable instructions stored in the non-transitory computer-readable medium thereby performing the operations of:

obtaining the MVs of the K control points of the current block based on the target candidate motion vector predictors of the K control points and the MVDs of the K control points of the current block;

obtaining the 2×K-parameter affine transform model of the current block based on the MVs of the K control points of the current block; and obtaining the motion vector of each subblock of the current block based on the 2×K-parameter affine transform model of the current block.

8. The decoding device according to claim 5, wherein the processor is further configured to execute the computer-readable instructions stored in the non-transitory computer-readable medium thereby performing the operations of:

after determining, in the control point motion vector predictor candidate list, the target candidate motion vector predictors of the K control points of the current block based on the index value, obtaining the 2×K-parameter affine transform model of the current block based on the MVs of the K control points of the current block.

9. The decoding device according to claim 8, wherein the processor is specifically configured to execute the computer-readable instructions stored in the non-transitory computer-readable medium thereby performing the operations of:

obtaining the motion vector of each subblock of the plurality of subblocks in the current block based on the 2×K-parameter affine transform model of the current block.

10. A non-transitory computer-readable medium storing computer instructions, that when executed by one or more processors, cause the one or more processors to perform operations of:

parsing a bitstream to obtain an index value of a control point motion vector predictor candidate list and motion vector differences (MVD)s of K control points of the current block;

when an affine model of a current block is a 2×K-parameter affine transform model, and an affine transform model of a neighboring block of the current block is a 2×N-parameter affine transform model, obtaining, according to the 2×N-parameter affine transform model used for the neighboring block, candidate motion vector predictors of K control points of the current block, wherein the 2×N-parameter affine transform model is obtained based on motion vectors of N control points of the neighboring block, N is an integer equal to 2, K is an integer equal to 3, N is not equal to K, the neighboring block is a decoded image block spatially adjacent to the current block, and the current block comprises a plurality of subblocks;

constructing the control point motion vector predictor candidate list, wherein the control point motion vector predictor candidate list comprises the candidate motion vector predictors of K control points of the current block;

determining, in the control point motion vector predictor candidate list, target candidate motion vector predictors of the K control points based on the index value;

obtaining a motion vector of each subblock of the plurality of subblocks in the current block based on motion vectors (MV)s of the K control points of the current block, wherein the MVs of the K control points of the current block are obtained based on the target candidate motion vector predictors of the K control points and the MVDs of the K control points of the current block; and generating a prediction block of the current block based on the motion vectors of the plurality of subblocks in the current block.

11. The non-transitory computer-readable medium according to claim 10, wherein candidate motion vector predictors of three control points of the current block are obtained based on a 4-parameter affine transform model for the neighboring block of the current block, wherein the N control points of the neighboring block are a top-left control point and a top-right control point of the neighboring block, but the K control points of the current block are a top-left control point, a bottom-left control point and a top-right control point of the current block.

* * * * *